US006777026B2

(12) United States Patent
Halladay et al.

(10) Patent No.: US 6,777,026 B2
(45) Date of Patent: Aug. 17, 2004

(54) FLEXIBLE EMISSIVE COATINGS FOR ELASTOMER SUBSTRATES

(75) Inventors: James R. Halladay, Harborcreek, PA (US); Frank J. Krakowski, Erie, PA (US); Kenneth C. Caster, Cary, NC (US); Ernest Barritt Troughton, Jr., Raleigh, NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 10/265,576

(22) Filed: Oct. 7, 2002

(65) Prior Publication Data

US 2004/0068036 A1 Apr. 8, 2004

(51) Int. Cl.$^7$ .................................................. B05D 1/02
(52) U.S. Cl. ........................ 427/180; 427/387; 427/421; 427/426
(58) Field of Search ................................ 427/180, 387, 427/421, 426

(56) References Cited

U.S. PATENT DOCUMENTS

| | | |
|---|---|---|
| 2,941,966 A | 6/1960 | Campbell |
| 3,046,251 A | 7/1962 | Wagner |
| RE27,145 E | 1/1964 | Jones |
| 3,644,457 A | 2/1972 | Konig et al. |
| 3,883,571 A | 5/1975 | Allport et al. |
| 4,031,026 A | 6/1977 | Ibbotson |
| 4,039,593 A | 8/1977 | Kamienski et al. |
| 4,055,548 A | 10/1977 | Carleton et al. |
| 4,102,833 A | 7/1978 | Salisbury |
| 4,118,427 A | 10/1978 | Rhein et al. |
| 4,136,219 A | 1/1979 | Odam et al. |
| 4,207,409 A | 6/1980 | Ladenberger et al. |
| 4,229,347 A | 10/1980 | Holt et al. |
| 4,261,852 A | 4/1981 | Carroll et al. |
| 4,321,333 A | 3/1982 | Alberino et al. |
| 4,321,394 A | 3/1982 | Schafer et al. |
| 4,332,742 A | 6/1982 | Allen |
| 4,442,235 A | 4/1984 | Taylor et al. |
| 4,448,904 A | 5/1984 | Dominguez |
| 4,452,950 A | 6/1984 | Wideman |
| 4,490,301 A | 12/1984 | Pantone et al. |
| 4,490,302 A | 12/1984 | Ma et al. |
| 4,539,156 A | 9/1985 | Dewhurst et al. |
| 4,539,158 A | 9/1985 | Dewhurst et al. |
| 4,553,377 A | 11/1985 | Klinkel |
| 4,581,417 A | 4/1986 | Buding et al. |
| 4,631,315 A | 12/1986 | Buding et al. |
| 4,663,377 A | 5/1987 | Hombach et al. |
| 4,669,517 A | 6/1987 | Krishnan |

(List continued on next page.)

FOREIGN PATENT DOCUMENTS

| | | |
|---|---|---|
| DE | 2539132 | 3/1977 |
| DE | 3046008 | 9/1981 |
| DE | 3329974 | 2/1985 |
| EP | 111412 | 12/1983 |
| EP | 325997 | 1/1989 |
| JP | 172423/1994 | 12/1994 |

OTHER PUBLICATIONS

Jerrams et al, Material and Design, 19(4), pp 157–167, 1998.*

*Primary Examiner*—Erma Cameron
(74) *Attorney, Agent, or Firm*—Miles B. Dearth

(57) ABSTRACT

Emissive coatings for flexible substrates, preferably elastomers or elastomers bonded to metal are disclosed The coating composition is formed by combining parts (a) and (b) where part (a) comprises an organic solution or aqueous dispersion of a functional group containing polymer or copolymer and thermal conductive filler; and part (b) comprises a liquid curing component, for example a poly isocyanate, a carbodiimide, or an amino resin. The coating compounds can be applied to an substrate either before or after the substrate has been vulcanized. The coatings can be cured at ambient temperatures and provide heat dissipation over long term service at elevated temperatures.

35 Claims, 6 Drawing Sheets

U.S. PATENT DOCUMENTS

| | | | |
|---|---|---|---|
| 4,670,496 A | | 6/1987 | Kaniecki et al. |
| 4,695,598 A | * | 9/1987 | Yamamoto et al. ......... 523/400 |
| 4,774,288 A | | 9/1988 | Ridland |
| 4,795,788 A | | 1/1989 | Himmler et al. |
| 4,826,721 A | | 5/1989 | Obrecht et al. |
| 4,883,909 A | | 11/1989 | Slack |
| 4,910,321 A | | 3/1990 | Kennedy et al. |
| 4,910,333 A | | 3/1990 | Slack |
| 4,939,184 A | | 7/1990 | Kennedy |
| 4,960,942 A | | 10/1990 | Gerkin et al. |
| 4,973,761 A | | 11/1990 | Schoenleben et al. |
| 4,987,200 A | | 1/1991 | Datta et al. |
| 4,997,882 A | | 3/1991 | Martz et al. |
| 5,003,107 A | | 3/1991 | Zimmerman et al. |
| 5,039,755 A | | 8/1991 | Chamberlain et al. |
| 5,045,114 A | | 9/1991 | Bigalk et al. |
| 5,169,914 A | | 12/1992 | Kaszas et al. |
| 5,202,377 A | | 4/1993 | Thorne et al. |
| 5,240,635 A | | 8/1993 | DeGenova et al. |
| 5,246,977 A | | 9/1993 | Mussini |
| 5,258,481 A | | 11/1993 | Hesselmans et al. |
| 5,314,741 A | | 5/1994 | Roberts et al. |
| 5,314,955 A | | 5/1994 | Halladay |
| 5,319,032 A | | 6/1994 | Martz et al. |
| 5,350,819 A | | 9/1994 | Shaffer |
| 5,352,835 A | | 10/1994 | Dai et al. |
| 5,376,745 A | | 12/1994 | Handlin, Jr. et al. |
| 5,397,602 A | | 3/1995 | Martz et al. |
| 5,422,042 A | | 6/1995 | Waddill et al. |
| 5,448,100 A | | 9/1995 | Beasom |
| 5,457,147 A | | 10/1995 | McGrath et al. |
| 5,466,745 A | | 11/1995 | Fiori et al. |
| 5,998,539 A | | 12/1999 | Morishima et al. |
| 6,007,619 A | | 12/1999 | Laas et al. |
| 6,008,289 A | | 12/1999 | Konig et al. |
| 6,022,626 A | | 2/2000 | Guo |
| 6,034,169 A | | 3/2000 | Witkowski et al. |
| 6,051,634 A | | 4/2000 | Laas et al. |
| 6,080,812 A | | 6/2000 | Morishima et al. |
| 6,087,439 A | | 7/2000 | Ganster et al. |
| 6,087,454 A | | 7/2000 | VanHaeren et al. |
| 6,126,777 A | | 10/2000 | Wang |
| 6,139,675 A | | 10/2000 | Druecke et al. |
| 6,143,132 A | | 11/2000 | Traubel et al. |
| 6,153,690 A | | 11/2000 | Larson et al. |
| 6,156,379 A | | 12/2000 | Terada et al. |
| 6,201,060 B1 | | 3/2001 | Jansen et al. |
| 6,221,995 B1 | | 4/2001 | Yukio et al. |
| 6,252,008 B1 | | 6/2001 | Scholl et al. |

* cited by examiner

FLEXIBLE EMISSIVE COATINGS FOR ELASTOMER SUBSTRATES

FIELD OF THE INVENTION

The present invention relates to weatherable coatings applied on exterior surfaces of flexible substrate articles, particularly elastomeric or rubbery articles or substrates containing such materials. In addition to providing protective film properties, the coatings reduce heat buildup by directing heat away from the article (emissive). The coatings can be applied to an elastomeric substrate either before or after the substrate has been vulcanized.

BACKGROUND OF THE INVENTION

Engineered elastomeric products are designed to flex and bend, distort and recover, and/or dampen forces including absorbing torque or vibration repeatedly during their service life and are utilized in numerous industrial applications. For example, elastomeric materials are utilized in the manufacture of tires, hoses, seals, mountings such as engine mounts, dampers and insulating devices, and are designed to exhibit hysteretic losses, and withstand heat, to name a few design aspects. These and other articles shaped into myriad articles have many established uses such as industrial machines and parts for vehicles. Many elastomer products come into contact with heat from a variety of sources, such as from internal combustion engines. Recent increases in operating temperatures, and reduction of the size of vehicular engine compartments give rise to closer proximity between heat sources and such molded parts as rubber hoses, plastic housings, belts, various mounts, shrouds, seals, grommets, washers, spacers, covers, and housings, etc. Some of these articles are heat vulcanized, others are room temperature vulcanized and still others are cured in a different manner and exhibit characteristic flexing, elongation, rubbery elasticity, as thermoplastics or thermoset materials.

All polymeric materials degrade on account of exposure to heat, light, oxygen, ozone solvents, oils, and/or fuels. Elastomeric materials, and especially natural and/or synthetic vulcanized rubbers are particularly known to degrade when exposed to these agents, and there is a continuing search within industry to provide elastomer articles that are resistant to such degradative elements.

U.S. Pat. No. 6,022,626 discloses coatings suitable for covering engine mounts to protect the rubber substrate from oxygen, ozone and/or UV light, especially when reaching temperatures of 220° F./104° C., or more. The coatings taught provide a polymer barrier from chemical or UV intrusion. In exposure to hot environments, the polymers taught in U.S. Pat. No. 6,022,626 may provide an initial barrier against oxygen, ozone and UV radiation but lack durability to repeated flexure over long periods of time. Once adhesion fails or the coating is breached by cracks, degradative effects resume. Such coatings as taught in U.S. '626 also do not provide emissive properties and do not deflect heat.

U.S. Pat. No. 5,314,741 to Roberts, et. Al. entitled "Rubber Article Having Protective Coating" relates to polymeric articles which are coated with hydrogenated synthetic rubbers or polymers obtained by hydrogenating an unsaturated polymer which is a polymer of 1,3-butadiene and optionally one or more monoethylenically unsaturated polymers.

Conventional polymeric stabilizers, UV absorbers and the like are used for the rubber articles coated thereon, yet improved aging properties are desired even in light of more harsh operating conditions.

Achieving sufficient permanent adhesion to the underlying rubber which experiences repeated flexure or extension over long-term service life is further needing improvement.

Alkyd, urethane, and enamel metallic paint finishes are well known for providing sparkled metallic effects, are widely used as on automotive bodies. The substrates are mainly metal or rigid plastic parts where flexure is limited or the paints are expected to crack if impacted severely. Speckled-effect metallic coatings are commonly provided on metal body panels, whereby 1% or less metallic pigments are interspersed with coloring pigments, and overcoated with clear finish. Likewise, aluminized spray paints have been provided for applying to furniture, metal articles and the like, however the film forming materials utilized, cure to form a coating of very limited elongation, and would be unsuitable as coatings on flexible substrates such as engineered rubber articles due to flex cracking and loss of adhesion not long after placing the coating in service. Metal flake effect paints provide visual aesthetics for appearance parts but do not provide heat emissive properties to any extent useful for extending the useful long term service of engineered rubber products under hot environments.

One method of rendering elastomeric materials resistant to corrosive materials is to apply a protective coating to the elastomeric material. Various corrosion-resistant coatings previously utilized for both flexible substrates (e.g., elastomeric substrates) and rigid substrates (e.g., steel, stainless steel, aluminum or plastic) include polyurethanes, polysulfides and fluorocarbon elastomers. When applied to rigid substrates, traditional corrosion-resistant coatings such as fluorocarbon elastomers have been found to provide excellent resistance to oil and fuel. However, when applied to flexible elastomeric substrates comprising natural rubber and/or diene-type elastomers and mixtures, the fluorocarbon elastomers suffer from poor fatigue resistance, poor low temperature characteristics, and poor adhesion to these substrates.

Low molecular weight polyolefin or polyisoolefin based elastomers containing a low level of chemically bound functionality such as an hydroxyl or an amine bearing group are known for incorporation into urethane foams. Such elastomers can be blended with and cured by an unblocked or blocked polyisocyanate. For example, U.S. Pat. No. 4,939,184 discloses the preparation of flexible polyurethane foams made by reacting a low molecular weight polyisobutylene having two or three terminal hydroxy groups with a polyisocyanate in the presence of a blowing agent.

U.S. Pat. No. 4,136,219 to Odam relates to two methods or processes for applying polyurethane paint to vulcanized rubber parts.

U.S. Pat. No. 4,670,496 discloses tire sidewall striping paint as a coloring indicia of any color, such as a dye, and preferably metallic particles are disposed in a solution that contains unvulcanized diene rubber(s) and rubber vulcanization accelerator. Crosslinkable silicone and/or modified EPDM may also be disposed in the solution. The accelerator is essential for scavenging sulfur from the vulcanized rubber substrate to provide auto-vulcanizing of the coating rubber. In order to provide adequate adhesion for long term service as a coating for rubber articles, a diene polymer containing more than 10% residual unsaturation after curing will necessarily undergo degradation and embrittlement and will fail long before the underlying substrate fails.

Diisocyanate containing free isocyanate groups has also been previously proposed for curing copolymers of isobutylene and modified styrene containing tertiary aminoalcohol groups in EPA 325 997. EPA 325 997 discloses diisocyanate curing of polymers having a molecular weight of 700 to 200,000, and exemplifies blends of up to about 30,000 weight average molecular weight (Mw) and about 8,600 number average MW (Mn), as measured by gel permeation chromatography.

A variety of bulk isocyanate-cured rubbers and mastics have been disclosed in the 50's and 60's. Isocyanate reactive functional groups present in the elastomer readily cure with NCO groups of the diisocyanate. As an example, U.S. Pat. No. 6,087,454 discloses a process to produce a cured bulk elastomer comprising combining an elastomeric polymer, having an $M_w$ of 60,000 or more and containing hydroxyl and/or amine functional groups with a blocked polyisocyanate at a temperature below the temperature that will unblock the isocyanate. The mixture is cured by heating it to a temperature above the temperature that will unblock the polyisocyanate. This reaction can be effected at room temperature by the use of unblocked isocyanates. Low molecular weight polyisobutylene containing hydroxy functional groups are cured with a polyisocyanate in the presence of a blowing agent as is disclosed in U.S. Pat. No. 4,939,184.

U.S. Pat. No. 4,774,288 discloses a hydrogenated copolymer of a conjugated diene and an $\alpha,\beta$-unsaturated nitrile containing an active phenol-formaldehyde resin vulcanization system. The disclosure is directed to the bulk vulcanizate, which is characterized as having good compression set properties and a good resistance to oils and good resistance to oxidative attack in air at elevated temperature aging under oxidizing conditions, however no mention is made suggesting coatings could be formed on flexible elastomeric substrates such as natural rubber and polybutadiene which might provide useful properties.

U.S. Pat. No. 5,314,955 discloses a coating composition consisting of (a) a hydrogenated acrylonitrile-butadiene copolymer, (b) a phenolic resin, (c) a curing component, and (d) a solvent. This coating solves many of the problems of adhesion to rubber substrates combined with fatigue resistance and fuel resistance. One of the drawbacks of this coating composition is that it requires a high temperature bake to cure the coating and to promote adhesion to adjacent metal surfaces. A high temperature baking conditions even for a coating requires heat soaking of the entire article to be coated. Some parts such as helicopter rotor bearings would be damaged by a high temperature bake, therefore coatings such as taught in '955 are not practical to apply. The high temperature bake is also costly in production since it adds a time delay and additional handling of the parts. There still exists a need for improved protective coatings for flexible elastomeric substrates comprising typical natural rubber and/or diene-type elastomers that are resistant to fatigue over a broad temperature range, and that exhibit effective adhesion to the substrate, and that can be cured at room temperature if this is a limiting factor in coating an article.

U.S. Pat. No. 6,156,379 discloses a conventional basecoat-clear coat paint on metal surfaces, containing metal flakes in the base coat. The novel distinction is based on bright pigments derived from finely divided vapor-deposited metal. The metallic coating composition is applied over a base coating layer and a clear topcoating layer is applied over the metallic coating layer. A metallic coating composition is defined to consist essentially of the bright pigments and the solvent, meaning that coating composition either contains no ingredient other than the flake pigments and solvent, or a small amount of resin or additive such that the pigment weight concentration if 95% or higher. Binders such as acrylic, polyamide, vinyl chloride copolymers, urethane and polyesters are suggested. Such binders are not recognized as suitable for coating on flexible substrates as these can not exhibit 100% elongation, and will fail from flex-cracking and adhesion loss after placing in service.

U.S. Pat. No. 5,314,741 discloses a coating composition including a latex of highly saturated polymer such as hydrogenated nitrile rubber, highly saturated styrene/butadiene copolymer, hydrogenated polybutadiene, or hydrogenated styrene/vinyl pyridine/butadiene terpolymer. The coating is applied to a substrate and cured in place to yield a desired coated article reportedly resistant to ozone, oxygen, and UV light. Suitable curatives taught are zinc-sulfur cure packages. Elevated temperatures are necessary to affect curing of these coatings. Moreover, conventional vulcanizing systems high in sulfur content and low vulcanization accelerator content, or semi-efficient vulcanizing system having a moderate dosage of sulfur and vulcanizates accelerator known to the expert, and described e.g. in W. Hofmann, Kautschuk-Technologie, Genter Verlag, Stuttgart, 1980 p. 64 and 254–255 have several drawbacks. Conventional vulcanizing coatings result in vulcanizates with good resistance to dynamic stresses (flex life) are very sensitive to aging and reversion. Semi-efficient vulcanizing systems usually give vulcanizates which have a less of a resistance to dynamic stresses (flex life), but, in return, they are somewhat more stable to aging and reversion (cf. R. N. Datta and W. F. Helt, Rubber World, August 1997, p. 24, et seq.)

It has been observed by the present inventors that coatings based on highly saturated elastomers utilizing vulcanizing chemistry suffer from loss of adhesion to substrates such as blends of natural rubber and diene elastomers widely used in rubber articles in the aforementioned articles, especially on automotive tires, hoses and the like. A need still exists for an improved elastomeric protective coating for flexible elastomeric substrates which provide improved adhesion to the surface of elastomers, and improved flex-resistance as well as thermal emissive properties enabling the reduction of heat transferred to the underlying polymer substrate. The level of stress from heat under long-term service in engineered products is time and temperature dependant. Any reduction in absorbed heat and any increase in the release of heat within the elastomer can significantly extend the service/performance life of the product. It would be industrially important to decrease the rate of heat absorption, and increase the rate of heat dissipation of engineered elastomer products in order to extend the useful working life of these articles.

SUMMARY OF THE INVENTION

The present invention is directed to opaque, metal-filled emissive elastomeric coatings, devoid of rubber accelerator. The preferred embodiments are curable without heat. The coatings exhibit cured elongation of at least 100% and remain bonded to the substrate after long-term weathering. The coatings are in two parts which are mixed together at the time of application to the substrate. The first part comprises a flexible film-forming polymer exhibiting a $T_g$ of less than 0° C. and incorporated therein or thereon a functional group which is reactive to an active hydrogen containing curing agent, or the functional group is an active hydrogen-bearing group, and a liquid carrier. The film former polymer contains less than 10% ethylenic unsaturation before curing. The second or another part comprises a curing agent component containing either an active hydrogen bearing group and a crosslinking group, or the curing agent component contains a group reactive with active hydrogen and a crosslinking group, and a carrier liquid and (a) from 10 to 100 parts by weight per 100 parts by weight of film forming elastomer of thermally conductive metal particles having a particle size average of from 2 to 10 µm or (b) from 20 to 150 parts by weight of thermal conductive particles having an average particle size of 20 to 60 microns.

DETAILED DESCRIPTION OF THE INVENTION

Figure 1:
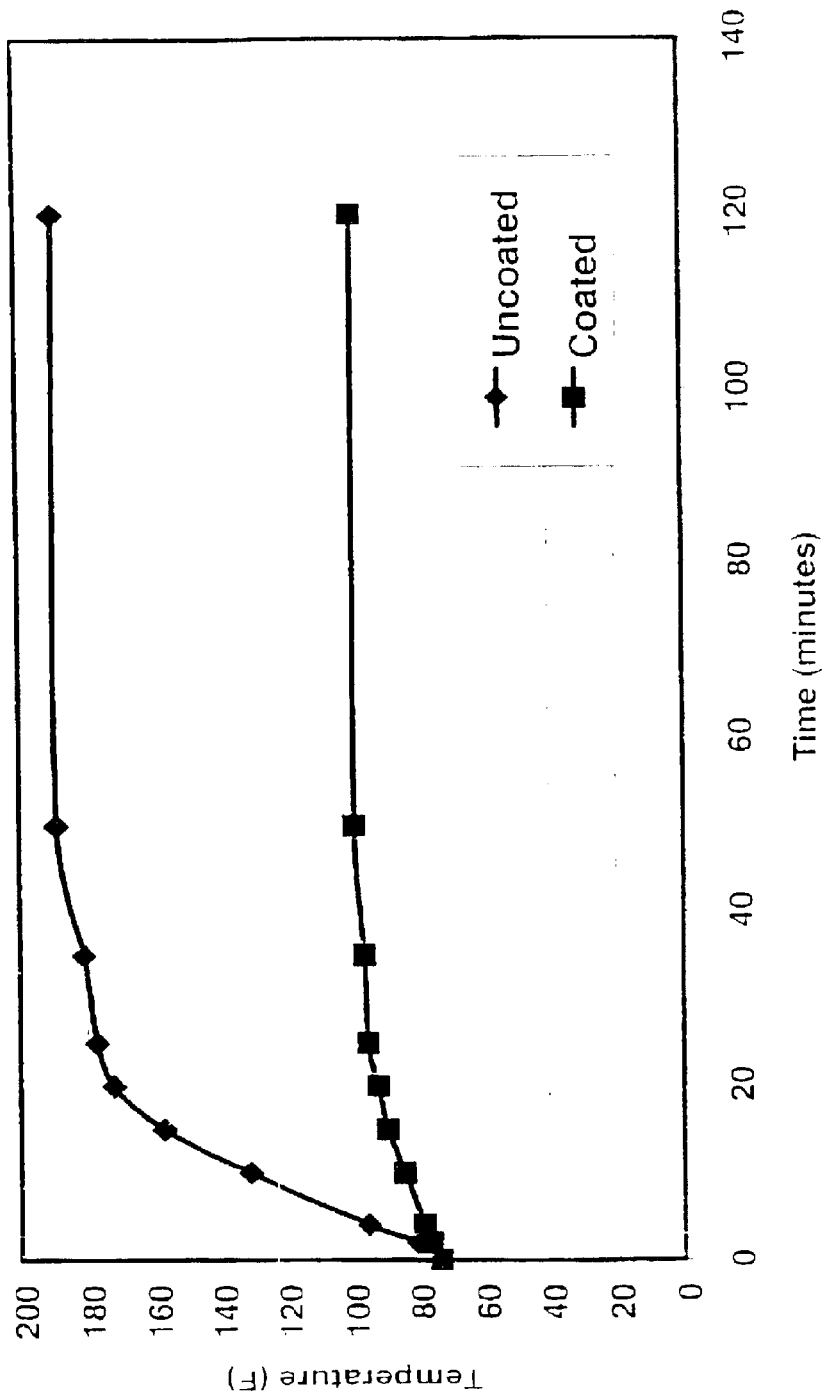
FIG. 1 is a plot of internal temperature versus time for a coated versus uncoated rubber block exposed to an infrared heat source over 120 minutes.

The coatings disclosed herein cure at ambient conditions and are resistance to solvents and fuels, and have ozone resistance. The coatings comprise film forming polymer and a specified amount of particulate metal filler. The film former provides a film that is has at least 90% light transmission in the cured state, and contains no more than about 90% unsaturation after curing. The 90+% light transmissive film forming matrix provides low loss of heat reflectivity and thermal transfer properties from the reflective metal particulate filler.

The coating results in reflection of significant heat from the underlying conductive particles of the coating, while the coating adheres permanently and is resistant to stress or environmental cracking or embrittlement. Such coatings durably bond to molded rubber, TPE and plastic goods, such as pneumatic tires, non-pneumatic tires, hoses, belts, mounts, shrouds, deflector panels, and the like, especially where used near hot bodies, like engine blocks or other industrial components emitting heat. The cured coatings are mar and scuff-resistant.

The coatings cure under ambient conditions after coating on flexible substrates to typical dry film thickness (DFT) of from about 0.5 to 20 mils (12.7 µm–508 µm). The coating is applied in liquid form using an aqueous or organic carrier depending on the selected cure agent and film former as a solution substantially devoid of water, or an aqueous dispersion. Faster curing can be obtained at elevated heat conditions, with or without photonic energy, depending on availability of curing conditions available. An advantage of the present invention having ambient cure is that a final assembled engineered rubber product with a significant thermal mass need not be heated to effect cure of the coating.

The cured physical properties of the metal-filled coating films include resistance to flex-fatigue over a broad operating temperature range (−40° C.–150° C.), resistance to degradation on long-term exposure to high temperatures and ozone and include excellent adhesion to flexible elastomeric substrates. The coating composition after curing at room temperature exhibits more than about 50% elongation without distorting (full recovery), and more typically elongate up to 100%, 200% or 300% without adhesion loss, cracking, distortion or separation from the underlying flexing of the elastomer substrate. The heat reflective surface maintains its integrity to repeated flexing and the thermally conductive particles remain intact to provide a heat-emissive surface.

The coating compositions contain at least one film former polymer or prepolymer which contains functional groups as cure sites for a curing agent without the use of vulcanization chemicals. A curing agent is utilized typically from 5 to 100 (phr) parts per 100 parts of film former polymer. The thermal conductive metal particles are specified hereinbelow in amounts on a weight basis depending upon the average size of the metallic particles.

Examples of useful film forming polymers that contain active hydrogen functional groups are disclosed herein. Polymers containing functional groups which are reactive with active hydrogen containing cure agents are also disclosed. Film forming polymers suitable herein include α-olefin elastomers, conjugated diene elastomers, hydrogenated diene elastomers, fluoroelastomers, ethylene-carboxylate, ethylene-propylene-diene elastomers, functionalized ethylene-vinyl acetate, SB-diblock, SBS- and SIBS-triblock copolymers and hydrogenated versions thereof, acrylic rubber, and polyurethanes are adaptable for use herein. Functional groups can be provided in the film former by comonomers in the polymerizate, or by post-polymerization methods known in the art by conventional means. The chemical crosslinks between the curing agent and film forming polymer are an essential feature of the invention for ambient curing, substrate adhesion and durability.

In a preferred embodiment, the coating composition of the invention comprises a functionalized hydrogenated acrylonitrile-butadiene copolymer (A) (functionalized HNBR), a curing agent (B) which contains at least one isocyanate group, preferably a polyisocyanate, or isocyanate-functional prepolymer, or isocyanato silane, or at least one multifunctional compound, oligomer, prepolymer having an isocyanate group and a group which forms crosslinks, and (C) an organic solvent. It is an important aspect of the present invention that the solvent of the coating composition can be either water based or hydrocarbon based. Aqueous coatings are provided which contain reduced levels of volatile organic compound (VOC).

The emissive coating compositions of the present invention are applied to elastomeric substrates either prior or subsequent to vulcanization of the substrate. In one aspect, the present invention sets forth a method for coating a substrate comprising applying the coating to a surface of an unvulcanized rubber substrate and drying the coating at ambient or elevated temperatures, thereby curing the coating.

In another invention aspect, a method for coating a substrate is provided and comprises a step of applying the coating to the surface of a vulcanized rubber substrate which itself may optionally be bonded to a metal component, drying the coating and allowing the dried coating to cure at ambient conditions, optionally with application of heat, light or radiation. When necessary, it is preferred to provide the coating also onto the portion of exposed metal around the periphery of the elastomer.

The present invention provides liquid, emissive exterior coatings for shaped or molded polymeric articles such as elastomeric materials and elastomer-metal composites with excellent adhesion to the elastomer substrate, resistance to corrosive materials, resistance to heat build-up, and resistance to flex-fatigue over a wide temperature range.

The coating is formed by a mixture of two liquid parts at the time of application to the substrate. Part A contains a liquid solution or dispersion of a functionalized polymer, and part B contains a liquid curing agent. When the parts are combined, the ambient temperature curable embodiments have a typical pot life of 30 minutes to one hour. The curable coating mixture of parts A and B contain from 2 to 20% solids content. The viscosity can be controlled depending on the selected components and is less than 20,000 cps (Brookfield) such that the coating can be sprayed, brushed or dipped.

Polymer Functionalizing Methods

Functionalized elastomer film-formers used herein can be provided by several routes, such as by copolymerization and in various methods to modify film forming polymers by incorporation of functional groups to the polymer after polymerization. The term "functionalized" means that an active hydrogen-bearing moiety as part of an ethylenic unsaturated comonomer is copolymerized or, an active hydrogen bearing compound is graft-linked, post-polymerization, The comonomer or grafted compound becomes covalently bonded to the polymer structure, and provides a group capable of reacting with an ambient temperature curing agent.

The film former is prepared using conventional approaches for incorporation of an active hydrogen-bearing functional group on polymerized non-functional elastomer such as by converting a functional group-bearing compound into a suitable functional group precursor or the direct incorporation of a suitable precursor radical as may be accomplished when the elastomer is in solution or in the molten state via the "Ene" reaction, whereby an allylic hydrogen transfer to an enophile followed by coupling between two unsaturated termini occurs, or via free-radical addition across a carbon—carbon double bond in the molten state or in a dilute solution with solvent. When the polymer is in the molten state, however, means capable of imparting high mechanical shear, such as an extruder, will be used to effect the desired reaction to incorporate the functional group to be converted or to directly incorporate a suitable precursor radical. When the functional group to be converted to a suitable precursor or the precursor radical incorporated directly is incorporated via techniques such as metallation followed by reaction with a suitable electrophile, on the other hand, incorporation will, preferably, be accomplished with the polymer in solution.

Of the several methods available for incorporation of a functional group or functional group precursor, those methods tending to incorporate a single function group or functional group precursor unit at each site of incorporation with minimal coupling of the elastomer polymer such as the Ene reaction and the method involving metallation followed by reaction with an electrophile are preferred. When a functional group to be converted to a suitable precursor is incorporated into the elastomer, conversion of the functional group to the precursor radical will also, generally, be accomplished with the polymer in solution. In general, any of the solvents known to be useful for preparing such elastomer polymers in solution may be used to effect these reactions or conversions.

A variety of post-polymerization functionalization techniques are known which provide heretofore non-functional addition polymers with coupled crosslinking cure sites for use in the present invention. Hydroxyl groups are useful functional groups for effecting the crosslinking reactions with curing agents used herein. U.S. Pat. No. 4,118,427 discloses hydroxyl-containing curable liquid hydrocarbon prepolymers by ozonizing a high molecular weight saturated hydrocarbon polymer such as polyisobutylene or ethylene-propylene rubber, followed by reducing the ozonized material; e.g., by using reducing agents such as diisobutyl aluminum hydride, to form the above-noted hydroxyl-containing liquid prepolymers having a substantially lower molecular weight than the parent polymer (A) Functionalized Comonomers The curable film forming polymer employed herein can be formed by copolymerization of elastomer-forming monomers together with functionalized comonomers or by reaction of a polymer with a functional group containing monomer or reactive compound. The incorporated reactive group subsequently cures the polymer by reaction of the curing component as described herein. The curing method utilizes reactions of a crosslinking agent with an active hydrogen-bearing functional group or active hydrogen reactive group which crosslinks with the corresponding reactive functional group on the copolymer or pendant on the copolymer. It is convenient to introduce a functional group bearing comonomer during polymerization of the film former polymer, as is conventionally practiced. The various approaches of free radical addition copolymerization, anionic addition polymerization, free-radical graftlinking, metathesis grafting, and hydrolytic grafting are known in the art. The functional group containing polymers, or copolymers include polymers characterized by their major constituents, such as α-olefin elastomers, diene elastomers, hydrogenated diene elastomers, functionalized fluoroelastomers, crosslinkable u-olefin copolymer elastomers, functionalized acrylate or methacrylate acrylate copolymers, and ethylene-carboxylates, etc.

Preferred examples of rubbery copolymer elastomers include but are not limited to anionic polymerized olefinic elastomers. Examples of anionic polymerized olefinic rubbers include ethylene-propylene rubber, ethylene-propylene-diene monomer rubber, polyisobutylene, or "butyl rubber", or any other polymer of isoolefin optionally copolymerized with conjugated diene (such as isoprene), optionally containing up to 30 wt. % or an α,β-ethylenic unsaturated nitrile and/or styrenic comonomer (such as styrene and/or alkyl substituted styrene), and the like. Particularly preferred elastomers include isobutylene-isoprene copolymer, isobutylene-para methylstyrene copolymer and the like.

A suitable pendant active hydrogen functional group is provided by methods for forming amine-functionalized ethylene propylene diene monomer rubber (EPDM) by the process described in U.S. Pat. No. 4,987,200. Likewise higher molecular weight isobutylene copolymers functionalized with hydroxyl groups can be produced using the process described in EPA 325 997. Furthermore any commercially available halogenated isobutylene based polymer containing a low level of halogen typically 0.5 to 2.0 mole % can be combined with an alkylamine or an amino alcohol to produce the amine or the hydroxyl functional group respectively.

Functionalized elastomers having an weight average molecular weight of 1000 up to 200,000 and containing hydroxyl and/or amine functional groups are known. Hydroxy terminated polyisobutylene are conventionally prepared by introducing hydroxy groups into the terminal positions of cationically polymerized isobutylene by dehydrochlorinating, hydroborating and oxidizing chloroterminal polyisobutylene. Chloro terminated polyisobutylenes obtained by cationically polymerizing an isobutylene monomer are known. See Faust and Kennedy in, "Living Carbocationic Polymerization: III. Demonstration of the Living Polymerization of Isobutylene," Polym. Bull. 15:317–23 (1986), disclosing living carbocationic polymerization of isobutylene and quenching the living recipe with methanol and other reagents such as amines.

Living polymerization methods are described in U.S. Pat. Nos. 5,350,819; 5,169,914; and 4,910,321 are preferred techniques to form the film forming polymer. General conditions under which living polymerizations can be achieved, for example using isobutylene include: (1) an initiator such as a tertiary alkyl halide, tertiary alkyl ether, tertiary alkyl ester, or the like; (2) a Lewis acid co-initiator which typically comprises a halide of titanium, boron or aluminum; (3) a proton scavenger and/or electron donor; (4) a solvent whose dielectric constant is selected considering the choice of the Lewis acid and the monomer in accord with known cationic polymerization systems and monomer.

Terminal Functional Polymers

Active hydrogen groups or groups reactive with active hydrogen groups can be incorporated at the terminus of film former polymers which are useful herein. U.S. Pat. No. 5,448,100 discloses sulfonated telechelic polyisobtuylene prepared by the "inifer" (initiator-transfer agents) initiated carbocationic polymerization of isobutylene with Lewis acid to form polymer, followed end-quenching with acetyl sulfate and precipitation by steam stripping or with methanol, ethanol, isopropyl alcohol, or acetone. The polymerization preferably occurs in a chlorinated solvent, most preferably in a mixture of solvents, such as methylene chloride, methyl chloride, or an aliphatic or alicyclic compound containing five to ten carbon atoms. The Lewis acid can be, for example, boron trichloride or titanium tetrachloride, or other metal halide (including tin tetrachloride, aluminum chloride, or an alkyl aluminum). End-quenching preferably occurs at a temperature between −90° to 0° C., and most preferably at the polymerization temperature or at the decomposition temperature of the complex. The molar ratio of polyisobutylene to acetyl sulfate is preferably 1:1 or greater.

A film former polymer such as polyisobutylene can contain terminal silane groups bearing a hydroxy and/or alkoxy group. These can be obtained by a known route of dehydrohalogenating a polyisobutylene polymer that contains tertiary carbon-chlorine groups, followed by an addition reaction with an ethylenic unsaturated silane. For example, chlorobutyl rubber having tertiary carbon-chlorine bonds can be reacted with allyltrimethylsilane to give a polyisobutylene having an unsaturated group then reacted under addition conditions with platinum catalyst using a hydrosilane compound of the general formula

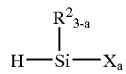

$$H-Si \underset{\displaystyle |}{\overset{\displaystyle R^2_{3-a}}{-}} X_a$$

wherein $R^2$ is a hydrogen atom, an alkyl group containing 1 to 20 carbon atoms, an aryl group containing 6 to 20 carbon atoms, an arylalkyl group containing 7 to 20 carbon atoms or a triorganosiloxy group of the formula $(R')_3$ SiO— (in which each R' independently represents a hydrogen atom or a substituted or unsubstituted hydrocarbon group containing 1 to 20 carbon atoms), each X independently represents a hydroxyl group or well-known hydrolyzable group, a is 0, 1, 2 or 3. Alternatively a polymeric hydrosilane-terminal siloxane can be used. Known hydrosilane compounds include halogenated silanes such as trichlorosilane, methyldichlorosilane, dimethylchlorosilane, phenyldichlorosilane; alkoxysilanes such as trimethoxysilane, triethoxysilane, methyldiethoxysilane, methyidimethoxysilane, phenyldimethoxysilane, etc.; acyloxysilanes such as methyidiacetoxysilane, phenyldiacetoxysilane, etc.; and ketoximate silanes such as bis(dimethylketoximate) methylsilane, bis(cyclohexylketoximate) methylsilane, etc. processes are described, for example, in Japanese Kokoku Publication Hei-4-69659, Japanese Kokoku Publication Hei-7-108928, Japanese Kokai Publication Sho-63-254149, Japanese Kokai Publication Sho-64-22904, and Japanese Patent Publication 2539445.

Functionalized Hydrogenated Diene Elastomers

Functionalized hydrogenated diene copolymers suitable for use herein as the film forming polymer are solvent soluble polymers preferably of a molecular weight of about 50,000 and higher, more typically 200,000 to 500,000, and contain no more than 10% conjugated diene segments by weight. These polymers are distinguished from liquid, functionalized oligomers, such as reactive terminal-group functional liquid polymers, e.g., ATBN and CTBN. The unsaturated functionalized polymer for preparing the hydrogenated coating polymer comprises broadly, from 50 to 85 percent by weight of conjugated diene monomer units, 5 percent to 50 percent by weight one or more non-conjugated, ethylenically unsaturated monomer units, and 1 to 20 percent by weight of a functional comonomer or graft-linked compound bearing a reactive crosslinking site. The preferred conjugated diene monomer units are derived from 1,3-butadiene monomer, and the non-conjugated ethylenically unsaturated monomer units are derived from one or more ethylenically unsaturated monomers selected from unsaturated acrylic esters, methacrylic esters, nitriles such as acrylonitrile and methacrylonitrile, and monovinyl aromatic hydrocarbons such as styrene and alkylstyrenes, and vinylidene comonomers. Divinyl aromatic hydrocarbons such as divinyl benzene, dialkenyl aromatics such as diisopropenyl benzene are preferably absent. Other comonomers include alkyl (meth) acrylates such as methyl acrylate, methyl methacrylate, ethyl acrylate, butyl acrylate, 2-ethylhexyl acrylate or methacrylate, vinyl pyridine, and vinyl esters such as vinyl acetate. The preferred functional comonomers are selected from unsaturated carboxylic acids and esters thereof such as acrylic acid, methacrylic acid, crotonic acid, itaconic acid, and maleic acid. The glass transition temperature of functionalized diene elastomer film formers must not exceed −10° C., and preferably is less than −25° C. in order to provide acceptable flex-cracking/flex-fatigue resistance in the thermal conductive particle filled coating.

Carboxyl end groups can be formed on diene elastomer high polymers containing —C—CH=CH—C— type unsaturation by a chain scission methods in which a rubber ozonide is formed, and aldehyde end groups are oxidized to carboxyl groups using peroxide or peracid. Alternatively hydroxyl end groups on the rubber ozonide can be formed by reductive techniques by catalytic hydrogenation or by reducing agents like metal hydrides or borohydrides, and the like. See for example British Patent No. 884,448. Likewise, U.S. Pat. No. 4,118,427 discloses liquid hydroxyl-containing curable liquid hydrocarbon prepolymers by ozonizing a high molecular weight saturated hydrocarbon polymer such as polyisobutylene or ethylene-propylene rubber, followed by reducing the ozonized material; e.g., by using reducing agents, preferably diisobutyl aluminum hydride, to form the above-noted hydroxyl-containing liquid prepolymers of lower molecular weight than the parent polymer.

Modification of a film-forming polymer by incorporation of mercaptoalcohol or mercaptocarboxylate grafting compounds yield useful film formers in the present invention. Suitable hydroxymercaptans and/or mercaptocarboxylic acid esters containing hydroxyl. HS—R—OH compounds include those where R is a linear, branched or cyclic $C_1$–$C_{36}$ alkyl group which can optionally be substituted by up to 6 further hydroxyl groups or can be interrupted by nitrogen, oxygen or sulfur atoms. Mercaptocaboxylates such as HS—$(CHR_2)_n$—$(C(O)OR_3OH)_m$ wherein $R_2$ is hydrogen or a $C_1$–$C_6$ alkyl group, $R_3$ is a linear, branched or cyclic $C_2$–$C_{36}$ alkyl group which can optionally be substituted by up to 6 further hydroxyl groups or can be interrupted by nitrogen, oxygen or sulfur atoms, preferably —OH is primary, n is an integer from 1 to 5 and m is an integer from 1 to 2 are suitable.

Preferred hydroxymercaptans are mercaptoethanol, 1-mercapto-3-propanol, 1-mercapto-4-butanol, α-mercapto-ω-hydroxyoligoethylene oxides, e.g., α-mercapto-ω-hydroxyoctaethylene glycol, or the corresponding ethylene oxide/propylene oxide copolyethers. Mercapto-ethanol and α-mercapto-ω-hydroxyoligoethylene oxides are preferred. Preferred mercaptocarboxylic acid esters containing hydroxyl groups are esters of mercaptoacetic acid, mercaptopropionic acid and mercaptobutyric acid with ethylene glycol, propylene glycol, butylene glycol, diethylene glycol, triethylene glycol, tetraethylene glycol, octaethylene glycol, dipropylene glycol, tripropylene glycol, tetrapropylene glycol and N-methyldiethanolamine. The corresponding esters of mercaptoacetic acid and 3-mercaptopropionic acid are particularly preferred. Suitable types of elastomer film former base polymers reacted with the mercapto compound include polymers of containing isobutylene, chloroprene, polybutadiene, isobutylene/isoprene, butadiene/acrylonitrile, butadiene-acrylate copolymers, S—B copolymers, butadiene-vinylidene chloride-acrylate type copolymers provided the degree of unsaturation is 10% or less. Methods for incorporation of mercapto compounds are described in U.S. Pat. No. 6,252,008 incorporated herein by reference and suitable for use as the functional film former polymer herein. The rubber contains in the region of 0.1 to 5 wt. % of bonded hydroxyl groups. The molecular weight of the solution polymerized diene rubber containing hydroxyl groups incorporated according to the method of U.S. Pat. No. 6,252,008 should lie in a range that dilute solutions of 5 to 15% solids can be obtained and be sprayable, brushable or dippable, such as from 10,000 to 200,000 $M_n$ (gel permeation chromatogragphy).

There are other known approaches for incorporating OH groups into the suitable film forming polymers used herein, such as by addition reactions with formaldehyde, reaction with carbon monoxide followed by hydrogenation, and hydroboration followed by hydrolysis. Copolymerization using silanes containing an ethylenic unsaturated group is a suitable method. Representative silane comonomers include vinylsilane or allylsilane having a reactive silicon group. Examples which may be mentioned include vinyltrichlorosilane, vinylmethyldichlorosilane, vinyldimethylchlorosilane, vinyldimethylmethoxysilane, divinyldichlorosilane, divinyldimethoxysilane, allyltrichlorosilane, allylmethyldichlorosilane, allyldimethylchlorosilane, allyldimethylmethoxysilane, diallyldichlorosilane, diallyldimethoxysilane, γ-methacryloyloxypropyltrimethoxysilane, and γ-methacryloyloxypropylmethyldimethoxysilane.

The functionalized diene elastomer will be described as follows with respect to a nitrile copolymer as the most preferred film former embodiment of the present invention. A functionalized butadiene acrylonitrile copolymer offers beneficial film characteristics such as low temperature flexibility, oil, fuel and solvent resistance as well as good abrasion and water-resistant qualities.

The present invention is most preferredly carried out with a functionalized hydrogenated nitrile rubber (HNBR). The functionalization of HNBR with reactive functionality provides methods for crosslinking the coating composition and obtaining the essential level of adhesion to the elastomer substrates. Without adequate adhesion to the elastomer substrate, coatings exhibit premature flex-cracking and/or delamination. The functional groups for HNBR can be generally classified as containing active hydrogen groups, ethylenic unsaturated groups or hydrolyzable groups.

Curing of the HNBR can be effected through the addition of crosslinking components mentioned herein, by exposure to moisture, heat (infra-red, thermal), by UV radiation, or by e-beam radiation. Depending on the reactive functionality incorporated into the diene copolymer. Some functionalized HNBR embodiments mentioned herein below are self-curing without added crosslinker, and all can be are cured with suitable crosslinking components added to the functionalized HNBR such as but not limited to dinitrosobenzene, ZnO, gamma-POM, phenolic resoles, multifunctional amine, polyisocyanates, polyacrylates, dicyandiamide, dicarboximides, and formaldehyde (or UF, MF) resins.

A functionalized HNBR can be prepared by a variety of ways known in the art. Functional groups can be incorporated by the use of functional-group-containing comonomers, or by the use of graft-linkable, functional-group-bearing compounds, and by functionalization of NBR using metathesis, followed by hydrogenation of the modified NBR to give functionalized HBNR or reaction of NBR with methylolated phenols followed by hydrogenation of the modified NBR to give functionalized HBNR.

Functionalized HNBR containing active-hydrogen bearing functional groups are preferred crosslinkable film formers in the curable emissive coating composition. The presence of unsaturated groups (i.e., vinyl and disubstituted olefins, nitriles) in the NBR provides reactive sites in which reactive functionality may be attached and used for further crosslinking, post-polymer functionalization, and grafting reactions. These reactive sites can be modified through either catalytic or non-catalytic chemistries. Such modification can introduce any number of active-hydrogen functional groups such as epoxides by epoxidation of olefinic sites. Epoxides are readily converted to other functional groups through ring-opening reactions. For example, glycols are produced by ring-opening with base, glycol ethers with alkoxides or phenoxides, alcohols with carbanions or hydrides. In addition, epoxides serve as crosslinkable sites using chemistry available to one skilled in the art. Many other functional groups may be introduced by reaction of the backbone olefins: hydroformylation (aldhehydes, alcohols, carboxylic acids), hydrocarboxylation (carboxylic acids), hydroesterification (esters), hydrosilylation (silanes), hydroamination (amines), halogenation (halogens), chlorosulfonylation (chlorine, sulfonic acids), hydroboration (boranes, alcohols, amines). Examples of such transformations have been reviewed by Tremont (McGrath, M. P.; Sall, E. D.; Tremont, S. J. "Functionalization of Polymers by Metal-Mediated Processes," *Chem. Rev.* 1995, 95, 381). The nitrile group of NBR elastomers also can be converted to an amide by reaction with alcohols in an acid catalyzed process and to carboxylic acids through hydrolysis.

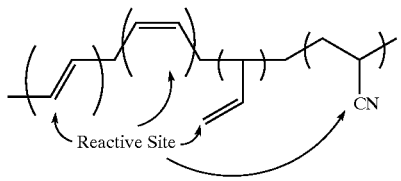

Crosslinking can be effected through the addition of a crosslinking component, moisture, thermal, UV radiation, or e-beam radiation. Depending on the reactive functionality attached to HNBR and its intended use, suitable crosslinking components can be added to the functionalized HNBR such as dinitrosobenzene, ZnO, gamma-POM, resoles, multifunctional amine, isocyanates, acrylates, and dicyandiamide. Particularly preferred crosslinking components are those components known in the art for obtaining good bonds to elastomeric articles. These components include DNB, ZnO, and QDO and can be added to enhance the adhesion of the functionalized HNBR to a wide variety of elastomeric materials.

The reactive functionality incorporated onto the diene elastomer, includes, as non-limiting examples, phenolic OH, aliphatic OH, amine, isocyanate, epoxy, acrylate, silyl ethers, silyl chlorides, anhydrides, maleimides, and Diels-Alder dieneophiles among the aforementioned functional groups.

The appropriate curing components and aids for the curing reactions are well-known in the prior literature. For example, when the functional group on the polymer is phenol, then isocyanate, dicarboximide, formaldehyde source, and resoles are suitable curing agents that are useful for crosslinking the phenol-functionalized HNBR. Likewise, amine functionalized HNBR can be crosslinked using isocyanate or dicarboximide, formaldehyde source, and resoles, as examples. Epoxy functionalized HNBR can be crosslinked and cured with appropriate amines and dicyandiamide components, as is known in the art of Epoxy adhesive and coatings. Isocyanate functionalized HNBR is of particular interest because it can be crosslinked or cured by moisture or by the addition of other curative agents such as amine or polyols. Incorporation of the isocyanate as part of the HNBR is particularly desirable because it reduces that amount of free monomeric and therefore volatile isocyanate and its reported health and safety issues. A latent isocyanate functionalized HNBR can be prepared by reaction of an amine functionalized HNBR (or NBR) with a diaryl carbonate to give a urethane functionalized HNBR (or NBR). Thermal cracking of the urethane forms the isocyanate functionalized HNBR (or NBR) (For example, see: Kothandaraman, K.; Nasar, A. S. "The Thermal Dissociation of Phenol-Blocked Toluene Diisocyanate Crosslinkers", *J.M.S.—Pure Applied Chem.* 1995, A32, 1009; Wicks, D. A.; Wicks, Z. W. "Blocked Isocyanates III: Part A. Mechanisms and Chemistry", *Progress in Organic Coatings* 1999, 36, 148; Mohanty, S.; Krishnamurti, N. "Synthesis and Thermal Deblocking of Blocked Diisocyanate Adducts", *Eur. Polym. J.* 1998, 34, 77). Maleimide functionalized HNBR can be crosslinked either by the addition of a free radical initiator or by Michael addition reactions. Maleimides are known crosslinking agents. Acrylate functionalized HNBR are capable of both free radical, UV and e-beam curing. Anhydride functionality can be cured using amines and components described in the art for anhydride-epoxy adhesives.

Silyl ether and chlorosilanes can be utilized in moisture-cured embodiments at room temperature. Diels-Alder adducts are self-curing or by the addition of a metathesis type catalyst.

Exemplary detail of the aforementioned graft methods for incorporating functional groups on a film forming elastomer is the melt processing of molten film forming elastomer with a polyfunctional graftlinkable material such as polyfunctional acrylate, maleated polybutadiene, and metal salts of difunctional acrylates. For example, an olefin elastomer such as EPDM can be masticated on a two roll mill, with 5 parts of an acid scavenger such as zinc oxide, 1 part stearic acid, an antioxidant and a peroxide followed by addition of 5 to 10 parts of a multi-ethylenic unsaturated compound such as trimethylolpropane triacrylate, maleated liquid polybutadiene, or zinc diacrylate to the flux roll.

Functionalized HNBR can be prepared by metathesis, followed by hydrogenation of the modified NBR to give functionalized HNBR and (2) the reaction of NBR with methylolated phenols followed by hydrogenation of the modified NBR to give functionalized HBNR.

A novel method for incorporating a reactive pendant functional group, such as a carboxy, anhydride, hydroxy functionality is provided on a NBR elastomer as follows:

Direct functionalization of any suitable unsaturated film former polymer usable herein, and especially NBR, and is accomplished through the use of olefin metathesis chemistry. Here, the olefin C=C double bonds are reacted with a catalyst and a monomer. The olefin metathesis catalyst must be capable of catalyzing metathesis reactions in the presence of nitrile functional groups. The monomer can be any cycloolefin, olefin, or α,ω-diene that is capable of undergoing an olefin metathesis reaction (e.g., ring-opening metathesis polymerization [ROMP], cross-metathesis, ring-opening-cross-metathesis, and acyclic diene metathesis polymerization [ADMET]). These monomers are derivatized with groups bearing functionality (e.g., carboxylic acids, amides, esters, anhydrides, epoxy, isocyanate, silyl, halogens, Diels-Alder diene and dienophiles, etc.) to provide cure sites for secondary crosslinking reactions of the cured film or to give new properties to the polymer. Kinetically, the metathesis catalyst will likely attack the vinyl C=C bonds first, however, their low levels in the HNBR copolymer may make attack at the backbone C=C double bond competitive. Such attack on the backbone unsaturation will likely cause a drop in molecular weight of the NBR, but the extent of such a process can be minimized by using high NBR-to-catalyst levels. After reduction of the modified NBR using for example the aforementioned catalytic hydrogenation methods, a reactive modified HNBR polymer is obtained. The polymer can be crosslinked using moisture, a selected curing agent, or an external energy source (UV or e-beam). One particular preferred advantage of metathesis catalysis is that it provides a unique means of introducing reactive functionality into NBR under mild conditions in water or in solvent. So even NBR latex can be modified with reactive functionality without de-stabilizing the latex through metathesis catalyst. This feature allows the functionalization of a variety of commercially well-known NBR polymers, in solution or as aqueous dispersions, and latexes (water-based polymerizate), followed by hydrogenation to yield functionalized HNBR.

Hydrogenated Protic Group Terminated Diene Polymers

Hydrogenated hydroxy or carboxy terminated diene polymers, alone, or in blends with different high molecular weight (10,000 Mn and above) film forming polymers are also suitable as a curable film former used in the emissive coating of the present invention. Substantially saturated polyhydroxylated polydiene polymers are known and commercially available. These represent anionic polymerized conjugated diene hydrocarbons, such as butadiene or isoprene, with lithium initiators, and terminated with OH groups. The process steps are known as described in U.S. Pat. Nos. 4,039,593; Re. 27,145; and 5,376,745, all of which are hereby incorporated by reference for their disclosure of preparing polyhydroxylated polydiene polymers. Such polymers have been made with di-lithium initiator, such as the compound formed by reaction of two moles of sec-butyllithium with one mole of diisopropylbenzene. Such a polymerization of butadiene has been performed in a solvent composed of 90% by weight cyclohexane and 10% by weight diethyl ether. The molar ratio of di-initiator to monomer determines the molecular weight of the polymer. The polymer is capped with two moles of ethylene oxide and terminated with two moles of methanol to produce the dihydroxy polybutadiene. The hydroxylated polydiene polymer is hydrogenated where substantially all of the carbon-to-carbon double bonds become saturated. Hydrogenation has been performed by those skilled in the art by established processes including hydrogenation in the presence of such catalysts as Raney Nickel, noble metals such as platinum and the like, soluble transition metal catalysts and titanium catalysts as in U.S. Pat. No. 5,039,755. Suitable polyhydroxylated polydienes are those available from Shell Chemical Company in the U.S.A. under the trade designation of KRATON LIQUID® POLYMERS, HPVM 2200 series products, and from ATOCHEMIE under the PolyBD® mark. The high molecular weight polymers suitable in blends with the hydrogenated hydroxyl butadiene polymers are not limited, and include for example the aforementioned carboxy modified chlorinated polyethylene, chlorinated polyethylene, polymers of epichlorohydrin, ethylene-acrylic copolymers, SBR, SBS, nitrile rubber (NBR), SIBS, EPDM, EPM, polyacrylates, halogenated polyisobutylene, and polypropylene oxide, among others mentioned herein, and known. The weight proportion of liquid hydrogenated polybutadiene polyol to high molecular weight film former is limited such that the percent of unsaturation in the combination is less than 10% overall. Therefore where mixtures of the hydrogenated polydiene polyol are made with unsaturated high polymers such as SBR, NBR, and the like, the proportion of unsaturated polymer will be limited to maintain the overall degree of saturation of at least 90%. Modified chlorinated polyolefins can include those modified with an acid or anhydride group. Some examples of modified chlorinated polyolefins are described in U.S. Pat. No. 4,997,882 (column 1, line 26 to column 4, line 63); U.S. Pat. No. 5,319,032 (column 1, line 53 to column 2, line 68); and U.S. Pat. No. 5,397,602 (column 1, line 53 to column 2, line 68), hereby incorporated by reference. The chlorinated polyolefins preferably have a chlorine content of from about 10 to 40 weight percent, more preferably from about 10 to 30 weight percent based on the weight of starting polyolefin. One suitable example of a modified chlorinated polyolefin is the modified chlorinated polyolefin that has a chlorine content of from about 10 to about 30 weight percent based on the weight of polyolefin, which is not neutralized with an amine, and has an acid value in the range of about 50 to about 100.

Hydrogenated Block Copolymers

Suitable film formers adaptable according the invention are hydrogenated styrene-butadiene-styrene block copolymers, hydrogenated styrene-isoprene-styrene block copolymers, which are modified according to methods disclosed herein above, adapted for chlorinated polyethylene, and elsewhere provide cure functionality on the block copolymer for interaction with the curing agent. Some elastomeric block copolymers containing carboxyl groups are available commercially. Those block copolymers which contain unsaturation can be hydrogenated according to known hydrogenated methods, including methods referenced herein.

Phenol Functional Elastomer

Functionalization of HNBR with phenol functionality can be carried out by the combination of a methylolated phenol and the NBR, followed by hydrogenation of the phenol-modified NBR intermediate. Methylolated phenols can form covalent bonds with NBR and NBR copolymers by a variety of chemical reactions as reported in the literature [A. Knop and L. Pilato, "Phenolic Resins Chemistry and Applications and Performance" Springer-Verlag, New York 1985, Chapter 19 pg 288–297].

Various known isocyanate-reactive functional groups can be incorporated in a functionalized elastomer film-forming polymer. The aforementioned carboxy-functional, hydroxy-functional and amine functional elastomers are most readily adaptable. Functional comonomers, like carboxy-functional comonomers are readily adaptable to form a copolymer of carboxylated hydrogenated nitrile rubber. For the purposes of the present invention, the functionalized hydrogenated nitrile rubber can be defined as a polymer comprising at least one diene monomer, nitrile monomer, and a functional group-bearing compound such as a comonomer or a graftlinking compound containing a functional group or a combination thereof. When the abbreviation HNBR is utilized herein, it is to be understood that the term refers to rubbers which can include diene monomer other than 1,3 butadiene, and comonomers other than acrylonitrile, unless specifically stated. It is also important to note that additional monomers can be polymerized along with or grafted to the diene monomer to form the functionalized HNBR. The additional monomers can, for example, provide at least one functional group to facilitate crosslinking.

Functionalization of HNBR with phenolic functionality can be carried out with the unsaturated un-hydrogenated polymer, or a partially hydrogenated XHNBR polymer (80–97% hydrogenation level) by addition of methylol phenol or ether derivative under heat and optionally catalyzed by suitable Lewis acid. Preferably an ether blocking group is provided on the methylol phenol compound, facilitating ease of post reaction hydrogenation. Addition can be through the nitrile or carboxyl groups by ester formation, or by way of the aforementioned addition at allylic sites. Preferably a metathesis reaction of an ethylenic unsaturated compound bearing a phenol group can be done in solvent or water. Alternatively, an olefinic bearing methylolated phenyl ether or phenol can be metathesized with NBR, followed by hydrogenation. The phenol functionalized NBR is subsequently hydrogenated. A methylolation reaction can be undertaken using a phenol functional NBR or HNBR with formaldehyde to generate a methylolated phenol functionality in the NBR, or with HNBR. Methylolated phenols can form covalent bonds with NBR and NBR copolymers by a variety of chemical reactions as reported in the literature. See, A. Knop and L. Pilato, "Phenolic Resins Chemistry and Applications and Performance" Springer-Verlag, N.Y. 1985, Chapter 19, pg. 288–297. The following structural diagrams illustrate functionalizing with a representative phenolic bearing compound.

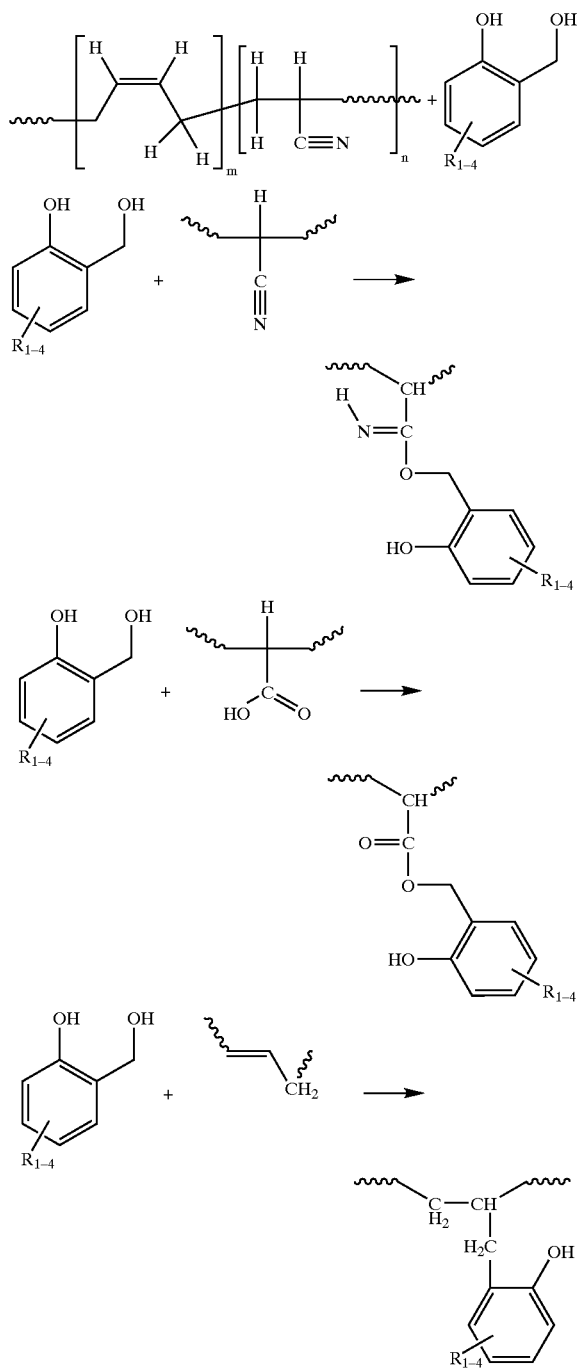

While it is possible to combine any methylolated phenol with NBR, mono-methylolated phenols are especially preferred. The combination of Mono-methylolated phenols with NBR polymers yields phenol functionalized-NBR products which are stable. After hydrogenation of the phenol-modified NBR according to known procedures in the art (e.g. cat. hydrogenation), a stable phenol-modified HNBR copolymer is obtained. The phenol-functionalized HNBR copolymer can be crosslinked with a variety of well-known crosslinkers for phenolic resins including those selected from dicarboximides, isocyanate, and formaldehyde source (paraformaldehyde, gamma-POM, hexamethylene amine, phenolic resoles or etherified phenols).

Methylolated phenol functionalized nitrile rubber (NBR) or hydrogenated versions (HBNR) can be prepared by procedures known in the art. The phenol functionalized NBR/HNBR can be prepared by either the mono-methylolated phenol or by metathesis involving unsaturated monomer with the unsaturated NBR. The methylolated phenol functionalized NBR/HBNR prepared by metathesis utilizes a methylolated phenolic monomer with NBR. These materials are useful not only as coatings in accordance with the present invention, but also as components of elastomer-to-metal adhesives, autodepositing materials, RFL dips, and reactive tougheners (e.g. epoxy adhesives) taking advantage of their unique curing, film-forming, metal adhesion and compatibility properties. Methylolated phenol functionalized NBR/HNBR are capable of self-curing (i.e. without an external curing agent). Methylolated phenol functionalized NBR/HNBRderivatives are capable of curing with other coating components, such as phenolic novolaks, active hydrogen reactive or active hydrogen containing crosslinkers and rubber/elastomer toughening agents. Methylolated phenol functional HNBR can be used with known vulcanizing agents for rubber. The vulcanization reaction is based on the formation of either a quinone methide or a benzylic carbenium that is generated by the thermal or catalytic activation of the methylolated phenols. The quinone methide intermediate reacts by abstraction of allylic hydrogen. Alternatively, methylolated phenols can generate reactive benzyl carbenium ions under acidic catalyzed conditions which will react with unsaturated polymers in the substrate.

When the reactive functional group on the HNBR is phenol, then isocyanate, dicarboximide, formaldehyde source, and resole curing agents are useful for crosslinking the phenol-functionalized HNBR to the elastomer substrate. Likewise, amine-functionalized HNBR can be crosslinked using isocyanate or dicarboximide, a formaldehyde source, and/or resoles, as examples. Epoxy-functionalized HNBR can be crosslinked and cured with known curing agents, e.g., amines, amidoamines, and/or dicyandiamide, well known in the art of Epoxy adhesives.

Isocyanate functionalized HNBR can be crosslinked or cured by moisture or by the addition of other curative agents such as amine or polyols. Incorporation of the isocyanate as part of the HNBR is particularly desirable because it reduces that amount of free monomeric and therefore volatile isocyanate and its reported health and safety issues. Maleimide functionalized HNBR can be crosslinked either by the addition of a free radical initiator or by Michael addition reactions. Ethylenic unsaturated acrylate-functionalized HNBR is capable of both free radical, UV and e-beam curing. Anhydride functional HNBR can be cured using amines and components described in the art for anhydride-epoxy adhesives. Silyl ether and chlorides are moisture curing. Diels-Alder adducts are self-curing or by the addition of known metathesis catalysts.

To provide the ethylenically unsaturated nitrile-conjugated diene rubber with at least 90% saturation, the nitrile rubber is hydrogenated by conventional means. Generally any of the numerous known processes for hydrogenation can be utilized, including but not limited to, solution hydrogenation and oxidation/reduction hydrogenation. The hydrogenation serves to saturate at least 90% of the unsaturated bonds of the rubber. When the degree of saturation is less than 90%, the rubber's heat resistance is low, The more preferred degree of saturation of the rubber is 95–99.99%.

The preferred conjugated diene monomers useful for preparing the carboxylated acrylonitrile-butadiene copolymers which are further hydrogenated can be any of the well-known conjugated dienes including dienes having from about 4 to about 10 carbon atoms, such as, but not limited to, 1,3-butadiene; 2-methyl-1,3-butadiene, 2,3-dimethyl-1,3-butadiene; 1,3-pentadiene; 1,3-hexadiene; 2,4-hexadiene; 1,3-heptadiene; piperylene; and isoprene, with 1,3-butadiene presently being preferred.

The unsaturated nitrile monomers copolymerized to form a carboxylated acrylonitrile-diene copolymer typically correspond to the following formula:

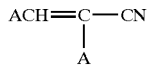

wherein each A is hydrogen or a hydrocarbyl group having from 1 to about 10 carbon atoms. Examples of A groups include alkyl and cycloalkyl, such as methyl, ethyl, isopropyl, t-butyl, octyl, decyl, cyclopentyl, cyclohexyl, etc., and aryls such as phenyl, tolyl, xylyl, ethylphenyl, t-butylphenyl, etc. Acrylonitrile and methacrylonitrile are the presently preferred unsaturated nitriles.

The HNBR of the present invention also includes functional group containing monomers which are polymerized into the backbone of the HNBR, or functional group containing compounds which have been grafted to the HNBR, or a combination thereof.

Carboxyl group containing monomers are optionally utilized in the film-forming elastomer used in the present invention. Carboxyl groups can be provided by α,β-unsaturated monocarboxylic acid monomers with 3 to about 5 C-atoms such as acrylic acid, methacrylic acid and crotonic acid and/or other known carboxyl group-containing monomers such as, but not limited to α,β-unsaturated dicarboxylic acids with 4 to about 5 or about 6 C-atoms, e.g., maleic acid, fumaric acid, citraconic acid and itaconic acid, and anhydrides of these. The bound unsaturated carboxylic acid may be present in an amount of from about 1 to about 10 weight percent of the copolymer, with this amount displacing a corresponding amount of the conjugated diolefin. Preferably, the monomer is an unsaturated mono- or di-carboxylic acid derivative (e.g., esters, amides and the like). Functions of the carboxyl group-containing monomers include serving as a crosslinking site and enhancing adhesion.

Additional, other functional comonomers can be copolymerized into the backbone of the HNBR copolymer. Examples of the functional ethylenically unsaturated monomers which are copolymerizable with the nitrile monomers and the conjugated diene monomers are: hydrazidyl-group containing ethylenic unsaturated monomers, amino-group-bearing ethylenic unsaturated monomers, thiol-group bearing unsaturated ethylenic monomers, unsaturated carboxylic acids such as acrylic acid, methacrylic acid, itaconic acid and maleic acid and salts thereof, alkyl esters of unsaturated carboxylic acids such as various acrylates, for example methyl acrylate and butyl acrylate; alkoxyalkyl esters of unsaturated carboxylic acids such as methoxy acrylate, ethoxyethyl acrylate, methoxyethyl acrylate, acrylamide, and methacrylamide.

Also suitable as functional comonomers are various classes of monomers such as N,N-disubstituted-aminoalkyl acrylates; N,N-disubstituted-aminoalkyl methacrylates; N,N-disubstituted-aminoalkyl acrylamides; N,N-disubstituted-aminoalkyl methacrylamides; hydroxyl-substituted-alkyl acrylates and hydroxyl-substituted-alkyl methacrylates, N-alkylol substituted acrylamides such as N-methylolacrylamide, N,N'-dimethylolacrylamide and N-ethoxymethylolacrylamide; N-substituted methacrylamides such as N-methylolmethacrylamide, N,N'-dimethylolmethacrylamide and N-ethoxymethylmethacrylamide especially where free radical initiated copolymerization occurs in the presence of an alkylthiol compound having 12 to 16 carbon atoms three tertiary carbon atoms.

Of these polar group-containing vinyl monomers, N,N-disubstituted-aminoalkyl acrylates, N,N-disubstituted-aminoalkyl methacrylates, N,N-disubstituted-aminoalkyl acrylamides and N,N-disubstituted-aminoalkyl methacrylamides are preferable.

As specific examples of N,N-disubstituted-aminoalkyl acrylates, there can be mentioned acrylic acid esters such as N,N-dimethylaminomethyl acrylate, N,N-dimethylaminoethyl acrylate, N,N-dimethylaminopropyl acrylate, N,N-dimethylaminobutyl acrylate, N,N-diethylaminoethyl acrylate, N,N-diethylaminopropyl acrylate, N,N-diethylaminobutyl acrylate, N-methyl-N-ethylaminoethyl acrylate, N,N-dipropylaminoethyl acrylate, N,N-dibutylaminoethyl acrylate, N,N-dibutylaminopropyl acrylate, N,N-dibutylaminobutyl acrylate, N,N-dihexylaminoethyl acrylate, N,N-dioctylaminoethyl acrylate and acryloyl morpholine. Of these, N,N-dimethylaminoethyl acrylate, N,N-diethyluninoethyl acrylate, N,N-dipropylaminoethyl acrylate, N,N-dioctylaminoethyl acrylate and N-methyl-N-ethylaminoethyl acrylate are preferable.

As specific examples of N,N-disubstituted-aminoalkyl methacrylates, there can be mentioned methacrylic acid esters such as N,N-dimethylaminomethyl methacrylate N,N-dimethylaminoethyl methacrylate, N,N-dimethylaminopropyl methacrylate, N,N-dimethylaminobutyl methacrylate, N,N-diethylaminoethyl methacrylate, N,N-diethylaminopropyl methacrylate, N,N-diethylaminobutyl methacrylate, N-methyl-N-ethylaminoethyl methacrylate, N,N-dipropylaminoethyl methacrylate. N,N-dibutylaminoethyl methacrylate, N,N-dibutylaminopropyl methacrylate, N,N-dibutylaminobutyl methacrylate, N,N-dihexylaminoethyl methacrylate and N,N-dioctylaminoethyl methacrylate. Of these, N,N-dimethylaminoethyl methacrylate, N,N-diethylaminoethyl methacrylate, N,N-dipropylaminoethyl methacrylate, N,N-dioctylaminoethyl methacrylate and N-methyl-N-ethylaminoethyl methacrylate are preferable.

As specific examples of N,N-disubstituted-aminoalkyl acrylamides, there can be mentioned acrylamide compounds such as N,N-dimethylaminomethyl acrylamide, N,N-dimethylaminoethyl acrylamide, N,N-dimethylaminopropyl acrylamide, N,N-dimethylaminobutyl acrylamide, N,N-diethylaminoethyl acrylamide, N,N-diethylaminopropyl acrylamide, N,N-diethylaminobutyl acrylamide, N-methyl-N-ethylaminoethyl acrylamide, N,N-dipropylaminoethyl acrylamide, N,N-dibutylaminoethyl acrylamide, N,N-dibutylaminopropyl acrylamide, N,N-dibutylaminobutyl acrylamide, N,N-dihexylaminoethyl acrylamide N,N-dihexylaminopropyl acrylamide and N,N-dioctylaminopropyl acrylamide. Of these, N,N-dimethylaminopropyl acrylamide, N,N-dlethylaminopropyl acrylamide and N,N-dioctylaminopropyl acrylamide are preferable.

As specific examples of N,N-disubstituted-aminoalkyl methacrylamides, there can be mentioned methacrylamide compounds such as N,N-dimethylaminomethyl methacrylamide, N,N-dimethylaminoethyl methacrylamide, N,N-dimethylaminopropyl methacrylamide, N,N-dimethylaminobutyl methacrylamide, N,N-diethylaminoethyl methacrylamide, N,N-diethylaminopropyl methacrylamide, N,N-diethylaminobutyl methacrylamide, N-methyl-N-ethylaminoethyl methacrylamide, N,N-dipropylaminoethyl methacrylamide, N,N-dibutylaminoethyl methacrylamide, N,N-dibutylaminopropyl methacrylamide, N,N-dibutylaminobutyl methacrylamide, N,N-dihexylaminoethyl methacrylamide, N,N-dihexylaminopropyl methacrylamide and N,N-dioctylaminopropyl methacrylamide. Of these, N,N-dimethylaminopropyl methacrylamide, N,N-diethylaminopropyl methaorylamide and N,N-dioctylaminopropyl methacrylamide are preferable.

As specific examples of the hydroxy-substituted-alkyl acrylate and hydroxy-substituted-alkyl methacrylate comonomers, there can be mentioned hydroxymethyl acrylate, 2-hydroxyethyl acrylate, 2-hydroxypropyl acrylate, 3-hydroxypropyl acrylate, 3-chloro-2-hydroxypropyl acrylate, 3-phnoxy-2-hydroxypropyl acrylate, hydroxymethyl methacrylate, 2-hydroxyethyl methacrylate, 2-hydroxypropyl methacrylate, 3-hydroxypropyl methacrylate, 3-chloro-2-hydroxypropyl methacrylate and 3-phenoxy-2-hydroxypropyl methacrylate. Of these, hydroxymethyl acrylate, 2-hydroxyethyl acrylate, hydroxymethyl methacrylate and 2-hydroxyethyl methacrylate are preferable.

The NBR copolymers are polymerized by reaction of the any of the aforementioned exemplary conjugated dienes, unsaturated nitrile, and unsaturated functional-group containing comonomers in the presence of a free radical initiator by methods well known to those skilled in the art. Suitable free radical initiators are beyond the scope of this disclosure, and are typically organic oxides, peroxides, hydroperoxides, and azo compounds, etc., such as hydrogen peroxide, benzoyl peroxide, cumene hydroperoxide, di-tert-butyl peroxide, ascaridole, acetyl peroxide, tert-butyl hydroperoxide, trimethylamine oxide, dimethylaniline oxide, isopropylperoxydicarbonate, diisobutylene ozonide, peracetic acid, nitrates, chlorates, perchlorates, azobisisobutyronitrile, etc.

Hydrogenation of nitrile rubber is known to the art and to the literature. For example, a preferred commercially available X-HNBR (carboxylated-HNBR) is made from a carboxylated nitrile-diene copolymer that is hydrogenated in two steps. It is known that the C=C double bonds of the 1,2-vinyl-configured butadiene units in NBR are hydrogenated very rapidly, followed by the 1,4-cis configured units. The 1,4-trans configured butadiene units are hydrogenated comparatively slowly. The NBR products used for hydrogenation are distinguished by a predominant proportion of the 1,4-trans configured double bonds.

In the 2-stage hydrogenation, carbon—carbon double bonds are first reduced, followed by reduction of the carbon-to-nitrogen bond. As is known in the art, this procedure avoids the gelation of the hydrogenated polymers which may occur if the reduction is carried out in one step. In the first step, a different catalyst may be used, for example, a palladium or ruthenium catalyst. If desired, however, the nitrile groups alone may be reduced by proper choice of the catalyst, leaving unsaturated carbon-to-carbon bonds in the linear polymeric chain. It is possible also to use a combination of noble metal and nickel or cobalt, operating first at a relatively low temperature, then at a higher temperature. Other techniques for hydrogenating acrylonitrile-butadiene copolymers are disclosed in, for example, U.S. Pat. Nos. 4,581,417; 4,631,315; and 4,795,788; the disclosures of which are incorporated herein by reference.

A partly or completely hydrogenated nitrile rubber (HNBR) is also described in several specifications (for example DE-OS No. (German Published Specification) 2,539,132; DE-OS No. (German Published Specification) 3,329,974; DE-OS No. (German Published Specification) 3,046,008 and 3,046,251; and European Patent No. A-111,412). All of these specifications describe a process for the preparation of a partly or completely hydrogenated NBR which can be vulcanized (for example with the aid of sulphur vulcanization systems or peroxide vulcanization systems). The HNBR is prepared in solution which is later converted into solid rubber.

Hydrogenation of X-HNBR latex can be carried out by known conventional techniques. A carboxylated NBR polymer latex made conventionally using anionic surfactants is combined with (1) an oxidant selected from the group consisting of oxygen, air and hydroperoxides; (2) a reducing agent selected from hydrazine and hydrates thereof; and (3) a metal ion activator; (b) and heating the mixture to a temperature from 0° C. to the reflux temperature of the reaction mixture. This technique is taught in U.S. Pat. No. 4,452,950, assigned to Goodyear Tire and Rubber Co., herein incorporated by reference.

Furthermore, a hydrogenation process carried out in organic solution is known from U.S. Pat. No. 4,207,409, also incorporated by reference, in which process an NBR polymers manufactured by anionic polymerization, is taken up in solution in the presence of a catalyst mixture comprising a soluble compound of iron, cobalt or nickel, an aluminum-organic compound and water.

The most preferred acrylonitrile-butadiene copolymers are typically hydrogenated to an extent such that the final product has an unsaturation level of from about 1 to about 10 mole percent, and preferably from about 1 to about 5 mole percent.

A suitable carboxylated hydrogenated nitrile rubber (X-HNBR) is manufactured by Bayer under a trade name of "Therban®", for example Therban KA 8889. X-HNBR may have an iodine value of preferably about 50% or less, more preferably about 3 to 40%, most preferably from about 8 to 30%. Resistance against heat and demanding solvents can be increased when X-HNBR having a iodine value of 50% or less (high hydrogenation ratio) is used, and rubber elasticity at a low temperature can be maintained by the use of the X-HNBR rubber having a low hydrogenation ratio. The central value of the nitrile comonomer content of HNBR is preferably from about 15 to 60%, more preferably from about 30 to 55%, most preferably from about 40 to 50%. Resistance against solvents can be increased by the use of HNBR having a nitrile content of about 15% or more, particularly about 30% or more, and low-temperature resistance can be kept by the use of the rubber having a nitrile content of about 60% or less, particularly about 50% or less. In addition, Mooney viscosity $(ML_{1+4})(100°$ C.) is preferably from about 40 to 100, with Mooney viscosity of 40–60 being preferred. When X-HNBR having a Mooney viscosity falling within this range is used, the coating composition exhibits high resistance against organic liquids and good flexibility and low-temperature resistance.

The HNBR of the present invention can also have crosslinker reactive functional groups graft-linked thereto by aforementioned methods; either before or after hydrogenation. As examples of the unsaturated compound having a functional group, may be mentioned vinyl compounds having a functional group, and cycloolefins having a functional group. The introduction of the functional group by the graft-modifying method can be carried out by reacting the HNBR with a functional group-containing unsaturated compound in the presence of an organic peroxide. No particular limitation is imposed on the functional group-containing unsaturated compound. However, epoxy group-containing unsaturated compounds, carboxyl group-containing unsaturated compounds, hydroxyl group-containing unsaturated compounds, silyl group-containing unsaturated compounds, unsaturated organosilicon compounds, etc. are mentioned for reasons of improvements of crosslinking density and adhesion to substrates at a low modification rate.

Examples of the epoxy group-containing unsaturated compounds or epoxy group-containing cycloolefins include glycidyl esters of unsaturated carboxylic acids such as glycidyl acrylate, glycidyl methacrylate and glycidyl p-styryl-carboxylate; mono- or polyglycidyl esters of unsaturated polycarboxylic acids such as endo-cis-bicylco[2,2,1]hept-5-ene-2,3-dicarboxylic acid and endo-cis-bicyclo[2,2,1]hept-5-ene-2-methyl-2,3-dicarboxylic acid; unsaturated glycidyl ethers such as allyl glycidyl ether, 2-methyl-allyl glycidyl ether, glycidyl ether of o-allylphenol, glycidyl ether of m-allylphenol and glycidyl ether of p-allylphenol; and 2-(o-vinylphenyl)ethylene oxide, 2-(p-vinylphenyl)ethylene oxide, 2-(o-allylphenyl)-ethylene oxide, 2-(p-allylphenol) ethylene oxide, 2-(o-vinylphenyl)propylene oxide, 2-(p-vinylphenyl)propylene oxide, 2-(o-allylphenyl)propylene oxide, 2-(p-allylphenyl) propylene oxide, p-glycidylstyrene, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene, vinylcyclohexene monoxide and allyl-2,3-epoxycyclopentyl ether. These epoxy group-containing unsaturated compounds may be used either singly or in any combination thereof.

As examples of the carboxyl group-containing unsaturated compounds, there may be mentioned compounds described in Japanese Patent Application Laid-Open No. 271356/1993, for example, unsaturated carboxylic acids such as acrylic acid, methacrylic acid and .alpha.-ethylacrylic acid; and unsaturated dicarboxylic acid such as maleic acid, fumaric acid, itaconic acid, endo-cis-bicyclo-[2.2.1]hept-5-ene-2,3-dicarboxylic acid and methyl-endo-cis-bicyclo[2.2.1]hept-5-ene-2,3-dicarboxylic acid. As further examples of unsaturated carboxylic acid derivatives, may be mentioned anhydrides, esters, halides, amides and imides of unsaturated carboxylic acids. Specific examples thereof include acid anhydrides such as maleic anhydride, chloromaleic anhydride, butenylsuccinic anhydride, tetrahydrophthalic anhydride and citraconic anhydride; esters such as monomethyl maleate, dimethyl maleate and glycidyl maleate; and malenyl chloride and maleimide. Of the aforementioned, the unsaturated dicarboxylic acids and anhydrides thereof are preferred for reasons of easy introduction of the functional group by a graft reaction, and the like, with acid anhydrides such as maleic anhydride and itaconic anhydride being particularly preferred.

Examples of the hydroxyl group-containing unsaturated compounds for incorporation into the film forming polymer include allyl alcohol, 2-allyl-6-methoxyphenol, 4-allyloxy-2-hydroxybenzophenone, 3-allyloxy-1,2-propanediol, 2-allyldiphenol, 3-buten-1-ol, 4-penten-1-ol and 5-hexen-1-ol.

Examples of the silyl group-containing unsaturated compounds for incorporation into the film former include chlorodimethylvinylsilane, trimethylsilylacetylene, 5-trimethylsilyl-1,3-cyclopentadiene, 3-trimethylsilylallyl alcohol, trimethylsilyl methacrylate, 1-trimethylsilyloxy-1,3-butadiene, 1-trimethylsilyloxycyclopentene, 2-trimethylsilyloxyethyl methacrylate, 2-trimethylsilyloxyfuran, 2-trimethylsilyloxypropene, allyloxy-t-butyidimethylsilane and allyloxytrimethylsilane.

Examples of the unsaturated organosilicon compounds for incorporation include trisalkoxyvinylsilanes such as trimethoxyvinylsilane, triethoxyvinylsilane, tris(methoxyethoxy)vinylsilane. The alkoxy groups in such an unsaturated organosilicon compounds can be hydrolyzed into silanol groups.

Examples of unsaturated sulfonic acid or phosphorus ester groups include 2-(meth)acrylamido-2-methyl-1-propanesulfonic acid, 3-sulfopropyl (meth)acrylate, 2-sulfoethyl (meth)acrylate, and 2-phosphoethyl (meth) acrylate. These comonomers incorporated into a variety of vinyl-acrylate, acrylate or other flexible polymers having a $T_g$ of below 0° C. as the film former polymer will cure in the presence of epoxy resins, isocyanates, carbodiimides, amino resins, aminosilanes, and other crosslinking agents reactive with acidic groups. Flexible, low $T_g$ copolymers which bear at least abut 2 mol % of sulfur and/or phosphorus-containing acid groups and exhibiting an acid number of from 5 to 100, preferably from 10 to 85, and most preferably from 10 to 30 are useful film-formers in accordance with the invention.

A graft-modified HNBR according to the present invention can be obtained by graft-reacting one of the aforementioned ethylenic unsaturated compounds having a functional group with the HNBR under generation of a radical. As methods for generating the radical, may be mentioned (i) a method making use of an organic peroxide, (ii) a method making use of a photo-induced radical generator, (iii) a method by irradiation of energy rays, and (iv) a method by heating.

(i) Method making use of an organic peroxide: As the organic peroxide, for example, organic peroxides, organic peresters, etc. may be preferably used. As specific examples of such an organic peroxide, may be mentioned benzoyl peroxide, dichlorobenzoyl peroxide, dicumyl peroxide, di-tert-butyl peroxide, 2,5-dimethyl-2,5-di(peroxide benzoate)hexyne-3,1,4-bis(tert-butyl peroxyisopropyl) benzene, lauroyl peroxide, tert-butyl peracetate, 2,5-dimethyl-2,5-di(tert-butyl peroxy)hexyne-3,2,5-dimethyl-2,5-di(tert-butyl peroxy)hexane, tert-butyl perbenzoate, tert-butyl perphenylacetate, tert-butyl perisobutyrate, tert-butyl per-sec-octoate, tert-butyl perpivalate, cumyl perpivalate and tert-butyl perdiethylacetate. In the present invention, azo compounds may also be used as the organic peroxides. As specific examples of the azo compounds, may be mentioned azobisisobutyronitrile and dimethyl azoisobutyrate. Of these, benzoyl peroxide, and dialkyl peroxides such as dicumyl peroxide, di-tert-butyl peroxide, 2,5-dimethyl-2,5-di(tert-butyl peroxide)hexyne-3,2,5-dimethyl-2,5-di(tert-butyl peroxy)hexane and 1,4-bis(tert-butyl peroxyisopropyl) benzene are preferably used.

These organic peroxides may be used either singly or in any combination thereof. A proportion of the organic peroxide used is generally within a range of 0.001 to about 10 parts by weight, preferably about 0.01 to about 5 parts by weight, more preferably about 0.1 to about 2.5 parts by weight per 100 parts by weight of the unmodified HNBR. When the proportion of the organic peroxide used falls within this range, the rate of reaction of the functional group-containing unsaturated compound, and various properties of the resulting functional group-containing polymer, are balanced with one another at a high level. It is hence preferable to use the organic peroxide within such a range.

No particular limitation is imposed on the graft-modifying reaction, and the reaction may be carried out in accordance with any of the methods known per se in the art. The graft reaction can be conducted at a temperature of generally 0 to 400° C., preferably 60 to 350° C. The reaction time is generally within a range of 1 minute to 24 hours, preferably 30 minutes to 10 hours. After completion of the reaction, a solvent such as methanol is added in a great amount to the reaction system to deposit a polymer formed, and the polymer can be collected by filtration, washed and then dried under reduced pressure.

(ii) Method making use of a photo-induced radical generator: The method making use of the photo-induced radical generator is a method in which after the photo-induced radical generator is added, the resultant mixture is exposed to ultraviolet light to generate a radical, and any conventionally known method may be used. The photo-induced radical generator may be any substance so far as it is activated by irradiation of ultraviolet light. Specific examples thereof include carbonyl compounds such as benzoin, benzoin methyl ether, benzoin isopropyl ether, benzoin isobutyl ether, acetoin, butyroin, toluoin, benzyl, benzophenone, 2,2-dimethoxy-2-phenylacetophenone, alpha-hydroxycyclohexyl phenyl ketone, p-isopropyl-.alpha.-hydroxyisibutylphenone, alpha, alpha-dichloro-4-phenoxyacetophenone, methylphenyl glyoxylate, ethylphenyl glyoxylate, 4,4-bis(dimethylaminophenone) and 1-phenyl-1,2-propandione-2-(o-ethoxycarbonyl).oxime; sulfur compounds such as tetramethylthiuram monosulfide and tetramethylthiuram disulfide; azo compounds such as azobisisobutyronitrile and azobis-2,4-dimethylvaleronitrile; peroxide compounds such as benzoyl peroxide and di(t-butyl) peroxide; acylphosphine oxides such as 2,4,6-trimethylbenzoyldiphenylphosphine oxide.

A proportion of the photo-induced radical generator used is generally within a range of 0.001 to about 10 parts by weight, preferably about 0.01 to about 5 parts by weight, more preferably about 0.1 to about 2.5 parts by weight, in terms of a charged proportion upon the reaction, per 100 parts by weight of the unmodified HNBR. When the proportion of the photo-induced radical generator used falls within this range, the rate of reaction of the functional group-containing unsaturated compound, and various properties of the resulting functional group-containing polymer, are balanced with one another at a high level. It is hence preferable to use the photo-induced radical generator within such a range.

(iii) Method by irradiation: The method by irradiation of active energy rays is a publicly known method in which active energy rays such as alpha-rays, beta-rays and gamma-rays are irradiated to generate a radical. In particular, it is desired that ultraviolet light be used from the viewpoints of efficiency, practicability and profitability.

(iv) Method by heating: The radical generating method by heating is carried out by heating in a temperature range of 100 to 390° C. Both publicly known solution method, and melting and kneading method may be used. Of these, the melting and kneading method using an extruder or the like by which shear stress is applied upon heating is preferred from the viewpoint of reaction efficiency.

Direct modification of carbon—carbon unsaturated bonds, such as the aforementioned Ene reaction with conjugated or nonconjugated elastomers e.g., EPDM, NBR, and the like, can also be utilized to add functional groups thereto.

No particular limitation is imposed on the method for introducing the functional group on the film former polymer. Examples thereof include (a) a method by oxidation of unsaturated bonds, (b) the afore mentioned method by an addition reaction of a compound containing at least one functional group in its molecule to unsaturated bonds, (c) the methods mentioned herein of introducing an epoxy group, carboxyl group, hydroxyl group, or aforementioned reaction of an olefinic bond of the NBR or HNBR polymer with an unsaturated, preferably a monounsaturated, carboxylic reactant, and the end group addition to living cationic initiated polymer. Alternatively, the polymer can be halogenated using chlorine or bromine-containing compounds. The halogenated polymer can then be reacted with the monounsaturated carboxylic acid. The polymer and the monounsaturated carboxylic reactant can also be contacted at elevated temperatures to cause the aforementioned thermal "ene" reaction to take place. Alternatively, the monounsaturated carboxylic acid can be reacted with the polymer by free radical induced grafting. The functionalized elastomer of the present invention can be functionalized by contact with a hydroxy aromatic compound in the presence of a catalytically effective amount of at least one acidic alkylation catalyst. The alkylated hydroxy aromatic compound can then be further reacted to form a derivative by Mannich Base condensation with an aldehyde and an amine reagent to yield a Mannich Base condensate. In yet another means to functionalize the polymer, the polymer may be contacted with carbon monoxide in the presence of an acid catalyst under Koch reaction conditions to yield the polymer substituted with carboxylic acid groups. In addition to the above methods of functionalization, the polymer of the present invention can be functionalized by methods of air oxidation, ozonolysis, hydroformylation, epoxidation and chloroamination, or the like by any other method (for example, Japanese Patent Application Laid-Open No. 172423/1994).

Fluoroelastomers

Fluorocarbon elastomers (fluoroelastomers) as film forming polymers useful herein are derived from hydrocarbons, including vinylidene fluoride, hexafluoropropylene and are commercially available from a number of suppliers. A detailed discussion of the various types of fluoroelastomers is contained in an article by R. G. Arnold, A. L. Barney and D.C. Thompson that appeared in the July, 1973 issue of a journal entitled "Rubber Chemistry and Technology" (Volume 46, pp. 619–652). A fluoroelastomer is distinguished from a thermoplastic fluoropolymer principally by whether plastic deformation occurs upon stressing the fluoroelastomer to 100% elongation. Fluoroplastics undergo deformation at 100% elongation and are unsuitable coating materials for elastomeric substrates according to the present invention.

The representative fluoroelastomers used herein include polymers derived from one or more fluorinated monomers including 1,1-dihydroperfluorobutyl acrylate; copolymers of vinylidene fluoride and chlorotrifluoroethylene; vinylidene fluoride and hexafluoropropylene; vinylidene fluoride and hydropentafluoropropylene; tetrafluoroethylene and propylene; and terpolymers of vinylidene fluoride, hexafluoropropylene, and tetrafluoroethylene; vinylidene fluoride, tetrafluoroethylene and perfluorovinyl ether; vinylidene fluoride, tetrafluoroethylene, and propylene; vinylidene fluoride and hydropentafluoropropylene and tetrafluoroethylene. The most preferred fluoroelastomer modified according to the invention is commercially available under the Viton® designation, such as a copolymer of vinylidenefluoride and hexafluoropropylene, or a terpolymer of vinylidenefluoride, tetrafluoroethylene, and hexafluoropropylene. Other suitable fluoroelastomers are available from Dyneon under the FLOREL® mark, and from Ausimont under the TECHNIFLON® mark.

A graft-functionalized fluoroelastomer embodiment film former utilized herein is the reaction product of a fluoroelastomer polymer and a grafting agent which contains a graft linking group which covalently bonds to the fluoroelastomer, and at least one active hydrogen-containing group, e.g., hydroxyl, thiol, or carboxyl group that undergoes bond formation to one of the reactive groups of the curing agent. The graft-modified fluoroelastomer is combined with the curing agent in admixture, within the time of the pot life (prior to gelation) of the admixture, at the time of coating the elastomer substrate.

The grafting agent for the fluoroelastomer contains one graft-linking group and one active hydrogen-bearing group. The preferred grafting agent contains a primary amine group and one active hydrogen-containing group. Examples include hydroxyamines, aminoisocyanate, such as $(R_2)_2$ $NCH_2 CH_2 NCO$, wherein $R_2$ is, for example, hydrogen or a hydrocarbyl group, hydroxyalkylamines, aminocarboxylates, aminosilane, amino silanol, aminothiols, and the like. Other suitable grafting agents that do not contain a primary amine as the graft-linking group are mercapto hydroxy, like mercaptoalcohols and mercaptosilanols, mercaptothiols, and the like. The preferred grafting agents will graft to the fluoroelastomer at relatively mild temperatures (<60° C.) and can be monomeric, oligomeric or polymeric, and contains at least one active hydrogen-containing group and no more than one primary amine group, but can contain optionally secondary or tertiary amine groups, or other groups not capable of graft-linking and crosslinking the fluoroelastomer. An optional secondary amine is believed to increase the rate of the graft reaction of the primary amine graft-linking groups to the fluoroelastomer. Specific examples of grafting agents include the various hydroxyalkyl amines, e.g. 3-amino-1-propanol, aminoalkyl silanols, e.g., aminoalkyl silane triol or precursor aminoalkyl-alkoxysilanes which include within each molecule at least one basic nitrogen capable of catalyzing the hydrolysis of the alkoxysilane groups to produce the reactive silane triol; amine-N-oxides, amino(hydroxy) carboxylic acids, amido(hydroxy)amines, polyoxyalkylene polyether mono(primary)amines, and amine-terminated polyols. Such amine-terminal polyols can be made by the known aminating methods for the polyaddition of alkylene oxides, such as for example ethylene oxide, propylene oxide, butylene oxide, dodecyl oxide or styrene oxide onto amino-starter compounds. Generally, the polyol, such as a polyether polyol is aminated with ammonia in the presence of a catalyst such as a nickel containing catalyst, e.g., a Ni/Cu/Cr catalyst. The known methods are taught in U.S. Pat. No. 4,960,942; U.S. Pat. No. 4,973,761; U.S. Pat. No. 5,003,107; U.S. Pat. No. 5,352,835; U.S. Pat. No. 5,422,042; and U.S. Pat. No. 5,457,147, all incorporated herein by reference. The starter compounds used are ammonia or compounds containing amine groups and will provide in the reaction product no more than one primary amino group, such as for example aliphatic polyamines such as ethylenediamine, ethylenediamine oligomers (for example diethylenetriamine, triethylenetetramine or pentaethylenehexamine), ethanolamine, 1,3-propylenediamine, N-(2-Hydroxyethyl) ethylenediamine, 1,3- or 1,4-butylenediamine, 1,2-, 1,3-, 1,4-, 1,5-, 1,6-hexamethylenediamine, and the like. Suitable polyether blocks for the polyether-monoamines include polyethylene glycol, polypropylene glycol, copolymers of polyethylene glycol and polypropylene glycol, poly(1,2-butylene glycol), and poly(tetramethylene glycol).

The preferred amino-hydroxy grafting agent compounds are compounds having a molecular weight of less than about 1000, preferably 500, more preferably less than 250. More preferable amino-hydroxy grafting agents contain from 2 to 16 carbon atoms. With grafting agents having a molecular weight above about 1000, the degree of flexibility and solvent resistance of the coating is reduced. Examples of more preferred grafting agents include 3-amino-1-propanol, 2-(2-aminoethylamino)ethanol and aminoalkyl silanol, e.g., aminopropyl silane triol. The effective amount of grafting agent used in relation to the weight of fluoroelastomer is from 1–20%, preferably from 2–10% by weight, more preferably 3 to 7% by wt.

Other exemplary grafting agents which provide hydroxyl-functionalized fluoroelastomers, although less preferred, include grafting hydroxyl-functional ethylenic unsaturated compounds via a graft-addition reaction. Aforementioned mercaptohydroxy and mercaptocarboxy compounds are suitable. Hydroxy or carboxy group-containing ethylenic unsaturated monomers are suitable and include, but are not limited to 2-hydroxyethyl (meth)acrylate, 1-hydroxypropyl (meth)acrylate, 2-hydroxypropyl (meth)acrylate, 2-hydroxyethyl vinyl ether, N-methylol(meth)acrylamide, methacrylic acid, and maleic anhydride, and can be grafted to the fluoroelastomer in the presence of a free radical initiator by techniques known in the art of reactive processing of polymers, widely practiced in thermoplastics such as polyolefins.

In another embodiment, a fluorocarbon elastomer is graft-functionalized by an addition reaction with a hydroxy(alkyl) mercaptan, aminothiol, or mercaptocarboxylic acid optionally containing hydroxy group(s). Suitable mercaptans which yield bound hydroxyl groups for addition to fluoroelastomers include hydroxymercaptans like mercaptoethanol, hydroxyalkylmercaptans, such as 1-mercapto-3-propanol, mercaptoethanolamine, 1-mercapto-4-butanol, α-mercapto-ω-hydroxyoligoethylene oxides, e.g., α-mercapto, ω-hydroxyoctaethylene glycol, or the corresponding ethylene oxide/propylene oxide copolyethers. Mercaptoalkoxy compounds which yield hydroxy groups upon hydrolysis include γ-mercaptopropyl-trimethoxysilane, γ-mercaptopropyltriethpxysilane, γ-mercaptopropylmethyldimethoxysilane, and γ-mercaptopropylmethyldiethoxysilane, to name a few. Suitable mercaptocarboxylic acids and corresponding esters are the aforementioned mercaptoacetic acid, and esters of mercaptoacetic acid, mercaptopropionic acid and esters, mercaptobutyric acid and esters. Esterifying compounds containing hydroxy groups include ethylene glycol, propylene glycol, butylene glycol, diethylene glycol, triethylene glycol, tetraethylene glycol, octaethylene glycol, dipropylene glycol, tripropylene glycol, tetrapropylene glycol and N-methyidiethanolamine.

Mercapto-compounds, especially mercapto alcohols can be graft-linked in effective amounts for subsequent curing to any hydrocarbon elastomer suitable herein. Especially useful in the preparation of functionalized fluoroelastomer, mercapto compounds can be incorporated under mild temperatures or at ambient temperatures. The addition of the mercapto-compounds to graft to the fluoroelastomer can be carried out optionally with a free radical initiator in solution at a temperature above the decomposition temperature of the initiator, using for instance, an azo initiator such as azobisisobutyronitrile and azobiscyclohexanenitrile, a peroxide such as dilauroyl peroxide, benzpinacol silyl ether, or photoinitiators in the presence of UV or visible light. Diacyl peroxides, especially dilauroyl peroxide, didecanoyl peroxide, di(3,3,5-trimethylhexanoyl) peroxide, disuccinoyl peroxide and dibenzoyl peroxide, are suitable. An effective amount of free radical initiator is 0.5 to 10 wt. %, based on wt. of mercapto-compound. A preferred marcapto compound is mercapto alcohol, such as mercaptoethanol. An effective amount of starting mercapto-compound is from 3% to 10% on wt. of fluoroelastomer, and is sufficient to bond at a level of 1% to 5% by wt. of bound hydroxyl groups to the fluoroelastomer.

The more preferred fluoroelastomer grafting agents are those that will graft to the fluoroelastomer at room temperature, such as 2-(2-aminoethylamino)ethanol ($NH_2$—$CH_2$—$CH_2$—NH—$CH_2$—$CH_2$—OH)(CAS #111-41-1) and aminopropylsilanetriol, such as supplied in a 22–25% solution in water by Gelest, Inc. as SIA0608.0 (CAS #29159-37-3).

Crosslinkable α-Olefin Copolymer Elastomers

Poly(olefin/acrylic ester/carboxylate) copolymer film forming elastomers are copolymers produced by polymerizing at least one α-olefin with at least one $C_1$–$C_{18}$ alkyl (meth)acrylate and, a minor amount of an unsaturated functional group-bearing comonomer that is accessible to form crosslinks with such materials as polyisocyanates, carbodiimides, and other agents. Functional group bearing comonomers can comprise an ethylenic unsaturated group and a group bearing an acid, hydroxy, epoxy, isocyanate, amine, oxazoline, diene or other reactive groups. In the absence of such functionalized monomer, crosslinking sites can be generated in an α-olefin-ester copolymer, e.g. by partial hydrolysis of pendant ester groups. Suitable α-olefins for polymerization of such olefin copolymer film-forming elastomers include ethylene, propylene, butene-1, isobutylene, pentenes, heptenes, octenes, and the like including combinations. $C_1$–$C_4$ α-olefins are preferred and ethylene is most preferred.

The functionalized comonomer provides copolymerized α-olefin polymers bearing an active hydrogen, halogen, or a group which can be converted, such as by transamidation or hydrolysis to an active hydrogen-bearing group, or conversely, the functionalized commoner contains a group that is reactive with crosslinking agents bearing an active hydrogen group. The alkyl or alkoxy(meth)acrylate acids and esters are exemplary functionalized comonomers. Concrete examples of alkyl groups are a methyl group, ethyl group, n-propyl group, isopropyl group, n-butyl group, isobutyl group, sec-butyl group, t-butyl group, pentyl group, hexyl group, octyl group, 2-ethylhexyl group and decyl group; cycloalkyl group such as cyclopentyl group and cyclohexyl group; aryl group such as phenyl group and tolyl group; and aralkyl group such as benzyl group and neophyl group.

Examples of alkoxy groups include methoxy group, ethoxy group, n-propoxy group, isopropoxy group, n-butoxy group, isobutoxy group, sec-butoxy group, t-butoxy group, pentoxy group, hexoxy group and octoxy group.

Suitable alkyl or alkoxy (meth)acrylates optionally incorporated with α-olefin include methyl acrylate, ethyl acrylate, t-butyl acrylate, n-butyl acrylate, 2-ethylhexyl acrylate, methyl methacrylate, ethyl methacrylate, n-butyl methacrylate, 2-ethylehexy acrylate, methoxy acrylate, ethoxyethyl acrylate, methoxyethyl acrylate, acrylamide, and methacrylamide, and the like or a mixture thereof. Specific examples of functional ethylenically unsaturated monomers which are copolymerizable with the α-olefin monomers are: unsaturated carboxylic acids such as acrylic acid, methacrylic acid, itaconic acid and maleic acid and salts thereof, alkyl esters of unsaturated carboxylic acids such as methyl acrylate and butyl acrylate.

A preferred α-olefin-acrylic ester copolymer rubber comprises unsaturated carboxylic acid monomer unit, such as acid units, e.g. derived from (meth)acrylic acid or maleic acid, or anhydride units, e.g. derived from maleic anhydride or partial ester units, e.g. derived from mono ethyl maleate. In a preferred embodiment the polymer is a terpolymer of ethylene, $C_1$–$C_4$ alkyl acrylate and an carboxylic monomer unit; more preferably such terpolymer comprises at least about 30 mole percent of ethylene, about 10 to about 69.5 mole percent mono ethyl maleate. In all cases it is preferred that the α-olefin acrylate rubber be essentially non-crystalline and have a glass transition temperature (Tg) below room temperature, i.e. below about 20° C.

Other comonomers which contain a reactive group for adding functional acid, hydroxy, epoxy, isocyanate, amine, oxazoline, diene or other reactive functional groups include the diene monomers, such as non-conjugated dienes such as alkylidenenorbornene, alkenylnorbornene, dicyclopentadiene, methylcyclopentadiene and a dimer thereof and conjugated dienes such as butadiene and isoprene. Examples of the dihydrodicyclopentadienyl group-containing (meth) acrylate include dihydrodicyclopentadienyl (meth)acrylate and dihydrodicyclopentadienyloxyethyl (meth)acrylate.

Further examples of functional comonomers include the N-alkylol and N-alkoxy amides of α,β-olefinically unsaturated carboxylic acids having from 4 to 10 carbon atoms such as N-methylol acrylamide, N-ethanol acrylamide, N-propanol acrylamide, N-methylol methacrylamide, N-ethanol methacrylamide, n-butoxy acrylamide and isobutoxy acrylamide, N-methylol maleimide, N-methylol maleamide, N-methylol maleamic acid, N-methylol maleamic acid esters, the N-alkylol amides of the vinyl aromatic acids such as N-methylol-p-vinyl benzamide, and the like and others. The preferred monomers of the N-alkylol amide type are N-methylolacrylamide, N,N'-dimethylolacrylamide and N-ethoxymethylolacrylamide; and N-substituted methacrylamides such as N-methylolmethacrylamide, N,N'-dimethylolmethacrylamide and N-ethoxymethylmethacrylamide. Because of their ready availability and relative low cost the Preferred N-alkylol amides of α,β-monoolefinically unsaturated monocarboxylic acids are N-methylol acrylamide and N-methylol- and n-butoxy-methacrylamide.

Other examples of functional comonomers bearing groups which are either reactive with active hydrogens or themselves contain active hydrogen groups are epoxy group-containing ethylenically unsaturated compounds including allyl glycidyl ether, glycidyl methacrylate, and glycidyl acrylate. Specific examples of the active halogen-containing ethylenically unsaturated compounds include vinylbenzyl chloride, vinylbenzyl bromide, 2-chloroethyl vinyl ether, vinyl chloroacetate, vinyl chloropropionate, allyl chloroacetate, allyl chloropropionate, 2-chloroethyl acrylate, 2-chloroethyl methacrylate, chloromethyl vinyl ketone and 2-chloroacetoxymethyl-5-norbornene. Specific examples of common carboxyl group-containing ethylenically unsaturated compounds include acrylic acid, methacrylic acid, crotonic acid, 2-pentenoic acid, maleic acid, fumaric acid and itaconic acid.

Examples of the other ethylenically unsaturated (meth) acrylic esters comonomers include octyl methacrylate; cyano-substituted alkyl (meth)acrylates such as 2-cyanoethyl acrylate, 3-cyanopropyl acrylate, and 4-cyanobutyl acrylate; amino-substituted alkyl (meth) acrylates such as diethylaminoethyl acrylate; fluorine-containing acrylates such as 1,1,1-trifluoroethyl acrylate;

hydroxyl group-substituted alkyl (meth)acrylates such as hydroxyethyl acrylate; alkyl vinyl ketones such as methyl vinyl ketone; vinyl or allyl ethers such as vinyl ethyl ether and ally methyl ether; vinyl aromatic compounds such as styrene, α-methylstyrene, chlorostyrene ad vinyltoluene; vinylamides such as acrylamide, methacrylamide and N-methylolacrylamide; and ethylene, propylene, vinyl chloride, vinylidene chloride, vinyl fluoride, vinylidene fluoride, vinyl acetate, alkyl fumarate, etc.

Acrylic Elastomers

Functionalized acrylate elastomers are suitable if the glass transition temperature is below −10° C., and are defined as addition polymers derived from a major amount (greater than 50 wt. % on total polymer weight) of one or more copolymerizable α,β-ethylenic unsaturated ester monomers having the general structure

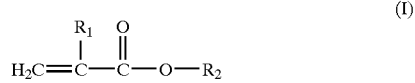

where $R_1$ is hydrogen or methyl; $R_2$ represents $C_1$–$C_{20}$ alkyl, $C_2$–$C_7$ alkyl, $C_2$–$C_7$ alkoxyalkyl, $C_2$–$C_7$ alkylthioalkyl, $C_2$–$C_7$ cyanoalkyl, and a minor amount of active hydrogen-group bearing comonomer or active bearing group graft-linked functional site. The acrylates are available in solid bale, and as emulsions or latexes from a variety of commercial sources. Minor amounts of up to about 35% on total acrylate rubber weight, of hardening or $T_g$ increasing comonomers, e.g. methyl methacrylate, acrylonitrile, vinyl acetate, vinylidene chloride and/or styrene, to name a few, can be included. Desirably, the functional group bearing comonomer having active hydrogen or a group reactive with active hydrogen containing curing agent is an unsaturated monocarboxylic acid (e.g. acrylic or methacrylic acid) or polycarboxylic acid (e.g. itaconic, citraconic acid, etc.) or anhydrides of polycarboxylic acids.

Specific examples of suitable acrylic or methacrylic monomers alone and in combinations include methyl acrylate, ethyl acrylate, butyl acrylate, butyl methacrylate, ethylhexyl acrylate, and the like. A preferred copolymer comprises one or two different copolymerizable monomers each having structure (I) in which $R_1$ is hydrogen; and, $R_2$ is $C_4$–$C_8$ alkyl, or $C_2$–$C_8$ alkoxyalkyl, either of which may contain a primary, secondary or tertiary C atom. Examples of more preferred $C_4$–$C_8$ alkyl acrylates are n-butyl acrylate, isobutyl acrylate, n-pentyl acrylate, isoamyl acrylate, hexyl acrylate, 2-methylpentyl acrylate, n-octyl acrylate, and 2-ethylhexyl acrylate; of preferred $C_4$–$C_8$ alkoxyalkyl acrylates are methoxy acrylate, and ethoxyethyl acrylate; of a preferred alkylthioalkyl acrylate is methylthioethyl acrylate; of preferred $C_2$–$C_7$ cyanoalkyl acrylates are cyanoethyl acrylate and cyanoproyl acrylate; and mixtures of two or more of the foregoing may be used.

Preferred active hydrogen bearing comonomers for acrylic elastomers include many of the above mentioned functional comonomers bearing active hydrogens, some of which are repeated here include comonomers containing carboxylic anhydride, carbonamide, N-substituted carbonamide, aldehyde, alkyl and aryl keto, hydroxyl radicals, allylic chlorine radicals, methylol, maleimide, bismaliimide, alkyl N-methylol, phenolic methylol, thiol radicals, amino radicals, isocyanate radicals, alkoxyalkyl radicals, oxirane radicals, and the like. The α,β-unsaturated hydroxy carboxylic acids or anhydrides of dicarboxylic acids are preferred. If the polymers are only copolymers of acrylate ester and carboxylic acid or anhydride comonomers, they desirably have from about 90 to about 98 mole percent repeat units from acrylate ester, more desirably from about 92 to about 97 or 98 mole percent of the ester and from 2 to 10% of carboxylic acid or anhydride, more preferably 3 to 8% of carboxylic acid or anhydride.

Exemplary functional comonomers incorporated randomly during addition polymerization of film former polymer include glycidyl methacrylate, acrylic and methacrylic acids, maleic anhydride, N-alkyl maleimide, acrylamide, N-alkoxyalkyl acrylamides such as N-isobutoxymethyl acrylamide, N-hydroxymethyl acrylamide and the like, methyl vinyl ketone, acrolein, vinyl isocyanate, hydroxyalkyl acrylates such as 2-hydroxyethyl acrylate, 2-hydroxyethyl methacrylate and the like. Also included are mixtures of two or more such functional monomers.

Included in acrylic elastomers are the so-called core-shell polymers. The rubbery copolymers useful in soft-shell copolymers include copolymeric compositions of at least one acrylic monomer whose homopolymer $T_g$ is below −10° C., and a second copolymerizable functional monomer. These monomers can be polymerized in the presence of minor proportions of monovinyl or vinylidene monomers set forth above such as for example styrene, acrylonitrile, methyl methacrylate and the like, in a proportion with the low $T_g$ acrylic comonomer(s) selected so as to not raise the $T_g$ of the resulting acrylic copolymer above about −10° C.

A core (inner)—shell (outer) acrylic addition copolymer can further include a second copolymerizable functional monomer, defined as a monoethylenically unsaturated monomer containing at least one reactive functional radical. The second functional monomer may be any of those defined hereinabove as useful for the preparation of the core copolymer including mixtures containing two or more such functional monomers, with the proviso that the reactive functional radical of said second functional monomer must be capable of reacting with the reactive functional radical of the first functional monomer contained in the core copolymer. In that sense, the reactive functional monomer contained within the core copolymer and the reactive functional monomer contained within the shell copolymer are complementary or intereactive. The shell copolymer can contain no more than about 2 wt. % of copolymerizable di- or trivinyl monomers such as a glycol diacrylate, divinylbenzene, trialkylcyanurate or the like to provide further grafting sites, as is widely practiced in the art.

The shell copolymer is an addition polymer and may be varied over a wide composition range, however, for most purposes the copolymer will comprise from about 99.9 to about 95 wt % of at least one rubbery monomer and from about 0.1 to about 5 wt. % of second copolymerizable functional monomer. The preferred shell copolymers are copolymers of an alkyl acrylate and 2-hydroxyethyl methacrylate.

The elastomeric coatings of this invention based on sequential polymerized functionalized addition polymers may exhibit two glass transition temperatures, one of which is below 0° C., and one above 0° C. The amount of rubbery shell copolymer component as well as the proportion of hard component and rubbery component may be varied however, for most purposes the ratio of rigid copolymer component to rubbery shell copolymer component is less than 1, meaning the amount of rubbery component is in a major proportion of greater than 50 wt. %.

Dual (halo, carboxy) functionalized acrylic addition polymers are also useful as the film-former for organic solvent-borne embodiments of the invention and comprise repeating units from acrylic ester monomers or monomer mixtures and which exhibit a glass transition temperature in the elastomer less than −20° C. The functional group is provided from a combination of from about 0.1% to about 30%, preferably from 0.2% to about 15% by weight of an active halogen-containing comonomer and from about 0.1% to about 20% by weight of a carboxyl-group containing comonomer. In the preferred level of halogen-containing comonomer, the halogen content is from about 0.1% to about 5% by weight of the functionalized acrylic rubber. The halogen groups of the halogen-containing comonomer can be chlorine, bromine, or iodine. Chlorine, containing comonomers are preferred from an economic, availability and safety basis.

Examples of halogen containing comonomers are vinyl chloroacetate, vinyl bromoacetate, allyl chloroacetate, vinyl chloropropionate, vinyl chlorobutyrate, vinyl bromobutyrate, 2-chloroethyl acrylate, 3-chloropropyl acrylate, 4-chlorobutyl acrylate, 2-chloroethyl methacrylate, 2-bromoethyl acrylate, 2-iodoethyl acrylate, 2-chloroethyl vinyl ether, chloromethyl vinyl ketone, 4-chloro-2-butenyl acrylate, vinyl benzyl chloride, 5-chloromethyl-2-norbornene, 5-α-chloroacetoxymethyl)-2-norbornene, 5-(α,β-dichloropropionylmethyl)-2-norbornene, and the like. The preferred monomers are vinyl chloroacetate, allyl chloroacetate, 2-chloroethyl acrylate, 2-chloroethyl vinyl ether, vinyl benzyl chloride, 5-chloromethyl-2-norbornene, and 5-chloroacetoxymethyl-2-norbornene.

A preferred active hydrogen bearing comonomer for acrylic rubber is present from about 0.1% to about 20% by wt., preferably from 0.2% to about 10%, more preferably from 2% to about 6% by weight of at least one carboxyl group-containing comonomer. The carboxyl comonomer is preferably monocarboxylic, but can be polycarboxylic. Preferred carboxyl comonomers contain from 3 to about 8 carbon atoms. Examples of such preferred comonomers are acrylic acid, methacrylic acid, ethacrylic acid, β,β-dimethylacrylic acid, crotonic acid, 2-pentenoic acid, 2-hexenoic acid, maleic acid, fumaric acid, citraconic acid, mesaconic acid, itaconic acid, 3-butene-1,2,3-tricarboxylic acid, and the like. The most preferred carboxyl comonomers are the monocarboxylic acid monomers such as acrylic acid, methacrylic acid, itaconic acid, and the like.

The functional group-containing comonomers are incorporated as introduced above most conveniently during the addition polymerization of acrylate elastomers. Polymerization by way of suspension, emulsion, solution, and bulk methods are suitable. These polymerizations are initiated using free radical initiators. The emulsion polymerization method is preferred. Various conventional soaps, emulsifiers, and surfactants, known to the art and to the literature can be utilized in emulsion polymerized functional acrylate rubber synthesis. The weight average molecular weight of the dual-functionalized acrylate elastomer is generally in excess of 100,000. Commercial grades of functionalized acrylic rubber are available from Zeon Chemicals under the HYTEMP® mark.

A variety of α,β-unsaturated $C_2$–$C_8$ alkyl ester copolymer latexes containing active hydrogen functional groups are known and available from a variety of commercial sources. A preferred acrylic rubbery latexes are available from Noveon® under the HYCAR or HYSRETCH marks. An emulsion polymerized copolymer of n-butylacrylate, acrylonitrile, N-methylol acrylamide and itaconic acid, exhibiting a $T_g$ of less than 20° C. is a preferred acrylic film former for use in aqueous coating embodiments.

Crosslinkable α-Olefin Copolymers

Poly(olefin/acrylic ester/carboxylate) copolymer are thermoplastic in the uncured state and are suitably flexible for use herein. These are principally copolymers produced by polymerizing at least one α-olefin with at least one $C_1$–$C_{18}$ alkyl (meth)acrylate and a minor amount of an unsaturated protic functional group-bearing comonomer that is accessible to form crosslinks with such materials as polyisocyanates, carbodiimides, and other curing agents. Functional group bearing comonomers can comprise an ethylenic unsaturated group and a group bearing an acid, hydroxy, epoxy, isocyanate, amine, oxazoline, diene or other reactive groups. In the absence of such functionalized monomer, crosslinking sites can be generated in an a-olefin-ester copolymer, e.g., by partial hydrolysis of pendant ester groups. Suitable a-olefins for polymerization of such olefin copolymer film-forming elastomers include ethylene, propylene, butene-1, isobutylene, pentenes, heptenes, octenes, and the like including combinations. $C_2$–$C_4$ α-olefins are preferred, and ethylene is most preferred.

The alkyl or alkoxy(meth)acrylate acids and esters are exemplary functionalized comonomers for incorporation into α-olefin polymers. Concrete examples of alkyl groups are a methyl group, ethyl group, n-propyl group, isopropyl group, n-butyl group, isobutyl group, sec-butyl group, t-butyl group, pentyl group, hexyl group, octyl group, 2-ethylhexyl group and decyl group; cycloalkyl group such as cyclopentyl group and cyclohexyl group; aryl group such as phenyl group and tolyl group; and aralkyl group such as benzyl group and neophyl group. Examples of alkoxy groups include methoxy group, ethoxy group, n-propoxy group, isopropoxy group, n-butoxy group, isobutoxy group, sec-butoxy group, t-butoxy group, pentoxy group, hexoxy group and octoxy group.

Suitable alkyl or alkoxy (meth)acrylates for copolymerizing with the α-olefin include methyl acrylate, ethyl acrylate, t-butyl acrylate, n-butyl acrylate, 2-ethylhexyl acrylate, methyl methacrylate, ethyl methacrylate, n-butyl methacrylate, 2-ethylehexy acrylate, methoxy acrylate, ethoxyethyl acrylate, methoxyethyl acrylate, acrylamide, and methacrylamide, and the like or a mixture thereof. Specific examples of functional ethylenically unsaturated monomers which are copolymerizable with the olefin monomers are: unsaturated carboxylic acids such as acrylic acid, methacrylic acid, itaconic acid and maleic acid and salts thereof, optionally in combination with alkyl esters of unsaturated carboxylic acids such as methyl acrylate and butyl acrylate. A third comonomer such as vinyl acetate can be included. Functionalized EVA copolymers are available from a variety of sources at http://www.plasticx.com.

Other comonomers which contain a functional acid, hydroxy, epoxy, anhydride, isocyanate, amine, oxazoline, diene or other reactive functional group include derivatives of diene monomers, such as non-conjugated dienes such as alkylidenenorbornene, alkenylnorbornene, dicyclopentadiene, methylcyclopentadiene and a dimer thereof and conjugated dienes such as butadiene and isoprene. Examples of the dihydrodicyclopentadienyl group-containing (meth)

acrylate include dihydrodicyclopentadienyl (meth)acrylate and dihydrodicyclopentadienyloxyethyl (meth)acrylate.

Further examples of functional comonomers include the N-alkylol and N-alkoxy amides of α,β-olefinically unsaturated carboxylic acids having from 4 to 10 carbon atoms such as N-methylol acrylamide, N-ethanol acrylamide, N-propanol acrylamide, N-methylol methacrylamide, N-ethanol methacrylamide, n-butoxy acrylamide and isobutoxy acrylamide, N-methylol maleimide, N-methylol maleamide, N-methylol maleamic acid, N-methylol maleamic acid esters, the N-alkylol amides of the vinyl aromatic acids such as N-methylol-p-vinyl benzamide, and the like and others. The preferred monomers of the N-alkylol amide type are N-methylolacrylamide, N,N'-dimethylolacrylamide and N-ethoxymethylolacrylamide; and N-substituted methacrylamides such as N-methylolmethacrylamide, N,N'-dimethylolmethacrylamide and N-ethoxymethylmethacrylamide. Because of their ready availability and relative low cost the Preferred N-alkylol amides of α,β-monoolefinically unsaturated monocarboxylic acids are N-methylol acrylamide and N-methylol- and n-butoxy-methacrylamide.

Other examples of functional comonomers bearing active hydrogen groups are epoxy group-containing ethylenically unsaturated compounds including allyl glycidyl ether, glycidyl methacrylate, and glycidyl acrylate. Specific examples of the active halogen-containing ethylenically unsaturated compounds include vinylbenzyl chloride, vinylbenzyl bromide, 2-chloroethyl vinyl ether, vinyl chloroacetate, vinyl chloropropionate, allyl chloroacetate, allyl chloropropionate, 2-chloroethyl acrylate, 2-chloroethyl methacrylate, chloromethyl vinyl ketone and 2-chloroacetoxymethyl-5-norbornene. Specific examples of the carboxyl group-containing ethylenically unsaturated compound include acrylic acid, methacrylic acid, crotonic acid, 2-pentenoic acid, maleic acid, fumaric acid and itaconic acid.

Examples of ethylenically unsaturated (meth)acrylic ester comonomers include octyl methacrylate; cyano-substituted alkyl (meth)acrylates such as 2-cyanoethyl acrylate, 3-cyanopropyl acrylate, and 4-cyanobutyl acrylate; amino-substituted alkyl (meth)acrylates such as diethylaminoethyl acrylate; fluorine-containing acrylates such as 1,1,1-trifluoroethyl acrylate; hydroxyl group-substituted alkyl (meth)acrylates such as hydroxyethyl acrylate; alkyl vinyl ketones such as methyl vinyl ketone; vinyl or allyl ethers such as vinyl ethyl ether and ally methyl ether; vinyl aromatic compounds such as styrene, a-methylstyrene, chlorostyrene ad vinyltoluene; vinylamides such as acrylamide, methacrylamide and N-methylolacrylamide; and ethylene, propylene, vinyl chloride, vinylidene chloride, vinyl fluoride, vinylidene fluoride, vinyl acetate, alkyl fumarate, etc.

A preferred olefin/acrylic ester copolymer rubber comprises unsaturated carboxylic acid monomer units, such as acid units, e.g. derived from (meth)acrylic acid or maleic acid, anhydride units, e.g. derived from maleic anhydride or partial ester units, e.g. derived from mono ethyl maleate. In a preferred embodiment the polymer is a terpolymer of ethylene, $C_1$–$C_4$ alkyl acrylate and an carboxylic monomer unit; more preferably such terpolymer comprises at least about 30 mole percent of ethylene, about 10 to about 69.5 mole percent mono ethyl maleate. In all cases it is preferred that the α-olefin acrylate rubber be essentially non-crystalline and have a glass transition temperature (Tg) below about 20° C. Ethylene-carboxylate copolymers are available commercially under the VAMAC® mark.

When the acrylic acids and acrylates are part of the α-olefin copolymer backbone, transamidation reactions may be made in melt processing techniques which are known to produce pendant hydroxyl functionality such as by employing an aminoalcohol, e.g., 2-amino-1-ethanol. A further reaction by the pendant hydroxyls may occur, i.e., transesterification with another acrylate linkage, resulting in crosslinking and an increase in product viscosity:

Polyurethanes

A castable film former comprising a curable urethane can be utilized as the film former component. The active hydrogen functionalized polymer is a saturated prepolymer and is cured with an aliphatic polyisocyanate. The cured glass transition temperature of the polyurethane is limited to below 0° C. and is lightly crosslinked by inclusion of a triol, tetraol or higher OH functionality. Therefore the chain extending polyols are limited to those such as hydroxy terminated hydrogenated polybutadiene polyol homopolymers and copolymers exhibiting a glass transition temperature of 0° C. or less, polyTHF, polyester diols, polypropylene glycols and the like, of which are familiar to those skilled in the art and commercially available. Conventional curing agent and catalyst is employed. U.S. Pat. No. 4,669,517 discloses a suitable method to apply emissive polyurethane to a prepared post-vulcanized rubber surface for obtaining excellent bonding of the polyurethane. The method for preparing a post-vulcanized surface is applicable for applying a castable polyurethane emissive coating. Cyanuric acid is applied to the rubber surface which contains incorporated therein a polybutadiene polyol, prior to application of the polyurethane reaction mixture which contains the thermally conductive metal particles. The polyurethane reaction mixture cures at ambient temperatures.

Acrylourethanes

Urethane modified acrylic materials conforming to the requirements of the film former as set forth herein are also contemplated. These may be adapted to be cure activated by moisture, heat or light. The glass transition temperature of such urethan modified acrylates must be ° C. or less and comprised of a major amount of $C_2$–$C_8$ acrylic or methacrylic esters. An example of preferred urethane-modified acrylic resins usable in the present invention is, in the case of the urethane-modified acrylic resin represented by formula (I), an acrylic copolymer produced by copolymerizing 60 to 70 moles of methyl-, ethyl-, or butyl- acrylate with 10 to 50 moles of methacrylic acid and 30 to 80 moles of 2-hydroxymethyl methacrylate. Some or all of the hydroxyl and carboxyl groups are capped in a reaction with α,β-ethylenic unsaturated isocyanate, for example, methacryloyloxyethyl isocyanate (2-isocyanate ethyl methacrylate). This material is moisture curable, and curable by UV by incorporation of a conventional photoinitiator. In mosture curable acrylourethane embodiments, it is preferred that at least 10 mole %, preferably at least 50 mole % of the hydroxyl groups from the 2-hydroxyethyl methacrylate units have been reacted with the methacryloyloxyethyl isocyanate. The α,β-ethylenic unsaturated isocyanate is preferably based upon the reaction product of an isocyanate and hydroxyl-containing monomers, such as N-methylolacrylamide, N-methylolmethacrylamide, 2-hydroxyethyl acrylate, 2-hydroxyethyl methacrylate, 2-hydroxypropyl acrylate, 2-hydroxypropyl methacrylate, 4-hydroxybutyl acrylate, and 4-hydroxybutyl methacrylate, may be used optionally with 3-aminopropyl triethoxy silane,3-aminopropyl trimethoxy silane,3-aminopropyl methyl dimethoxysilane or 3-aminopropyl methyl diethoxy silane, primary secondary amines such as N-(2-aminoethyl)-3-aminopropyl trimethoxy silane, secondary amines such as N-methyl- or N-phenyl-3-aminopropyl trimethoxy silane, condensed aminoalkyl silanes such as bis(3-aminopropyl) tetramethoxy or tetraethoxy disiloxane $NH_2$ $(CH_2)_3$—$Si(OCH_3)_2$—O— $(CH_3O)_2Si$—$(CH_2)_3$ $NH_2$, polyglycolether-modified aminosilanes such as that sold under the Trademark "Dynasylan 121" and triamino functional propyl trimethoxy silanes such as "Dynasylan TRIAMO" available from Huls A G. Similar silanes having two or three silicon atoms can also be used.

Maleated Elastomeric Materials

Various polymer blends, alloys and dynamically vulcanized composites of maleated addition polymers based on polyethylenes, such as maleated polypropylenes, maleated styrene-ethylene-butene-styrene-block copolymers, maleated styrene-butadiene-styrene block copolymers, maleated ethylene-propylene rubbers, and blends thereof can be utilized as the functionalized film-forming elastomer in accordance with the invention. The maleated elastomers are dissolved in an appropriate organic solvent system and mixed with the thermally conductive metal particles which are preferably predispersed in a portion of the solvent used.

Ethylene Vinyl Ester Copolymers

Film forming, solvent soluble, OH-functional ethylene copolymers are available in various grades which contain carboxyl or hydroxyl functional groups and are also suitable as the film former used herein. Conventionally, some of these polymers are used as cross-linkable hot melt adhesives, however these polymers are readily adaptable for ambient temperature cured emissive coating films herein even though the elevated temperature cohesiveness is relatively low. The ethylene vinyl ester polymers containing hydroxyl functionality can be adapted for use in the emissive coating composition and cured with unblocked isocyanates and provide sufficient properties for certain environmental temperatures not exceeding the temperature at which the cured coating will flow. An ethylene vinyl acetate copolymer containing OH groups is based on a polymer having monomeric units ethylene and of vinyl alcohol, and optionally vinyl acetate, the melt viscosity being preferably from 4 to 40 Pa.s at 180° C. Ethylene vinyl alcohol copolymers have preferably at least 5 wt % of vinyl alcohol units. One example is a terpolymer (viscosity 20 Pa.s at 180° C., MFR at 125° C. under 325 gm load of 6.4 gm/10 min) with 10% vinyl alcohol, 88.75% ethylene and 1.2 wt % vinyl acetate. The m.p. is 101.5° C. (by DSC). Another terpolymer contains 13.7 wt % vinyl alcohol, 82.3% ethylene and 4.0 wt % vinyl acetate (viscosity 5.8 Pa.s at 180° C., MFR at 125° C. under 325 gm (cf. 30.4 gm/10 min, DSC m.p. 91. degree. C.).

Film formers of a mixture or interpenetrating network containing partly functionalized polymer, and partly non-functionalized polymer types are suitable for use herein. Blendable with functionalized polymers are olefinic rubber polymer as random or block copolymers, e.g., SBS, EBS, EPM and EPDM, hydrogenated polydiene copolymer, acrylic rubber, and others of the aforementioned film formers. As an example, a non-functionalized polymer film former can be blended with a partially hydrolyzed ethylene vinyl acetate polymer in a proportion of from 10–90 wt. % to 90–10 wt. %, respectively, and cured with any of the suitable curing agents disclosed herein, and equivalents thereof.

Functionalized EPM and EPDM Elastomers

Functionalized EPM and EPDM elastomers are suitable film forming elastomers used as the film former in the emissive coating. These comprise two or more α-monoolefins, copolymerized with a polyene, usually a non-conjugated diene comonomer. Useful polyenes include 5-ethylidene-2-norbornene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; 5-vinyl-2-norbornene, etc.; or a combination thereof. Preferred polyenes for the EPM and EPDM functionalized elastomers are 5-vinyl-2-norbornene, 5-ethylidene-2-norbornene and 1,4-hexadiene. Functional groups can be incorporated by the aforementioned conventional routes, and by the metathesis route disclosed herein.

In one aspect of the methods disclosed in this invention a particularly useful scheme for the production of polymers containing organic acid functionality such as carboxyl functionality, aliphatic or aromatic hydroxyl functionality, and the like and inorganic acid functionality such as sulfonic acid functionality, phosphoric acid functionality and the like is provided.

One such scheme is illustrated below for EPM and EPDM rubber, for incorporating pendant carboxyl, hydroxyl or non-sterically hindered pendant olefinic functionality.

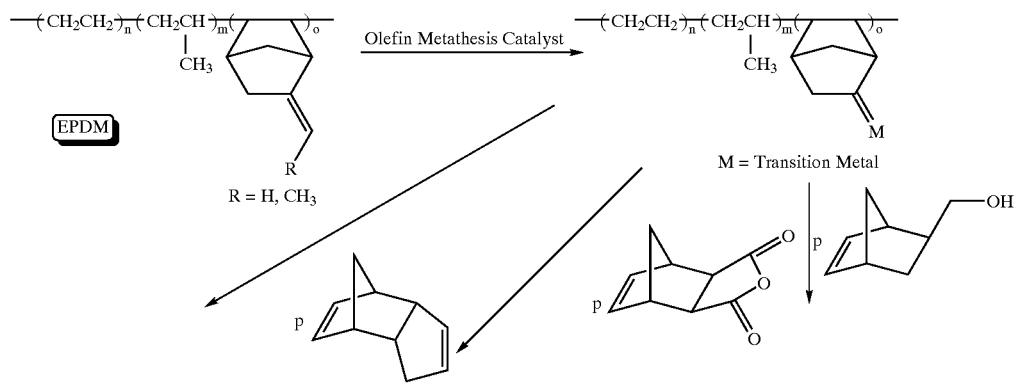

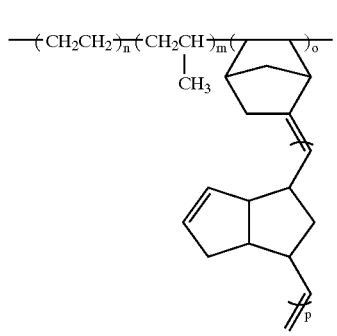 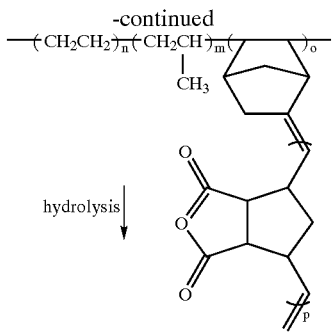 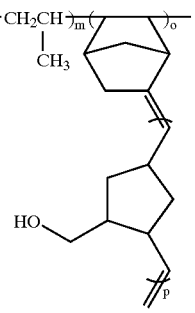

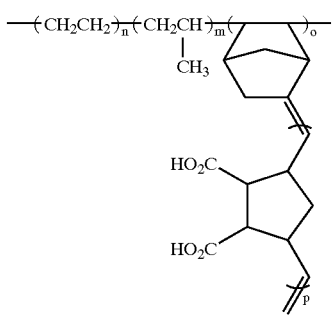

wherein n represents a conventional number of repeating ethylene units for EPDM sold commercially, m represents a conventional number of propylene repeating units, o represents a number of conventional diene monomer repeating units, and p represents the number of repeating units of maleated dicyclopentadiene ranging from 1 to 100.

The same approach as illustrated above for modifying EPDM can be utilized for incorporating a functional group in a conjugated diene polymer, such as a butadiene-acrylonitrile copolymer containing vinyl unsaturation.

(B) Curing Agent Component

The ambient temperature curing agent is a multifunctional curing component containing either (1) at least one group bearing active hydrogen and a crosslinking group which is the same active hydrogen group or a different crosslinking group, or (2) at least one group that is reactive with an active hydrogen group and a crosslinking group which is a group reactive with an active hydrogen group or a different crosslinking group. In the case of castable polyurethane or urethane acrylate (acrylo-urethane), the curing interaction is between a polyol optionally with co-curing polyamine and a polyisocyanate or polyisocyanate prepolymer and or ethylenic unsaturated groups on the acrylated portion. The curing component is selected from polyisocyanate, chain extended polyisocyanate, polymeric isocyanate-polyol adduct, a polycarbodiimide, multifunctional oxazoline, multifunctional oxazine, multifunctional imidazoline, phenolic novolak, phenolic resole, amino resin, and amino(alkoxy) silane. The preferred curing component contains at least one isocyanate group, or a group bearing an isocyanate group, or a functional group reactive crosslinking group, or combinations thereof. The curing component is used at a level generally of from about 3 to about 30 wt. parts, desirably from about 5 to about 27 wt. parts, and preferably from about 10 to about 20 wt. parts per 100 wt. parts of a functionalized addition polymer, or in the case of a castable polyurethane, in a stoichiometric amount based upon the equivalent weight of the polyol components.

Suitable curing agents include monomeric polyisocyanates such as aliphatic or aromatic diisocyanates containing from 2 to 40 carbons. Exemplary polyisocyanates include ethylene diisocyanate, trimethylene diisocyanate, hexamethylene diisocyanate, propylene-1,2-diisocyanate, ethylidene diisocyanate, cyclopentylene-1,3-diisocyanate, the 1,2-, 1,3- and 1,4-cyclohexylene diisocyanates, the 1,3- and 1,4-phenylene diisocyanates, diphenylmethane diisocyanates, polymethyleneisocyanates, the 2,4- and 2,6-toluene diisocyanates, the 1,3- and 1,4-xylylene diisocyanates, bis(4-isocyanatoethyl) carbonate, 1,8-diisocyanato-p-methane, 1-methyl-2,4-diisocyanatocyclohexane, the chlorophenylene diisocyanates, naphthalene-1,5-diisocyanate triphenylmethane-4,4', triisocyanate, isopropylbenzene-alpha-4-diisocyanate, 5,6-bicyclo[2.2.1]hept-2-ene diisocyanate, 5,6-diisocyanatobutylbicyclo[2.2.1]hept-2-ene. Exemplary commercial products are trimethylhexamethylene diisocyanate available from VEBA, heptadecyl (C17) diisocyanate, DDI 1410 an aliphatic C-36 diisocyanate available from the Henkel Corporation of Minneapolis, Minn and Isonate® 143L diisocyanate, a modified diphenylmethane diisocyanate (MDI) available from Upjohn Corp. Further urethane components are isophorone diisocyanate available from VEBA and Desmodur® N an aliphatic triisocyanate available from Mobay. Desmodur® N is more particularly defined as the reaction product of 3 moles of hexamethylene diisocyanate and water having an isocyanate equivalent weight as later defined of 191. Other adducts or prepolymers of the polyisocyanate include Desmodur® L and Mondur® CB which are the adducts of tolylene diisocyanate (TDI).

Examples of alicyclic polyisocyanates include 1,3-cyclopentene diisocyanate, 1,4-cyclohexane diisocyanate, 1,3-cyclohexane diisocyanate, 1-isocyanato-3,3,5-trimethyl-5-isocyanatomethyl-cyclohexane (isophorone diisocyanate, IPDI), 4,4'-methylenebis(cyclohexyl isocyanate), methyl-2,4-cyclohexane diisocyanate, methyl-2,6-cyclohexane diisocyanate and 1,3- or 1,4-bis(isocyanatomethyl)cyclohexane) and polyisocyanates (e.g., 1,3,5-triisocyanatocyclohexane, 1,3,5-trimethylisocyanatocyclohexane, 2-(3-isocyanatopropyl)-2,5-di(isocyanatomethyl)bicyclo(2.2.1)

heptane, 2-(3-isocyanatopropyl)-2,6-di(isocyanatomethyl) bicyclo(2.2.1)heptane, 3-(3-isocyanatopropyl)-2,5-di (isocyanatomethyl)bicyclo)2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane and 6-(2-isocyanatoethyl)-2-isocyanatomethyl-2-(3-isocyanatopropyl)-bicyclo(2.2.1) heptane).

Polymeric isocyanates are preferred crosslinking agents used for curing the emissive coating. Liquid polymeric isocyanates are more preferred and are also widely available. The term "liquid" is defined as a liquid at ambient temperature, or at elevated temperature, or a solution of polyisocyanate in a solvent for the polyisocyanate. Polyisocyanates containing from 10 to 50% reactive NCO groups which are liquid at ambient temperature, or are liquefied at up to about 70° C., or soluble in carriers or diluents are readily adapted for use in the present invention. Numerous types of liquid isocyanates are described in, for example, U.S. Pat. Nos. 3,644,457, 3,883,571, 4,229,347, 4,055,548, 4,102,833, 4,332,742, 4,448,904, 4,490,301, 4,490,302, 4,539,156, 4,539,158, 4,883,909, 4,442,235 and 4,910,333, as well as mixtures of polyol adducted polyisocyanate with MDI polymeric or modified MDI are described in U.S. Pat. Nos. 4,031,026, 4,261,852, 4,321,333, 5,240,635 and 5,246,977.

A useful liquid polyisocyanate is prepared through the reaction with various hydroxyl functional materials. These reactions can be catalyzed using an organometallic or tertiary amine. Useful hydroxy compounds are aliphatic alcohols containing about 1 to 36 and preferably 4 to 16 carbon atoms. Non-limiting examples of aliphatic alcohols are cycloaliphatic alcohols, aliphatic alcohols containing aromatic groups, aliphatic alcohols containing groups that do not react with isocyanates e.g., ether groups and halogens such as bromine and chlorine. Specific non-limiting examples of aliphatic alcohols are 2-methyl-1-propanol, cetylalcohol, cyclohexanol, 2-methoxy-ethanol, and 2-bromoethanol. Branched aliphatic alcohols having relatively molecular weights up to 150, are most preferred.

Exemplary liquid adducts of isocyanates compounds include a reaction product of solid 4,4'- and/or 2,4'-diphenylmethane diisocyanate with a branched aliphatic dihydroxy compound in a molar ratio of 0.1 to 0.3 mol of dihydroxy compound per mol of diisocyanate. Another exemplary liquid MDI-based compound is a reaction product of MDI with mixtures of monoalcohol, poly-1,2-propylene ether glycols and a triol. Another exemplary liquid polyisocyanate is the reaction product of an alcohol or thiol having an average functionality of from about 1.5 to about 4 and an average equivalent weight of at least about 500 with at least 2 equivalents per hydroxyl and/or thiol equivalent of an organic polyisocyanate wherein about 20% of the initially formed urethane or thiourethane groups are converted to allophanate and/or thioallophanate groups. Allophanate based on 4,4'- and the 2,4'-isomers of diphenylmethane diisocyanate is one useful example. It is possible to form liquid polyisocyanates from the reaction products of 4,4'-diphenylmethane diisocyanate with one or more monohydric alcohols having 4 to 16 carbon atoms at an NCO:OH equivalent ratio of 5:1 to 8.5:1, and a temperature of up to 160° C. to form urethane groups, and during or subsequent to urethane formation, converting the urethane groups in the presence of a catalyst to allophanate groups. Blended liquid isocyanate adducts are also useful. A specific example liquid polyisocyanate composition having an NCO group content of from 15 to 30% and which contains less than 90% by weight of diphenylmethane diisocyanate, comprises a blend of:

(A) 10 to 90% by weight based on 100% by weight of (A) and (B), of an MDI adduct having an NCO group content of 15 to 30%, and (B) 10 to 90% by weight based on 100% by weight of (A) and (B), of an allophanate-modified MDI, having an NCO group content of 12 to 32.5%.

Blocked isocyanates, which are known, can be adapted in the practice of forming the coatings where a heating step is used for curing the coating. Suitable blocking agents for reaction with the organic mono- or polyisocyanates are those isocyanate-reactive compounds, for example, phenols, lactams, oximes, imides, alcohols, pyrazoles, and the like. The reaction of the organic polyisocyanate and the blocking agent can be carried out by any of the methods known in the art. The reaction can be carried out in bulk or in inert solvent at temperatures of, for example, about 50–120° C. For completely-blocked isocyanates, equivalent ratios of isocyanate-reactive groups to isocyanate groups of 1/1–2/1 or higher can be utilized. Completely blocked isocyanates are preferredly used herein, but the ratio can be adjusted if only a partially-blocked polyisocyanate is desired.

The preferred monomeric isocyanates for organic solvent solution coatings of the present invention are derived from 1,6-diisocyanatohexane or 1-isocyanato-3,3,5-trimethyl-5-isocyanatomethyl-cyclohexane, and include derivatives such as an isocyanurate group-containing polyisocyanate based on 1,6-diisocyanatohexane and/or 1-isocyanato-3,3,5-trimethyl-5-isocyanatomethyl-cyclohexane, a uretdione group-containing diisocyanate based on 1,6-diisocyanatohexane and/or 1-isocyanato-3,3,5-trimethyl-5-isocyanatomethyl-cyclohexane, a urethane group-containing polyisocyanate based on 1,6-diisocyanatohexane and/or 1-isocyanato-3,3,5-trimethyl-5-isocyanatomethyl-cyclohexane, an allophonate group-containing polyisocyanate based on 1,6-diisocyanatohexane and/or 1-isocyanato-3,3,5-trimethyl-5-isocyanatomethyl-cyclohexane, a biuret group-containing polyisocyanate based on 1,6-diisocyanatohexane, bis-(6-isocyanatohexyl)-oxadiazinetrione and mixtures of these polyisocyanates.

The aqueous coating composition containing functionalized elastomer and crosslinker dispersed therein is utilized shortly after preparation. In the aqueous based coating embodiments employing polyisocyanate curing agents such as by the use of an aqueous dispersed polyisocyanate these materials are known and disclosed, for example, in U.S. Pat. No. 5,202,377. Exemplary emulsifiable polyisocyanates taught in the '377 patent comprise a hydrophilic tertiary isocyanate functional oligomer rendered hydrophilic by partially reacting with a hydrophilic polyether. Other water dispersible isocyanates suitable for aqueous-based embodiments according to the invention are known. U.S. Pat. No. 4,663,377, teaches an emulsifiable polyisocyanate mixture comprising (a) a hydrophilic isocyanate-functional oligomer and (b) a polyisocyanate. A non-limiting example is the reaction product of an aliphatic polyisocyanate with a mono- or polyhydric, non-ionic polyalkylene ether alcohol having at least one polyether chain containing at least 10 ethylene oxide units. Water dispersible isocyanates which are preferred are based upon aliphatic and alicyclic isocyanates.

Coating compositions can be formed by combining (i) the water dispersible crosslinkers, such as carbodiimide or polyisocyanate with (ii) the separate aqueous solutions, emulsions or dispersions of the functionalized elastomer polymer containing reactive functionality. Alternatively, the aqueous composition containing the functionalized elastomer can be combined with a separate aqueous dispersion containing the crosslinker such as is taught in U.S. Pat. No. 5,466,745 for the diisocyanate embodiment. The coating can be prepared by admixing the elastomer in aqueous medium with a non-aqueous, emulsifiable composition comprising an unblocked polyisocyanate crosslinking agent and a surface active isocyanate-reactive material. This alternative will introduce some volatile organic components when selecting solvents known as VOC, however there are other solvent diluents that can be used that are not considered VOC. A known procedure can be followed by (i) admixing an unblocked hydrophobic isocyanate and diluent with a mixture of a surface active isocyanate-reactive material and water to form a water-in-oil emulsion, then (ii) adding this emulsion to the aqueous medium containing the elastomer in proportions and under conditions to invert the isocyanate emulsion into an oil-in-water emulsion.

Polyisocyanates are also discussed in the following U.S. Pat. No. 4,553,377, and citing U.S. Pat. Nos. 6,221,995; 6,201,060; 6,153,690; 6,143,132; 6,139,675; 6,126,777; 6,087,439; 6,080,812; 6,051,634; 6,034,169; 6,008,289; 6,007,619 and 5,998,539.

Specific examples of commercial diisocyanates that may be mentioned, are 1,6-hexane diisocyanate (commercially available, for example, under the trade designation HMDI from Bayer), isophorone diisocyanate (commercially available, for example, under the trade designation IPDI from Huls), tetramethylxylene diisocyanate (commercially available, for example, under the trade designation m-TMXDI from Cytec), 2-methyl-1,5-pentane diisocyanate, 2,2,4-trimethyl-1,6-hexane diisocyanate, 1,12-dodecane diisocyanate and methylene bis(4-cyclohexyl isocyanate) (commercially available, for example, Desmodur® W from Bayer), and higher functional isocyanates such as a biuret of 1,6-hexane diisocyanate (commercially available, for example, as Desmodur® N from Bayer), an isocyanurate of 1,6-hexane diisocyanate (commercially available, for example, as Desmodur® N-3390 from Bayer), an isocyanurate of isophorone diisocyanate (commercially available, for example, as Desmodur® Z-4370 from Bayer), a reaction product of tetramethylxylene diisocyanate and trimethylol propane (commercially available, for example, as Cythane® 3160 from Cytec), and a reaction product of one mole of trimethylol propane and 3 moles of toluene diisocyante (commercially available, for example, as Desmodur® L from Bayer). The amount of di- or polyisocyanate included should be from 3 to 30 phr. Preferably the amount is from 8 to 15 phr.

Another class of crosslinking component which can be employed to cure the functionalized film former and form siloxane crosslinking, are the various known organosilanes. A preferred organosilane is an isocyanatosilane which contain an isocyanate group and one or more groups capable of forming crosslinks with the silane and/or film former, such as a hydrolyzable group, hydrazidyl, thio, halogen, hydroxy, alkoxy, and other co-reactive substituents on the group bonded to silicon through a carbon atom, such as acyloxy, mercapto, amino, phenolic, and glycido. The silanes may contain a vinyl group; a vinyl-containing group; another isocyanate group; another isocyanate-containing group; an ureido group; an ureido-containing group; an imidazole group; or an imidazole-containing group. Such compounds are known in the art.

The reactive silane curing agents used herein will provide ambient curable emissive coatings in amounts on a weight basis of from 25 to 150 parts of silane curing agent per 100 wt. parts of film former and wherein the film former contains no more than 10 wt. % of functional groups which cure with the curing agent. The silane curing agents can be monomeric, tetravalent silanes or bis, or oligo-derivatives containing at least two silicone bonded groups, of the same or different coreactive groups depending upon the chosen functional groups on the film forming polymer. One such type of curing group is a hydrolyzable group, or group that interacts with the acidic or basic functional groups on the film former polymer. The silicone bonded group is an active hydrogen bearing group coreactive with the functional group on the film former polymer, or the silicone bonded group is coreactive with active hydrogen bearing groups on the film former polymer. These organosilane compounds are known and available from a number of commercial sources.

Representative preferred hydroxyalkyl group-containing silanes have the general structure:

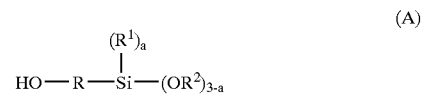

(A)

wherein R is a divalent aliphatic, cycloaliphatic or aromatic radical having from 1 to 20 carbon atoms, and is preferably an alkylene radical having from 1 to 9, most preferably 2 to 4 carbon atoms; $R^1$ is a monovalent aliphatic, cycloaliphatic or aromatic radical having from 1 to 20 carbon atoms, and is preferably selected from the group consisting of alkyl radicals having from 1 to 4 carbon atoms, cycloalkyl radicals having from 4 to 7 ring carbon atoms, and aryl radicals having 6, 10, or 14 nuclear carbon atoms and optionally one or more substituent alkyl groups having from 1 to 4 carbon atoms; $R^2$ is a monovalent aliphatic, cycloaliphatic or aromatic organic radical containing from 1 to 8 carbon atoms, and is preferably selected from the group consisting of methyl, ethyl, propyl and butyl, and $R^3$—O—$R^4$, and where $R^3$ is an alkylene group having from 1 to 4 carbon atoms (methyl, ethyl, propyl, butyl) —C=(O)—R, and $R^4$ is an alkyl group having from 1 to 4 carbon atoms; and a is zero or 1, preferably zero.

Aminofunctional silanes are preferred for curing carboxyfunctional film formers and include those having the structure (B)

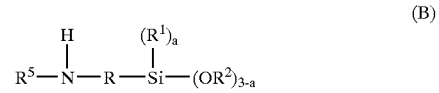

(B)

wherein R, $R^1$, $R^2$ and a are as previously defined for (A); and $R^5$ is selected from the group consisting of hydrogen, monovalent aliphatic radicals having from 1 to 8 carbon atoms, monovalent cycloaliphatic radicals having from 4 to 7 ring carbon atoms, phenyl, alkaryl radicals having 6 nuclear carbon atoms and containing one or more substituent alkyl groups having from 1 to 4 carbon atoms, and the group $R^7$—NH—$R^6$—, wherein $R^6$ is selected from the group consisting of divalent aliphatic, cycloaliphatic and aromatic radicals having from 1 to 20 carbons, there being preferably at least two carbon atoms separating any pair of nitrogen atoms, with $R^6$ being preferably an alkylene group of 2 to 9 carbon atoms; and $R^7$ being the same as $R^5$ and preferably is hydrogen.

Mercaptofunctional Silanes Include Those Having the Structure (C)

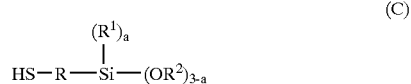

wherein R, $R^1$, $R^2$ and a are as previously defined for (A);

Organosilane compounds useful herein include those contain as a substituent on the Si atom an organic chain having from 1 to 20 carbon atoms, at least one extractable hydrogen atom which is preferably attached to a functional group separated from the silicon atom by a chain of at least 3 interconnected carbon atoms.

The preferred organosilane is an isocyanatosilane. Examples of commercially available isocyanato-alkoxy silanes which are suitable herein include gamma-isocyanatopropyltrimethoxysilane, available as Silquest® Y-5187 from OSi Specialties Group, a Witco company (OSi), and gamma-isocyanatopropyltriethoxysilane, available as Silquest® A-1310, also from OSi.

Representative names and pseudonyms for organosilanes containing active hydrogen groups are hydroxypropyltrimethoxysilane, hydroxypropyltriethoxysilane, hydroxybutyltrimethoxysilane, γ-aminopropyltrimethoxysilane γ-aminopropyltriethoxysilane, methylaminopropyltrimethoxysilane, γ-aminopropyltripropoxysilane, γ-aminoisobutyltriethoxysilane, γ-aminopropylmethyldiethoxysilane, γ-aminopropylethyldiethoxysilane, γ-aminopropylphenyldiethoxysilane, δ-aminobutyltriethoxysilane, δ-aminobutylmethyldiethoxysilane, δ-aminobutylethyldiethoxysilane, γ-aminoisobutylmethyidiethoxysilane, N-methyl-γ-aminopropyltriethoxysilane, N-phenyl-γ-aminoisobutylmethyldiethoxysilane, N-ethyl-δ-aminobutyltriethoxysilane, N-γ-aminopropyl-γ-aminopropyltriethoxysilane, N-β-aminoethyl-γ-aminoisobutyltriethoxysilane, N-γ-aminopropyl-δ-aminobutyltriethoxysilane, N-aminohexyl-γ-aminoisobutylmethyldiethoxysilane, methylaminopropyltriethoxysilane, γ-aminopropylmethoxydiethoxysilane, 3-aminopropyl triethoxysilane, 3-aminopropyl methyldiethoxysilane, 3-ureidopropyl triethoxysilane, 3-ureidopropyl trimethoxysilane, γ- or 3-aminopropyl trimethoxysilane, 3-aminopropyl tris(2-methoxy-ethoxy-ethoxy)silane, N-methyl-3-aminopropyl trimethoxysilane, N-aminoethyl-3-aminopropyl-trimethoxysilane, diaminosilane, N-aminoethyl-3-aminopropyl methyldimethoxysilane, triaminopropyl-trimethoxysilane, 3-4,5-dihydroimidazolepropyl trimethoxysilane, N-β-(aminoethyl)-.γ-aminopropyl trimethoxysilane, γ- or 3-aminopropyl triethoxysilane, N-phenyl-γ-aminopropyl trimethoxysilane, γ-(2-aminoethyl)aminopropyl methyldimethoxysilane, N-β(N-vinylbenzylaminoethyl)-γ-aminopropyl trimethoxysilane hydrochloride; N,N-bis(trimethylsilyl)urea, N-trimethylsilylacetamide, dimethyltrimethylsilylamine, diethyltrimethylsilylamine, trimethylsilylimidazole, and N-trimethylsilylphenylurea.

Examples of other organofunctional silanes are methyltrimethoxysilane, ethyltrimethoxysilane, propyltrimethoxysilane, butyltrimethoxysilane, isobutyltrimethoxysilane, hexyltrimethoxysilane, octyltrimethoxysilane, decyltrimethoxysilane, cyclohexyltrimethoxysilane, cyclohexylmethyltrimethoxysilane, 3-methacryloxypropyltrimethoxysilane, vinyltrimethoxysilane, allyltrimethoxysilane, dimethyidimethoxysilane, 2-(3-cyclohexenyl) ethyltrimethoxysilane, 3-cyanopropyltrimethoxysilane, 3-chloropropyltrimethoxysilane, 2-chloroethyltrimethoxysilane, phenethyltrimethoxysilane, 3-mercaptopropyltrimethoxysilane, phenyltrimethoxysilane, 3-isocyanopropyltrimethoxysilane, N-(2-aminoethyl)-3-aminopropyltrimethoxysilane, 4-(2-aminoethylaminomethyl)phenethyltrimethoxysilane, chloromethyltriethoxysilane, 2-chloroethyltriethoxysilane, 3-chloropropyltriethoxysilane, phenyltriethoxysilane, ethyltriethoxysilane, propyltriethoxysilane, butyltriethoxysilane, isobutyltriethoxysilane, hexyltriethoxysilane, octyltriethoxysilane, decyltriethoxysilane, cyclohexyltriethoxysilane, cyclohexylmethyltriethoxysilane, 3-methacryloxypropyltriethoxysilane, vinyltriethoxysilane, allyltriethoxysilane, 2-(3-cyclohexenyl)ethyltriethoxysilane, 3-cyanopropyltriethoxysilane, 3-methacrylamidopropyltriethoxysilane, 3-methoxypropyltrimethoxysilane, 3-ethoxypropyltrimethoxysilane, 3-propoxypropyltrimethoxysilane, 3-methoxyethyltrimethoxysilane, 3-ethoxyethyltrimethoxysilane, 3-propoxyethyltrimethoxysilane, 2-[methoxy(polyethyleneoxy)propyl]heptamethyltrisiloxane, [methoxy(polyethyleneoxy)propyl]trimethoxysilane, [methoxy(polyethyleneoxy)ethyl]trimethoxysilane, [methoxy(polyethyleneoxy)propyl]triethoxysilane, [methoxy(polyethyleneoxy)ethyl]triethoxysilane.

Also suitable as the curing agent are hydroxy silanes having an (Si—OH bond), optionally as either partially neutralized silanediols or silanetriols. The silanols preferably contain at least one nucleophile connected to silicon through a first connecting group. As used herein, the term "partially neutralized" means that at least some of the silanol groups are in the form of mono-, di-, or tribasic alkali metal salts, more particularly lithium, sodium, or potassium salts. The extent of neutralization is that amount sufficient to inhibit no more than 50% of the condensation of condensable groups of the silanol, but provide enough interaction between the silane with the film forming polymer to form linking bridges but not gel the film forming polymer when part A and part B are combined. The curing agent can be a partially neutralized silanol represented by the structure D:

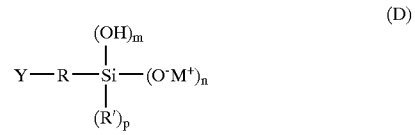

where n is 1, 2, or 3; m is 0, 1, or 2; p is 0 or 1, preferably 0, with the proviso that m+n+p=3; R is the first connecting group; $M^+$ is an alkali salt forming metal; Y is a group that contains a nucleophilic moiety; and R' is a linear, branched, or cyclic $C_1$–$C_8$-alkyl group, preferably methyl or ethyl, more preferably methyl. Connecting group R in D is preferably a linear, branched, or cyclic alkylene group, or arylene group, or a combination thereof, and may contain one or more heteroatoms, which may themselves be nucleophilic. More preferably, X is a $C_2$–$C_6$-alkylene group or —R'—NH—R'—, where each R' is independently a $C_2$–$C_4$-alkylene group.

Examples of suitable nucleophile groups include amines, phenols, mercaptans, and carboxylates, with primary and secondary amines and mercaptans being preferred, primary and secondary amines being more preferred, and primary amine being most preferred. A specific example of partially neutralized aminosilanetriols are typically potassium or sodium salts of 3-aminopropyl-silane triol and N-(2-aminoethyl)-3-aminopropyl-silanetriol.

The more preferred organosilane curing agent will have at least one silicone bonded group that contains a substituted or unsubstituted alkylamino group and alkoxy groups bonded to silicone capable of forming network crosslinks on condensation of the organosilane. The amine group may be in the free unblocked form or as a blocked amino group. Blocking of the amine group can be provided by reaction with methyl isobutyl ketone or methyl amyl ketone. The preferred groups reactive with the silane compound are preferably a $C_1$–$C_4$ alkoxy groups. Examples of curing components include but are not limited within the class of aminosilanes are aminopropyltriethoxy or -methoxy silane and aminoethylaminopropyltriethoxy or -methoxy silane, 3-aminopropyl triethoxy silane, 3-aminopropyl trimethoxy silane, 3-aminopropyl methyl dimethoxysilane or 3-aminopropyl methyl diethoxy silane, a silane containing primary secondary amines such as N-(2-aminoethyl)-3-aminopropyl trimethoxy silane, secondary amines such as N-methyl- or N-phenyl-3-aminopropyl trimethoxy silane, condensed aminoalkyl silanes such as bis(3-aminopropyl) tetramethoxy or tetraethoxy disiloxane, $NH_2(CH_2)_3$—Si$(OCH_3)_2$—O—$(CH_3O)_2$ Si—$(CH_2)_3$ $NH_2$, polyglycolether-modified aminosilanes such as that sold under the Trademark "Dynasylan 121" and triamino functional propyl trimethoxy silanes such as "Dynasylan TRIAMO" available from Huls A G. Similar silanes having two or three silicon atoms can be used.

A preferred combination of an aminoalkyl trialkoxy silane and a fluoroalkyl trialkoxy silane exhibits improved color stability (non-yellowing) on heat aging of the cured coating.

Fluoroalkyl silanes useful in admixture with another silane containing active hydrogens, and most preferably in mixture with an aminosilane curing agent in the invention generally have a formula E:

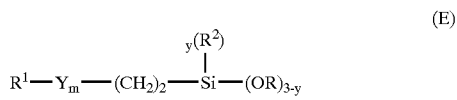

(E)

where $R^1$ is a monofluoridated, oligofluoridated, or perfluoridated alkyl group with 1 to 20 C atoms or a monofluoridated, oligofluoridated, or perfluoridated aryl group, Y is a $CH_2$, O, or S group, $R^2$ is a linear, branched, or cyclic alkyl group with 1 to 8 C atoms or an aryl group, and R is a linear, branched, or cyclic alkyl group with 1 to 8 C atoms or an aryl group, y is 0 or 1, and m is 0 or 1, Specific examples of some of the fluoroalkyl silanes as representative include 3,3,3-trifluoropropyl trimethoxy silane, 3,3,3-trifluoropropyl methyl dimethoxy silane, 3,3,3-trifluoropropyl methyl dimethoxy silane, 3,3,3-trifluoropropyl cyclohexyl dimethoxy silane, 3,3,3-trifluoropropyl phenyl diethoxy silane, 3,3,3-trifluoropropyl triethoxy silane, 3,3,3,2,2-pentafluoropropyl methyl dimethoxy silane, 3,3,3-trifluoropropyloxyethyl trimethoxy silane, 3,3,3-trifluoropropyl mercaptoethyl trimethoxy silane, 3,3,3-trifluoropropyloxyethyl methyl dimethoxy silane, as well as, in particular, tridecafluoro-1,1,2,2-tetrahydrooctyl trimethoxy silane, tridecafluoro-1,1,2,2-tetrahydrooctyl triethoxy silane, and heptadecatrifluorodecyl trimethoxysilane $CF_3(CF_2)_7CH_2CH_2Si(OCH_3)$.

Amino resins utilized in amounts of less than 10 wt. % on weight of the film former can be used as curing components where acid catalyzed heated conditions can be used. The amino resins refer to any material in the broad class of materials based on the reaction of formaldehyde with urea, melamine, benzoguanamine, or acetylguanamine, and the like. Such compounds are well known and described in, for example, "Kirk-Othmer Encyclopedia of Chemical Technology", $3^{rd}$ Ed., Volume 2, pages 440–469, Wiley-Interscience, 1978. Representative examples of such compounds include methylolated melamines; benzoguanamines; acetylguanamines; methylolated ureas such as dimethylolurea, dimethylolethyleneurea, tetramethylolacetylene urea, and dimethylolpropyleneurea; dimethylol derivatives of tetrahydro-5-alkyl-S-triazone; glyoxal resins such as dimethyloldihydroxyethyleneurea (DMDHEU) and tetramethylolglycoluril; methylated derivatives of any of the foregoing; and uron resins such as N,N'-bis(methoxymethyl) uron. Methylolacrylamide and methylolmethacrylamide are also included within the class of amino resins. Although the selection of particular amino resin is based on at least several considerations of coast, availability, ease of incorporation, cure kinetics, the choice is not critical in the practice of the invention. It is preferable to use water insoluble amino resins in aqueous compositions of the invention because they will have a longer shelf life.

Curing agents containing at least two ethylenically unsaturated double bonds each activated by an adjacent electron-withdrawing groups and capable of Michael addition when the functional groups on the film forming polymer are suitable and known, e.g. maleic dianhydrides and fumaric dianhydrides.

Examples of other suitable curing components are the carbodiimides. The polyfunctional carbodiimides exhibit suitable reactivity with functional group-containing elastomers used in the present invention. N-acylurea groups form between carboxylic sites. Carbodiimide linkages can also be formed between a carboxyl group and other functional groups contained in the functionalized elastomer, such as hydrazidyl, amino and/or thiol groups. Polyfunctional carbodiimides can be obtained from polyisocyanates using phospholine oxide as catalyst as is described, for example, in U.S. Pat. No. 2,941,966. Water dispersible carbodiimides can be formed by the addition of hydrophilic polyamines or polyols and carbodiimides containing isocyanate groups, by reacting the reactants in the presence of from 0.01 to 3% by weight, based on the reaction mixture, of a Sn catalyst as is taught in U.S. Pat. No. 4,321,394. The re-arrangement products can be produced at temperatures as low as 25–150° C., using such catalysts as tin(II)acetate or dibutyl tin diacetate. The hydroxyl-bearing compounds are preferred hydrophilic groups and include polyols containing from 2 to 8 hydroxyl groups, and especially those having a molecular weight in the range from 800 to 10,000. Exemplary polymeric polyols include for example, polyesters, polyethers, polythioethers, polyacetals. Hydrophilic polyfunctional carbodiimides containing hydrolyzable silane groups with polyfunctional carbodiimides, are also suitable, especially for aqueous coating embodiments in accordance with the invention as are taught in U.S. Pat. No. 5,258,481.

Examples of suitable carbodiimide compounds used in the present invention are N,N'-dicyclohexylcarbodiimide, 1-ethyl-3-(3'-dimethylaminopropyl)carbodiimide, N-ethyl-N'-(3-dimethylaminopropyl)-carbodiimide, N'-diisopropyl-carbodiimide, N'N'-di-tert-butylcarbodiimide 1-cyclohexyl-3-(4-diethylaminocyclohexyl)carbodiimide, 1,3-di-(4-diethylaminocyclo-hexyl)carbodiimide, 1-cyclohexyl-3-(diethylaminoethyl)carbodiimide, 1-cyclohexyl-1-cyclohexyl-3-(2-morphonlinyl-(4)-ethyl)carbodiimide 1-cyclohexyl-3-(4-diethyl-aminocyclohexyl)carbodiimide, and the like. There are a variety of commercially available solvent soluble and water dispersible carbodiimides. Carbodiimide compounds are commercially available from Union Carbide Corp., USA under the UCARLNK® designation.

(C) Carrier Liquid

The coatings are applied in a carrier liquid. A carrier liquid can be either one or more organic solvents, or water, predominantly, although minor amounts of one can be contained in the other for introducing materials, co-solvating, dispersing, such that, the carrier can comprise a minor proportion of solvent, or co-solvent along with a major proportion of water, as an example. The coating compositions of the present invention are preferably applied to an elastomeric substrate in the form of a solution using one or more organic solvent carriers. For the purposes of the present invention, the term solvent can broadly be defined as a carrier for the other components of the composition, wherein the solvent is capable of dissolving or maintaining the component in a substantially dispersed state or mixture. Preferred solvents include water based latexes and/or non-HAP (Hazardous Air Pollutant) or non-VOC, or non-HAP, non-VOC organic solvents.

Non-HAP solvents include methyl acetate, n-butyl acetate, t-butyl acetate, acetone, ethyl acetate, isopropyl acetate, isobutyl acetate, tetrahydrofuran, n-methyl pyrrolidone, aliphatic hydrocarbons such as heptane, dimethylformamide, diisobutyl ketone (DIBK), methyl isoamyl ketone, monochlorotoluene, para-chlorobenzotrifluoride (PCBTF), and vm&p naphtha. A combination of acetone and DIBK is the preferred non-HAP solvent mixture. Acetone, methyl acetate, and para-chlorobenzotrifluoride (PCBTF) alone or in any combination are the preferred solvents for HAP, and VOC compliant coatings. Among the HAP solvents which are photochemically reactive in the atmosphere are hexane, xylene, toluene, MEK, and MIBK. Toluene, xylene, MEK and MIBK are the preferred solvents when HAP and VOC compliance is not critical.

One such category of solvent useful as the carrier vehicle for the coating composition of the present invention can essentially be any organic solvent or other material known to dissolve acrylonitrile-butadiene copolymers. Examples of organic solvents useful in the present invention include ketones such as methylethyl ketone, methylisobutyl ketone, and diisobutyl ketone; acetates such as butyl acetate; toluene, xylene and their derivatives; nitropropane; and ethylene dichloride.

The organic solvent of solvent-based embodiments according to the invention is typically utilized at about 70% to about 97% by weight of the total coating composition (solvent, functionalized HNBR, curing component, thermal conductive particles and optional components. Preferably solvent comprises from about 85% by weight to 95% by weight. Accordingly the coating composition has a total nonvolatile solids content ranging from about 3 to about 30% percent, and preferably from about 5 to about 15%.

Often, it is highly desirable and environmentally advantageous to utilize water as the carrier. The invention is enabled by utilization of latex polymers prepared by emulsion polymerization as well as aqueous converted dispersions of polymer solids, as follows. A solid bulk elastomer film former can be converted to a dispersion by dissolving in a suitable organic solvent or mixture of organic solvents. Examples of organic solvents include, but are not limited to, any of the organic solvents listed above, and preferably methyl ethyl ketone, methyl isobutyl ketone, and methyl isopropyl ketone. The solvent, which can be a solvent mixture, preferably has a low water-solubility and optionally forms an azeotrope with water at a solvent content of more than about 50%, or a boiling point below about 95° C., and at least below the boiling point of water. The polymer solution as continuous phase is treated by introducing a surfactant, followed by addition of water. Mixing techniques known in the art can employ anionic, cationic, nonionic, or amphoteric emulsifiers, including mixtures. The aqueous organic solvent mixture is mixed under high shear and a phase inversion takes place wherein water become the continuous phase. The solvent is stripped off, typically by heating below the boiling point of water, and generally below 95° C. The curing component and additional components, if any, are added to the latex, preferably shortly before coating.

An example of a further suitable procedure for preparing an aqueous based latex of a X-HNBR rubber is described in U.S. Pat. No. 4,826,721, herein incorporated by reference. The rubber component is dissolved in a solvent such as 3-chloro-toluene. An emulsifier such as abietic (rosin type) acid derivatives and dehydro abietic acid derivatives is also added. Water was also added to the composition. The composition was emulsified and subsequently the solvent is freed utilizing rotary evaporation, preferably under reduced pressure. X-HNBR latex is also available from Nippon Zeon of Japan. The aqueous latex coating compositions employed according to the present invention generally have solids content 30 to 50 percent by weight.

The coating compositions of the present invention cure to form substantially clear or transparent matrix elastomer. The transparency is essential in order to provide transmission of incident radiant heat to the underlying thermally conductive metallic particles, which emit heat back through the coating surface. Rather than conducting heat into the coated substrate, a surprising level of heat reflectance was observed in monitoring the temperature below the surface of the article. This emissive property is observed even for low surface area shaped substrates, although the reduction in substrate temperature is expected to be also directly proportional to the ratio of surface area to volume of the underlying shaped article.

At a low level, optional tinting compounds such as dyes or organic pigments can be incorporated. Colored coatings provided in accordance with the invention provide outstanding color and coating physical properties for long-term weathering uses. An extensive list of organic pigments suitable for adding to emissive for tinting can be found in the current volume of the Rubber Blue Book, published by Lippincott & Peto Publications and well known to those versed in the art of formulating elastomers. Organic colors as typically used, can be incorporated for different coloring effects. The non-pigmented organic colorants leave the coating transparent but with a color or shade.

Inorganic metal oxide pigments, especially micronized (diameters of 0.5 microns or less) can be included at up to 2.0 weight parts per 100 parts by weight of elastomer film former, e.g., titanium is possible without interfering substantially with the emissive properties of the coating can be used. Pigments can be mixed into the solid polymer using a Banbury mixer or a two-roll mill. The rubber containing the pigment is then dissolved in the solvent. Alternatively, the pigment may be dispersed in the liquid solvent and then added to the solvated polymer blend. This is the preferred method for adding aluminum flakes. An exemplary solvent dispersion of aluminum flake comprises 50 parts of aluminum flake and a blend of 55 parts ethylene glycol and 45 parts ethylene glycol monobutyl ether.

Metal Conductor Particles

The essential component in the emissive coating of the present invention requires a minimum surface coverage in the coating in order to provide effective emissive properties.

The term "particles" is inclusive of irregular shapes, granular shapes, leafy shapes or complex assorted shapes. Heat reflective pigments are available in many forms, as fine-grain solids, or leafs, in dry powder form or dispersion or as pastes in solvent or plasticizer, e.g., mineral spirit. Flakes derived from finely divided vapor deposited films are suitable. Thermally conductive metal particles include finely divided irregular particles, or leafy particles of brass, titanium, silver, or aluminum. Included are metal-coated particles/metal coated films which are preferably introduced as leafing or non-leafing aluminum flakes. Leafing flakes such as leafing aluminum particles or flakes are available commercially with a coating, e.g., stearic acid, and when applied to a surface, the particles orient in an interleaved structure parallel to the surface of the finished emissive coating. Metallic particles of a particle size average of 5 to 25 $\mu$m employed at a level of at 10 to 100 parts by weight per 100 parts by weight of film forming elastomer when cast in a thin film of 5 mils (0.01 cm.) provide effective radiant energy emmissivity and yet provide sufficient flex-fatigue resistance in the coating so as to not undergo stress-cracking. Stress cracking causes loss in emissive performance. Metal particles having an average particle size of 25 to 100 microns must be employed at a level of at least 20 parts and up to 150 weight parts per 100 parts by weight of film former to provide sufficient radiant heat emissivity without stress cracking. Aluminum flakes are typically available in an average particle size of less than about 300 microns in diameter. The maximum diameter of the metallic particles with high aspect ratio is rather indeterminate with two major dimensions (width and length) and one minor dimension (thickness) which may be multiples or orders of magnitude smaller than the two major dimensions. Reliance is on supplier specifications to characterize the average particle size. Preferably, aluminum flakes have a number average particle size of about 1 to about 100 microns, more preferably between 5 and 60 microns, and still more preferably between 10 and 45 microns. Preferred aluminum particles are flakes of a size such that 99.9% pass through 325 mesh screen, i.e., a diameter of less than about 45 microns, most preferably from 8 and 35 and especially from 10 and 20 microns in average particle size.

The leafing metal flakes can be introduced as a dry flake rather than the paste of aluminum and solvents having at least about 40 wt-% aluminum flake and more preferably about 60 to 70 wt-% aluminum flake as described in U.S. Pat. No. 5,045,114. The metal particles are employed in the aforementioned quantity in relation to the film forming polymer in order to exhibit emissive performance. The preferred amount of metal particles is in a range of from 15 to 30 parts by weight per 100 parts by weight of film former. This proportion of includes consideration of surface additives, e.g., surfactants, or adhesion promoter, e.g., silanes.

The coating composition of the present invention may contain other optional ingredients such as, a nitroso compound, ZnO, and QDO, maleimides, antioxidants and sub-micron sized particulate reinforcements. The total amount of optional additive shoud not exceed about 15 parts per 100 parts of the functionalized film forming polymer. Specific examples of particulate reinforcements useful in the invention include precipitated silica, and fumed silica. Flatting agents, which are well known to the art, can be utilized in effective amounts to control the gloss of the cured coating and include, but are not limited to, silicates. Optional silica having a particle size less than 700 nanometers, more typically from 20 to 200 nanometers. Sub-micron-sized particulate reinforcement does not affect the transparency of the film former to any noticeable effect on reducing the emissive properties of the coating and may be utilized in various amounts not to exceed 20 parts per 100 parts by weight of the functionalized elastomer film forming polymer.

The coating composition may be prepared by simply mixing the ingredients by hand with a spatula or the like or by mechanical mixing or shaking. The coating composition is typically applied to an elastomeric material and/or other substrate by dipping, spraying, wiping, brushing or the like, after which the coating is allowed to dry for a period of time typically ranging from about 30 minutes to 2 hours, preferably from about 45 minutes to 1 hour. The coating composition is typically applied to form a dry layer on the substrate having a thickness ranging from about 0.1 to 5 mils (2.54 $\mu$m–127 $\mu$m), preferably from about 0.5 to 1.5 mils (12.7–38.1 $\mu$m). In the cured state unsupported or supported coating films can elongate at least 100% of the original length, and preferably can elongate up to 200%, more preferably up to 300% without cracking.

The coating compositions can be applied to substrates which have been vulcanized or to un-vulcanized or uncured substrates and co-cured therewith, at elevated temperatures if necessary.

The gloss of the cured coated substrate which does not significantly reduce transparency therefore can be manipulated at least by utilizing different amounts of solvent, controlling the evaporation rate and/or incorporating various known pigments and/or flatting agents. It has been found that with respect to organic carrier-based coatings, a relatively quick or rapid evaporation produces a flatter or less glossy surface than a more prolonged cure rate. The cured coatings of the present invention can impart to a substrate a gloss generally from about 3% to about 70% at a 60 degree angle when measured using a Byk-Gardner Micro TRI Glossmeter per ASTM D-523 and D-2457. The desirability on the gloss will vary according to the use, with camouflage colors being desirable at low gloss levels and decorative coatings being desired at medium to high gloss levels. For example, the coating compositions can be beneficially utilized to impart an aesthetically pleasing appearance to a tire sidewall, such as a "metallic wet" look. The resulting gloss of the cured coating can be effectively controlled to produce a desired surface, finish, or appearance on a substrate.

The coating composition will cure within about 2 to 24 hours in ambient air conditions, including room temperature. The cure can be accelerated by exposing the coating to elevated temperatures, but this is not required.

(D) Flexible Substrates

Coating compositions of the present invention are able to coat flexible substrates, such as the myriad molded elastomeric materials in pre-cured or post-cured condition. The coating is applied to the entire exterior surface thereof. The coating compositions can be applied to shaped or molded articles such as those made from thermoplastic vulcanizates or thermosettable rubber. The coating composition of the present invention is particularly suitable for coating cured rubber engine mounting devices which are comprised of vulcanized elastomeric parts that have been bonded to metal parts.

An engine mount structure, comprises a base layer formed from natural rubber, optionally bonded to and/or formed around one or more metal mounting members such as for securing with bolts to the vehicle structure and the engine housing. The base layer is susceptible to degradation caused by heat, oxidation, ozone attack or ultraviolet radiation. The emissive coating is sprayed or dipped and conforms to the contours of the mount where applied and allowed to fully cured after being applied to said base layer, wherein the emissive coating is applied to the base layer such that the operating or equilibrium temperature internal to the rubber portion of the mount, when placed in service, is reduced by at least 30° F. (16° C.), more preferably at least 50° F. (27° C.), and most preferably at least 75° F. (41.6° C.).

The preferred emissive coating compositions are particularly effective as coatings on cured elastomers that have limited oil and solvent resistance. Such elastomers include natural rubber, styrene butadiene rubber, polybutadiene rubber, ethylene propylene and ethylene propylene diene rubber, polyisobutylene-isoprene rubber, polychloroprene, low acrylonitrile content (<35 wt. %) nitrile-butadiene rubbers; and the like. The coating composition may also be used over rigid substrates such as metals, plastics, ceramics, and composites. Examples of thermoplastic and/or thermosetting substrates include, but are not limited to, flexible polyvinyl chloride, PVC-elastomer alloys, like PVC-Nitrile; adhesion promoted or modified polyolefins such as compounded polyethylene and polypropylene; flexible polyesters like PBT, flexible or rubbery polyurethane-, polyurea-, polyurea-rim; fiber reinforced flexible plastics, and cellular vinyl and polyurethane. The coatings are particularly useful for bonded rubber mounts which contain both elastomeric and rigid components. A substrate is considered flexible if the elongation of the substrate material is greater than 25%.

Further examples of commonly available flexible substrates which can be coated with the compositions of the present invention include, but are not limited to, tires, bumpers, wiper blades, vibration isolators, rubber mounts, rail track pad fasteners, helicopter rotor bearings, chassis mounts, wiper frames, gaskets, heels, shoe soles, printing rolls, belts, hoses, fuel tanks, rubber moldings, TPO or TPE molding, facias, and flexible engineered rubber products. In addition to emissive properties the coatings provide improved resistance to oils, solvents, oxygen, ozone and UV light.

The coating composition of the present invention can be applied to one or all sides of a substrate. It is to be understood that occasionally it may be effective for heat dissipation to only coat one side or surface of a substrate which is oriented to a heat source. As stated above, it is advantageous to coat the surfaces of a substrate which are exposed to light, air, oils, and solvents. Obviously, surfaces of a substrate which are not in contact with the same do not necessarily have to be coated. The coating preferably is a continuous coating in film form which completely covers the intended surface of a substrate. The coating is of the aforementioned thickness to cover the desired surface to be protected, but not overly thick to materially alter the mechanical properties of the substrate.

Tire(s) can be coated with a composition of the present invention. It is to be understood that the coating compositions can be utilized to cover the entire outside and/or inside surfaces of a tire. Furthermore, it may also be desired to only coat certain portions of a tire such as the sidewall, tread or the like. Tires generally comprise a tread, a pair of sidewalls which abut the tread in the shoulder regions, a fabric reinforced rubber carcass of generally toroidal shape and one or more plies for supporting the tread and sidewalls, and a circumferential fabric reinforced belt of one or more plies, positioned between the carcass and the tread. Tires generally also include a pair of circumferentially extending bundled wire beads which are substantially inextensible, wherein the carcass extends from one bead to the other and the side edges may be wrapped around the beads as shown. Tires may also include a pair of apex components, preferably of a stiff construction and having a triangular cross section in the region of the beads, and a pair of stiff chaffer components which are positioned in the bead region. The above listed components of the tire are conventional, but it is to be understood that additional parts not listed may be included and parts listed above may be omitted. Tires may also include an inner liner which can be applied to the inner surface of the tire to improve air impermeability. Any tire component or components can be coated with the compositions of the present invention. Preferably, the tread and/or sidewall regions are coated.

Preparation of Elastomer Substrate for Coating

The elastomeric surface or substrate to be coated may optionally be pretreated with a chlorinating agent such as sodium hypochlorite and hydrochloric acid. The use of various chlorinating agents to prepare elastomeric materials for application of a coating composition is well known in the art. One example of a chlorinating agent is commercially available from Lord Corporation under the CHEMLOK® mark such as 7701. The chlorinating agent may be applied to the surface of the elastomeric material by brushing, dipping, spraying, wiping, or the like, after which the chlorinating agent is allowed to dry. Chlorinating agents tend to be very volatile and typically dry within a matter of seconds or minutes.

The coating compositions of the present invention have the surprising ability to form a tenacious bond to flexible elastomeric parts alone, and also to metal components where these are affixed adjacent to the elastomeric part. It is desirable to provide the elastomeric coating over both elastomer and metal so that the boundary between the elastomer and metal can be adequately protected by the coating composition. The present invention is therefore distinguished from many traditional protective coating compositions which only have the ability to bond to one type of substrate to be protected.

The following examples are provided for purposes of illustrating the present invention and shall not be constructed to limit the scope of the invention which is defined by the claims.

EXAMPLE 1

The following example was prepared using Zetpol 2220, an X-HNBR polymer produced by Zeon Chemical having a 36% acrylonitrile content with 5 mol percent unsaturation. A suitable commercial substitute is Therban® KA 8889.

An elastomer coating solution was prepared as follows:

| Ingredient | Description | PHR |
| --- | --- | --- |
| X-HNBR | carboxylated hydrogenated nitrile-butadiene | 100.0 |

This formulation was dissolved in Methyl Isobutyl Ketone (MIBK, CAS No. 108-10-1) to a solids content of 12.0% by weight.

To 40 grams of solution, of bis-[isocyanatopheny] methane (diisocyanate), 53% in xylene was added at 0.1 g, 0.5 g and 1.0 g levels. At 0.1 g. diisocyanate level, the solution cured at room temperature in less than 16 hours. At 0.5 g, the solution cured in 30 minutes.

To 40 grams of solution, 3-isocyanatopropyltriethoxy-silane, CAS #24801-88-5, was added at 0.3, 0.7, 1.0, and 1.3 gram quantities. At all levels, the coating composition starts to cure within 45 minutes to one hour and was fully cured in less than 16 hours.

Fuel Resistance Testing

The coating were tested on a 55 durometer natural rubber compound (A135Q) which had been treated with Chemlok® 7701. The coating was then compared against commercial fluorocarbon coating PLV-2100, and a commercial HNBR SPE XV coating taught according to U.S. Pat. No. 5,314,955 and an uncoated control.

When immersed in Jet A fuel for 24 hours at room temperature, the following volume % swell results obtained are:

| | |
|---|---|
| Control Uncoated | 192.9% |
| Control PLV 2100 | 0.1% |
| Control HNBR SPE XV | 33.6% |
| Example Coating with bis-[isocyanatopheny]methane | 2.2% |
| Example Coating with 3-isocyanatopropyltriethoxysilane | 2.3% |

Adhesion Testing

Rubber adhesion was tested by bonding two one-inch-wide strips together, and by pulling in a 180° peel. The rubber strips were made from a 55 durometer commercial natural rubber compound (A135Q) which had been treated with Chemlok® 7701. An approximate two-inch-long section was coated; each strip was placed in contact with each other and a 472 g weight applied to ensure intimate contact. The weight was left in place for ten minutes. After 8 days drying time, each strip was pulled apart in the Tinius Olsen® tensile tester. The following table records the results.

| Coating Type | Peel Results, Lbf |
|---|---|
| Control PLV 2100 | 2.03 |
| Control HNBR SPE XV | 8.52 |
| Example Coating with bis-[isocyanatopheny]methane | 15.5 |
| Example Coating with 3-isocyanatopropyltriethoxysilane | 21.1 |

Metal adhesion was tested in shear by bonding a one-inch wide rubber strip to a one-inch metal coupon with one square inch of overlap. The rubber strips were made from a 55 Durometer natural rubber compound (A135Q) which had been treated with Chemlok® 7701. The metal coupons were 304 stainless steel. Stainless was chosen because it is known to be a difficult substrate to bond to. After coating, each was placed in contact with each other and a 472 g weight applied to ensure intimate contact. The weight was left in place for ten minutes. After 8 days drying time, each specimen was pulled apart in the Tinius Olsen tensile tester.

| Coating Type | Adhesion Results, psi |
|---|---|
| Control PLV 2100 | 16.78 |
| Control HNBR SPE XV | 19.23 |
| Example Coating with bis-[isocyanatopheny]methane | 18.2 |
| Example Coating with 3-isocyanatopropyltriethoxysilane | 18.5 |

Ozone Resistance

Ozone testing was done using a dynamic ozone test (ASTM-D3395) at 50 pphm ozone at 104° F.

Specimens were based on a 55 durometer commercial sulfur-cured natural rubber/polybutadiene blend protected with antiozonant wax and an alkyl-aryl phenylene-diamine antiozonant (M122N). Under dynamic conditions, it appears that the carboxylated hydrogenated coating is more effective as an ozone barrier than the HNBR coating SPE XV.

| Elapsed time until initial cracking: | |
|---|---|
| Control Uncoated | 6.5 hrs. |
| Control HNBR SPE XV | 6.5 hrs. |

EXAMPLE 1

Coating with bis-[isocyanatopheny]methane was uncracked at 28 hrs.

EXAMPLE 1

Coating with 3-isocyanatopropyltriethoxysilane was uncracked at 28 hrs.

Besides having low adhesion values, the PLV 2100 coating cracks and delaminates from the rubber surface after flexing. Unpierced DeMattia flex specimens (made from a 55 durometer natural rubber compound) were coated with these same coatings and flexed in accordance with ASTM D-813. The PLV-2100 coating was severely cracked and delaminated, exposing the substrate in less than 4000 cycles. Both the baked HNBR SPE XV and Example 1 ran 80,000 cycles at which point the natural rubber substrate was cracked. There was no sign of delamination in either of the Example coatings. This base formulation when provided with the effective amount of thermal conducting metallic exhibits as good performance as tested above and further provides emissive properties.

EXAMPLE 2

The Following Example was Prepared Using an X-HNBR Polymer Available from Bayer AG Under the Therban® Mark as Therban® KA 8889.

An elastomer coating solution was prepared as follows:

| Ingredient | Description | PHR |
|---|---|---|
| X-HNBR | carboxylated hydrogenated nitrile-butadiene | 100.0 |

This formulation was dissolved in Methyl Isobutyl Ketone (MIBK, CAS No. 108-10-1) to a solids content of 15.0% by weight. 33 phr of aluminum flake having an average particle diameter of 16 microns were added to the coating solution.

To 97.5 wet wt. parts of solution, 2.5 wet wt. parts of bis-[isocyanatopheny]methane (diisocyanate)(Casabond° TX, 53% in xylene) was added.

A cured block of natural rubber 3"×3"×0.5" (7.6 cm.×7.6 cm×1.2 cm) having a Durometer A of 65 was coated to a dry film thickness of about 1 mil.

A hole was drilled 1.5 in. (3.8 cm.) and a thermocouple inserted for monitoring temperature in the center of the block. The block was placed under a 250 watt infrared lamp, suspended 8" (20 cm. From the rubber block. The control block was uncoated. Temperature recordings were made using a Cole-Parmer Dual J-T-E-K Thermocouple Thermometer Model 91100-40 at the time intervals below.

| Time (minutes) | Uncoated Rubber Block Temperature (° F./° C.) | Coated Rubber Block Temperature (° F./° C.) |
|---|---|---|
| Initial 0' | 73.8/23.2 | 73.6/23.1 |
| 10' | 162./172.2 | 97.3/36.2 |
| 20' | 214.9/101.6 | 118.7/48.1 |
| 30' | 238.5/114.7 | 130.5/54.7 |

The uncoated specimen began smoking within the first 10 minutes of exposure to the heat source.

DeMattia Flex specimens were coated with the coating material used in example 2 in accordance with ASTM D-813. After 77,000 cycles with no signs of cracking or delamination were observed in the coating. Cracks occurred in the rubber substrate and coating was split where the substrate crack occurred. Adhesion was excellent, and failure only observed in the underlying substrate indicates that the maximum level of coating integrity is obtained.

The results illustrated in FIG. 1 represent a repeat of Example 2 coated specimen with a 16 inch, 3 speed fan running at low speed, blowing across the specimens from 9.5 feet away and the infra-red lamp positioned 4 inches from specimens. Under air movement simulating actual automotive

| Time (minutes) | Uncoated Rubber Block Temperature (F.) | Coated Rubber Block Temperature (F.) |
|---|---|---|
| Initial 0' | 73 | 73 |
| 4' | 95 | 78 |
| 10' | 131 | 84 |
| 20' | 172 | 92 |
| 35' | 181 | 96 |
| 50' | 189 | 99 |
| 120' | 189 | 99 |

EXAMPLE 3

Functionalized HNBR Water Based Latex

Water based functionalized HNBR latexes were prepared according to the present invention. A 41% solids carboxylated-HNBR latex, 404EXPLTX005 also sold as Latex B from Zeon Chemical was utilized. The following compositions were prepared.

| Components | Formula 1 | Formula 2 | Formula 3 | Formula 4 | Formula 5 | Formula 6 |
|---|---|---|---|---|---|---|
| 41% Solids X-HNBR latex | 100 grams | 100 grams | 100 grams | 100 grams | 100 grams | 100 grams |
| Diphenyl-methane Diisocyanate prepolymer (aromatic) | 1.25 grams | 2.5 grams | 5.0 grams | — | — | — |
| 1,6-Hexamethylene Diisocyanate based polyisocyanate[2] (aliphatic) | — | — | — | 2.5 grams | 5.0 grams | 7.5 grams |

[1]Desmodur ® XO 672
[2]Bayhydur ® 302 (I, 6-HDI) available from Bayer Corporation DeMattia Flex specimens were sprayed with the latex/isocyanate combination as listed above. The DeMattia specimens were wiped with MIBK and treated with Chemlok® 7701, and the coating was applied to the specimens by spraying. All specimens ran 80,000 cycles with no signs of cracking or delamination. Adhesion is excellent.

Ozone testing was done using a dynamic ozone test (ASTM-D3395) at 50 pphm ozone at 104° F.

Specimens were based on a 55 durometer commercial sulfur-cured natural rubber/polybutadiene blend protected with antiozonant wax and an alkyl-aryl phenylene-diamine antiozonant (M122N). Observations were made at 2 hour intervals.

|  | Time to observed edge cracking |
|---|---|
| A. uncoated control | 4.0 hrs. |
| B. coated with Chemisat ® LCH7302X, a non-functionalized HNBR | 2 hours |
| C. coated with Chemisat ® LCH7302X non-functionalized HNBR with 5.0 parts per hundred by weight of Bayhydur ® 302 (1,6-HDI)) | 4.0 hours |
| D. coated with Carboxylated HNBR 404EXPLTX005 | 10 hours |
| E. coated with carboxylated Latex 404EXPLTX005 with 5.0 parts per hundred by weight of I, 1,6-HDI | 22.0 hours |

Chemisat ® LCH7302X is an HNBR Latex currently produced by Zeon Chemical, formerly produced by Goodyear Chemical Company.

EXAMPLE 4

|  | 4E Silver1 | 4F Silver 2 | 4G Silver 3 | 4A Green |
|---|---|---|---|---|
| Therban ® KA-8889* | 100 | 100 | 100 | 100 |
| Akrochem ® E2557 green | — | — | — | 2.5 |
| Alglo ® 400 aluminum (Al) paste** | 10.0 | — | — | — |
| Al Paste 586 | — | 12.5 | — | — |
| Stapa ® Metallux 214 Al paste | — | — | 10.0 | — |

*carboxylated HNBR from Bayer Ag.
**avg. diameter. 45 microns

Alglo® 400 and the aluminum paste 586 are supplied by Toyal America, Inc. and the Stapa® Metallux 214 is supplied by Eckart America L. P. Aluminum Paste 565 and Stapa® Metallux 2156 were also used. Both leafing and non-leafing aluminum pigments of varying particle sizes may can be used to obtain different visual effects. The compounded elastomers were each dissolved in solvent to 10% solids content. They were readily blended with tinting colorants to different tinted shades conventionally according to the known art of color matching. On the other hand, a mixture of 90% Silver 3 and 10% green gives a silver color with a hint of pastel green.

A blend of copper conductive powder from Caswell with silver2 (Example 4F) gave a metallic gold color.

EXAMPLE 5

Control

A control example using a coating cured according to U.S. Pat. No. 5,314,741 of hydrogenated copolymer of acrylonitrile and butadiene in organic solvent using zinc-sulfur curing as taught therein was applied to a peroxide cured natural rubber substrate.

| Coating Composition | |
|---|---|
| Ingredient | Parts by Weight |
| HNBR | 100 |
| Zinc Oxide | 4.00 |
| Sulfur | 1.75 |
| ZMBT (2) | 2.00 |
| Zinc dibutyl dithiocarbamate | 0.75 |
| Total | 108.50 |

*Zinc 2-mercaptobenzothiazole accelerator

The ingredients except HNBR were mill mixed and then dissolved to a 10% solution in MIBK solvent. The coating composition was prepared by mixing the solid rubber on a two roll mill followed by dissolving HNBR in solvent. One inch wide specimens of sulfur-cured natural rubber sheet were washed with isopropyl alcohol prior to applying the coating composition.

The coating composition was applied to the surfaces of the natural rubber substrate specimens. The coating thickness was approximately 1 mil dry. Two coated, uncured strips were placed together with the coated sides against each other. The coatings were dried for 24 hours at room temperature. Some of the specimens were baked in an oven for fifteen (15) minutes at 307° F. (152° C.) to cure the coatings. This gave as the product coated natural rubber tensile sheets having thereon coatings, approximately 2 mil thick and bonded together. The bonded specimens were pulled apart in peel and the force required to separate them was recorded.

| | |
|---|---|
| Uncured coating (dried but not baked) | 0.6 lbs peel strength |
| Cured coating (baked 15 minutes at 307 F.) | 1.9 lbs peel strength |

These adhesion levels to the rubber substrate as cured and uncured coatings are unacceptably low and result in flex fatigue and cracking on elastomer substrates subjected to flexing.

EXAMPLE 6

A clear base coating was made by dissolving X-HNBR elastomer (Therban KA-8889 from Bayer A G) in MIBK to a solids content of 5% by weight. To 99.25 wet wt. parts of solution, 0.75 wet wt. parts of bis-[isocyanatopheny] methane (diisocyanate), 53% in xylene (Casabond Tex.) was added. Thermal conductive aluminum pigments were added to the clear coating solution in various weight percents based on the weight of the polymer.

Cured blocks of natural rubber 3"×3"×0.5" (7.6 cm.×7.6 cm×1.2 cm) having a Durometer A of 65 were coated to dry film thickness of about 1 mil (0.0004 cm).

Holes were drilled 1.5 in. (3.8 cm.) into the center of the block and thermocouples were inserted for monitoring temperature in the center of the block. The blocks were placed under a 250-watt infrared lamp, suspended 4" (10 cm.) from the rubber block. The control block was uncoated. Temperature recordings were made against time using a Cole-Parmer Dual® J-T-E-K Thermocouple Thermometer Model 91100-40. No fan was used in this experiment.

| Time (minutes) | Uncoated Rubber Block Temperature (F.) |
|---|---|
| Initial 0' | 72 |
| 5' | 96 |
| 10' | 115 |
| 15' | 130 |
| 20' | 145 |

EXAMPLE 6A

| STAPA ® Metallux ® 2156 (Eckart America L.P.)) 70% solids, non-leafing, 16 micron avg. dia. | | |
|---|---|---|
| | Coated Rubber Block using STAPA Metallux 2156 | |
| Time (minutes) | 10 phr Temperature (F.) | 20 phr Temperature (F.) |
| Initial 0' | 72 | 72 |
| 5' | 87 | 79 |
| 10' | 106 | 90 |
| 15' | 120 | 100 |
| 20' | 130 | 108 |

Figure 2:
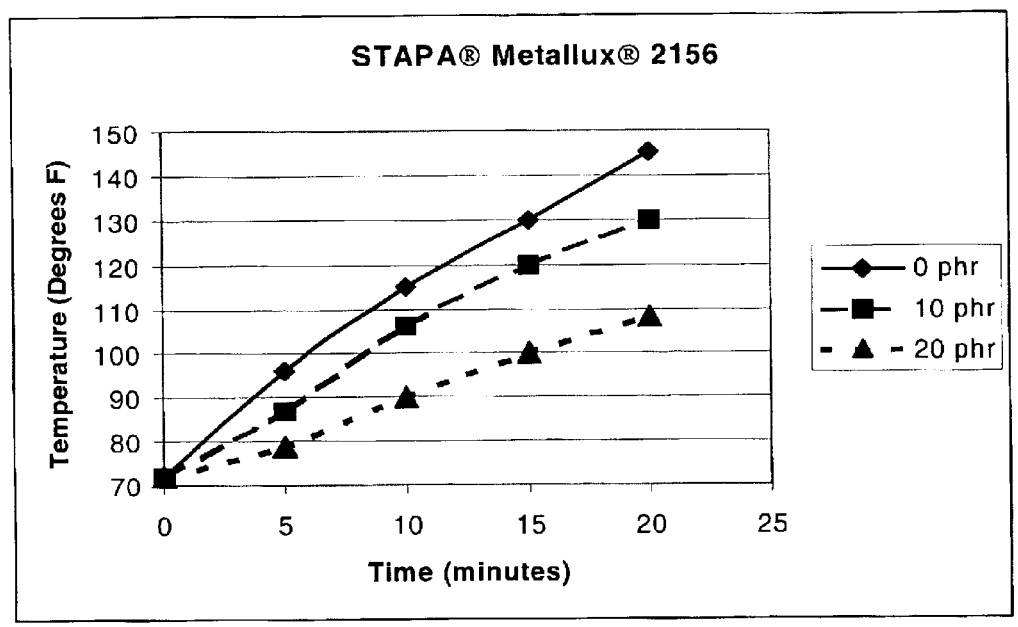
FIG. 2 is a graphical representation of the effect of a 0.001' (0.00040 cm) thermal conductive coating applied to natural rubber on internal heat build under radiant heat at 0, 10 and 20 phr of a thermal conducting pigment.

The results are graphically illustrated in FIG. 2

EXAMPLE 6B

| Aluminum Paste 565 (ex. Toyal America) 65% solids, leafing, 13 micron avg. dia. | | |
|---|---|---|
| | Coated Rubber Block using Aluminum Paste 565 | |
| Time (minutes) | 10 phr Temperature (F.) | 20 phr Temperature (F.) |
| Initial 0' | 72 | 72 |
| 5' | 84 | 81 |
| 10' | 97 | 93 |
| 15' | 106 | 101 |
| 20' | 116 | 110 |

Figure 3:
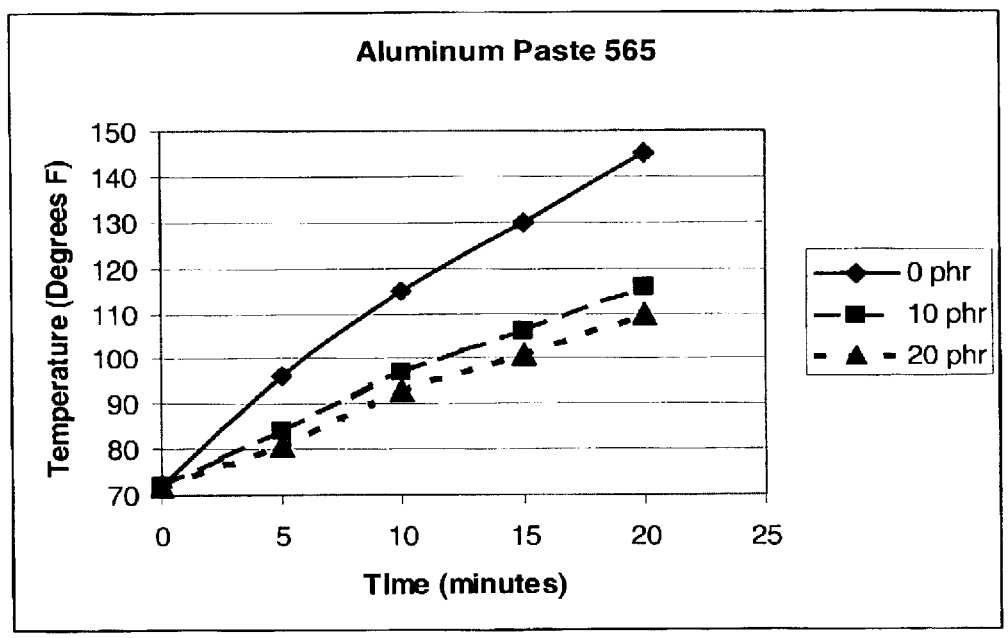
FIG. 3 is a graphical representation of the effect of a 0.001' (0.00040 cm) thermal conductive coating applied to natural rubber on internal heat build under radiant heat at 0, 10 and 20 phr of a thermal conducting pigment.

The results are graphically represented in FIG. 3

EXAMPLE 6C

| Alglo ® 400 Aluminum Paste (ex. Toyal America) 70% solids, non-leafing, 45 micron av. dia. | | |
|---|---|---|
| | Coated Rubber Block using Alglo 400 | |
| Time (minutes) | 20 phr Temperature (F.) | 50 phr Temperature (F.) |
| Initial 0' | 72 | 72 |
| 5' | 83 | 81 |
| 10' | 100 | 93 |
| 15' | 112 | 101 |
| 20' | 116 | 110 |

Figure 4:
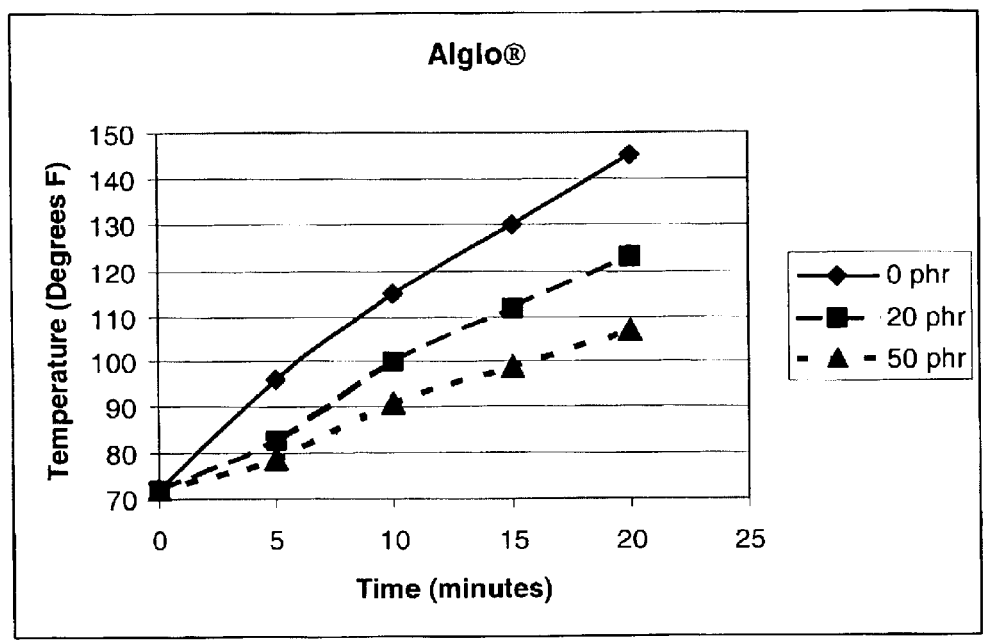
FIG. 4 is a graphical representation of the effect of a 0.001' (0.00040 cm) thermal conductive coating applied to natural rubber on internal heat build under radiant heat at 0, 20 and 50 phr thermal conducting pigment.

The results are graphically represented in FIG. 4.

EXAMPLE 6D

Sparkle ® Silvex ® 760-20-A
(ex. Silberline) 80% solids, non-leafing, 54 micron

Coated Rubber Block using Sparkle Silvex 760-20-A

| Time (minutes) | 20 phr Temperature (F.) | 50 phr Temperature (F.) |
| --- | --- | --- |
| Initial 0' | 73 | 73 |
| 5' | 86 | 82 |
| 10' | 101 | 92 |
| 15' | 116 | 102 |
| 20' | 124 | 108 |

Figure 5:
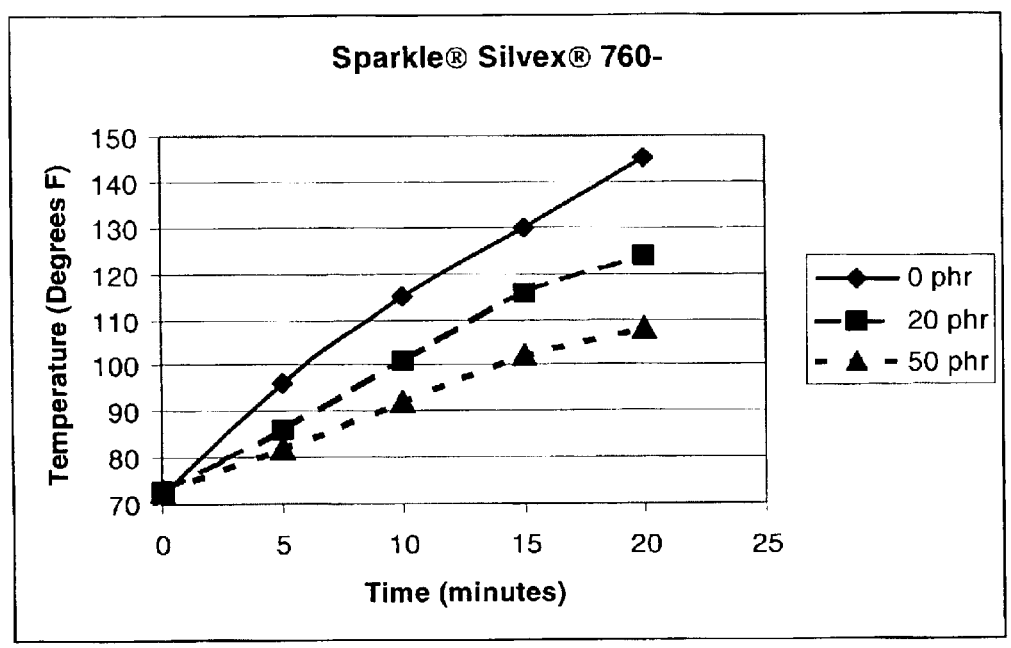
FIG. 5 is a graphical representation of the effect of a 0.001' (0.00040 cm) thermal conductive coating applied to natural rubber on internal heat build under radiant heat at 0, 20 and 50 phr thermal conducting pigment.

The results are graphically illustrated in FIG. 5.

EXAMPLE 7

Three similar coatings were made using a fluoroelastomer, a water based XHNBR latex, and a polyurethane, respectively. The fluoroelastomer base coating was made by mixing the following formulation and then dissolving it in MIBK to a solution having a solids content of 30%.

EXAMPLE 7A

| | |
| --- | --- |
| Viton ® A-100 (DuPont) | 100.0 PHR |
| Magnesium Oxide (Maglite D) | 1.0 |
| Calcium Hydroxide Technical Grade | 2.0 |
| Metallux ® 2156 (Eckart America L.P.) | 10.0 |
| Aluminum Paste 586 (Toyal America) | 5.0 |

To 120.0 grams of the dissolved solution, 1.8 grams of N-(2-hydroxyethyl)ethylenediamine was added. After 4 hours, 5.0 grams of 3-isocyanatopropyltriethoxysilane was added along with an additional 25 grams of MIBK.

EXAMPLE 7B

The XHNBR Latex was made by starting with Latex B from Zeon Chemical (41% solids content). To 100.0 grams of Latex B, 20.0 grams of Sparkle Silvex® 760-20-A (Silberline®) and 5.0 grams of the water dispersible polyisocyanate Bayhydur® 302 (Bayer) were added.

EXAMPLE 7C

The polyurethane was made by adding 7.0 grams (21.8 phr on urethane solids) of Aluminum Paste 586 (ex. Toyal America) to 100.0 grams of Chemglaze® V021 clear, moisture curable polyurethane at 32% solids by weight, having a viscosity of 115 cps, a cured $T_g$ of below 0° C., and cured tensile strength of approx. 3000 p.s.i. with 350% ultimate elongation.

Cured blocks of natural rubber 3"×3"×0.5" (7.6 cm.×7.6 cm×1.2 cm) having a Durometer A of 65 were coated to dry film thicknesses of about 1 mil using the coatings of examples A, B and C.

Holes were drilled 1.5 in. (3.8 cm.) into the center of the tested blocks and thermocouples were inserted for monitoring temperature in the center of the block. The blocks were placed under a 250-watt infrared lamp, suspended 3" (7.5 cm.) from the top surface of the rubber block. The control block was uncoated. Temperature recordings were made at against time. The surface temperature was monitored using an Omegascope® Model OS530 Series non-contact infrared thermometer. The internal temperature was monitored using a Cole-Parmer Dual J-T-E-K Thermocouple Thermometer Model 91100-40. No fan was used in this experiment Uncoated Rubber Block

| Time (minutes) | Internal Temperature (F.) | Surface Temperature (F.) |
| --- | --- | --- |
| Initial 0' | 69.5 | 69 |
| 1' | 74.0 | 182 |
| 2' | 91.8 | 242 (smoking) |
| 3' | 113.6 | 268 |
| 4' | 135.0 | 299 |
| 5' | 156.0 | 328 |
| 6' | 176.0 | 333 |
| 8' | 209.1 | 353 |
| 10' | 238.0 | 375 |

Fluoroelastomer (Example 7A) coated Rubber Block

| Time (minutes) | Internal Temperature (F.) | Surface Temperature (F.) |
| --- | --- | --- |
| Initial 0' | 69.1 | 69 |
| 1' | 73.4 | 146 |
| 2' | 88.2 | 185 |
| 3' | 104.6 | 207 |
| 4' | 120.9 | 224 |
| 5' | 136.7 | 237 |
| 6' | 151.5 | 257 |
| 8' | 178.8 | 268 (smoking) |
| 10' | 202.1 | 291 |

XHNBR Latex (Example 7B) covered Rubber Block

| Time (minutes) | Internal Temperature (F.) | Surface Temperature (F.) |
| --- | --- | --- |
| Initial 0' | 69.8 | 69 |
| 1' | 72.2 | 1157 |
| 2' | 82.8 | 176 |
| 3' | 96.1 | 195 |
| 4' | 110.3 | 203 |
| 5' | 124.5 | 212 |
| 6' | 139.8 | 236 |
| 8' | 163.0 | 254 (smoking) |
| 10' | 186.1 | 264 |

Polyurethane (Example 7C) coated Rubber Block

| Time (minutes) | Internal Temperature (F.) | Surface Temperature (F.) |
| --- | --- | --- |
| Initial 0' | 72.0 | 69 |
| 1' | 75.9 | 127 |
| 2' | 90.4 | 145 |
| 3' | 105.2 | 174 |
| 4' | 120.7 | 182 |
| 5' | 135.0 | 189 |
| 6' | 148.5 | 198 |

-continued

Polyurethane (Example 7C) coated Rubber Block

| Time (minutes) | Internal Temperature (F.) | Surface Temperature (F.) |
|---|---|---|
| 8' | 172.5 | 210 |
| 10' | 194.4 | 223 (no smoke) |

Figure 6:
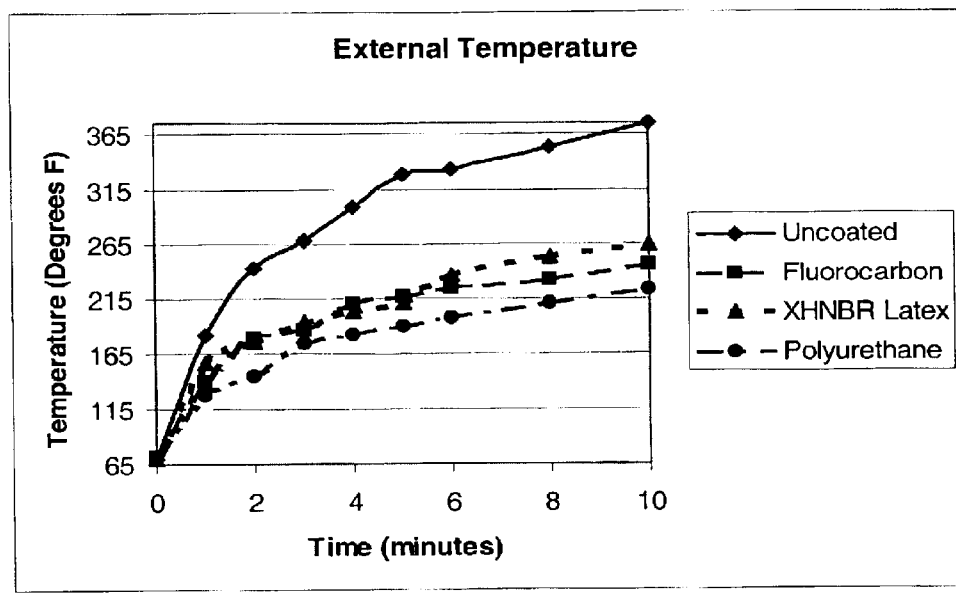
FIG. 6 is a graphical representation of the effect on the internal temperature of natural rubber blocks coated using three different thermal conductive coatings versus an uncoated block under radiant heat after 10 minutes.

The results comparing the surface temperature of the uncoated control and coated specimens based on Example 7A, 7B and 7C are graphically illustrated in FIG. 6

EXAMPLE 8

Room temperature curable reflective coating formulations were made as follows:

| Ingredient | Ex. 8A | Ex 8B |
|---|---|---|
|  | parts by weight | |
| MIBK | 90.0 | 90.0 |
| DIBK | 5.0 | 5.0 |
| Therban ® KA-8889 (X-HNBR) | 5.0 | 5.0 |

After the polymer was dissolved, the following was added:

| Aminopropyltriethoxysilane | 5.0 | 5.0 |
|---|---|---|
| Aluminum Paste 586 | 2.5 | 2.5 |
| KBM-7803 | — | 5.0 |

KBM 7803 is Heptadecatrifluorodecyl trimethoxysilane $CF_3(CF_2)_7CH_2CH_2Si(OCH_3)_3$ and is commercially available from Shinetsu Silicones. A 6"×6"×0.75" natural rubber pad (65 durometer) was coated with each of the coatings. After the coatings were cured, they were exposed to an infrared lamp suspended 6" above the coatings. The surface temperature was monitored using a Cole-Parmer® Dual J-T-E-K Thermocouple Model 91100-40 at the time intervals indicated below. Immediately after exposure, the pads were subjected to heating in an oven at 350° F. for 7 more minutes to accelerate discoloration.

Surface Temperature Measurements

| Time (minutes) | Uncoated Temperature °F./°C. | Coated 93-6 Temperature °F./°C. | Coated 93-7 Temperature °F./°C. |
|---|---|---|---|
| Initial 0' | 82/27.7 | 81/27.2 | 81/27.2 |
| 1' | 176/80 | 129/53.8 | 120/48.8 |
| 2' | 235/112 | 159/70 | 146/63 |
| 3' | 280/137 | 190/87.7 | 170/76 |
| 4' | 305/151 | 195/90 | 185/85 |
| 5' | 330/165 | 204/95 | 196/91 |
| 6' | 340/171 | 211/99.4 | 204/95 |
| 7' | 345/173.8 | 216/102 | 207/97 |
| Discoloration-aging at 350° F./175° C.: | | Severe | Minimal |

Emissive coatings based on hydrolyzable mixture of aminoalkyl trialkoxysilane and fluoroalkyl trialkoxysilane demonstrate rapid cure and reduced discoloration after heat aging.

While in accordance with the patent statutes the best mode and preferred embodiment have been set forth, the scope of the invention is not limited thereto, but rather by the scope of the attached claims.

What is claimed is:

1. A method for coating a molded elastomer article, said article optionally affixed to a shaped metal article, comprising spraying, dipping or brushing a solvent-based, room temperature curing elastomeric film forming coating to the surface of said molded elastomer article, said coating comprising a film forming elastomer, a curing agent, and thermally conductive metal particles, said particles range in size from 5–25 μm when present at a level of from 10–100 parts by weight per 100 parts by weight of said film forming elastomer, or said particles range in size from 25–100 μm when present at a level of from 20–150 parts by weight per 100 parts of said film forming elastomer, and wherein said film forming elastomer comprises a film-forming polymer exhibiting a $T_g$ of less than 0° C. and incorporated therein a functional group which is reactive to an active hydrogen group-containing curing agent, or the functional group on the elastomer bears an active hydrogen group, and said film forming elastomer contains less than 10% ethylenic unsaturation.

2. The method of claim 1 wherein said elastomer article comprises an elastomer selected from the group consisting of natural rubber, styrene butadiene rubber, polybutadiene rubber, ethylene propylene rubber, ethylene propylene diene rubber, polyisobutylene-isoprene rubber, polychloroprene, and low acrylonitrile content (<35%) nitrile-butadiene rubber.

3. The method of claim 1 wherein said film forming elastomer is a hydrogenated random or block diene copolymer having a molecular weight of about 20,000 to 200,000.

4. The method of claim 1 wherein said film forming elastomer is carboxylated HNBR.

5. The method of claim 1 wherein the film forming elastomer is a functionalized acrylic rubber.

6. The method of claim 1 wherein said film forming elastomer is derived from an ethylenically-unsaturated monomer and an α,β-unsaturated carboxylic acid.

7. The method of claim 1 wherein said functional group on said film forming polymer is selected from the group consisting of sulfonic acid, sulfonic acid derivatives, chlorosulfonic acid, vinyl ether, vinyl ester, primary amine, secondary amine, tertiary amine, monocarboxylic acid, dicarboxylic acid, partially or fully ester derivatized monocarboxylic acid, partially or fully ester derivatized dicarboxylic acid, anhydride of dicarboxylic acid, cyclic imide of dicarboxylic acid, ionomeric derivative of dicarboxylic acid, and combinations thereof.

8. The method of claim 1 wherein said film forming elastomer is a hydrogenated diene elastomer comprising methylol functional groups.

9. The method of claim 8 wherein said film forming elastomer is a hydrogenated diene elastomer comprising phenolic methylol functional groups.

10. The method of claim 1 wherein said film forming elastomer is the thermal cracked reaction product of an amine functionalized HNBR with a diaryl carbonate.

11. The method of claim 1 wherein said film forming elastomer is a terpolymer of ethylene, $C_1$–$C_4$ alkyl acrylate and a carboxylic acid monomer unit.

12. The method of claim 11 wherein said film forming elastomer comprises at least 30 mole percent of ethylene, and from 10 to about 70 mole percent mono ethyl maleate.

13. The method of claim 1 wherein said film forming elastomer is a carboxylated, block copolymer derived from an elastomer and selected from the group consisting of hydrogenated styrene-butadiene-styrene block copolymers, and hydrogenated styrene-isoprene-styrene block copolymer.

14. The method of claim 1 wherein the film forming elastomer is a poly α-olefin-acrylic ester-acrylic carboxylate terpolymer.

15. The method of claim 1 wherein said film forming elastomer is a hydrogenated nitrile butadiene polymer containing hydroxyl groups.

16. The method of claim 1 wherein said film forming elastomer is a mixture of hydrogenated hydroxyl butadiene and a film former selected from the group consisting of carboxy modified chlorinated polyethylene, polyepichlorohydrin, poly ethylene-acrylic acid, SBR, SBS, NBR, SIBS, EPDM, EPM, polyacrylate, halogenated polyisobutylene, and polypropylene oxide, and wherein the total proportion of unsaturation in said mixture is not more than 10% overall.

17. The method of claim 1 wherein said film forming elastomer comprises hydroxyl groups incorporated by treating a hydrocarbon polymer under ozonization conditions to form an ozonized saturated hydrocarbon polymer followed by reducing the ozonized saturated hydrocarbon polymer.

18. The method of claim 1 wherein said film forming elastomer contains carboxyl groups incorporated by treating a saturated hydrocarbon polymer under ozonization conditions to form an ozonized saturated hydrocarbon polymer followed by reducing the ozonized saturated hydrocarbon polymer.

19. The method of claim 1 wherein said film forming elastomer comprises two or more α-monoolefins, and a non-conjugated diene comonomer and incorporated thereon are functional groups selected from the group consisting of carboxylic, anhydride, epoxy, phosphoric, sulfonic, sulfenate, sulfinate, hydroxy, epoxy, isocyanate, amine, and oxazoline groups.

20. The method of claim 1 wherein said film forming elastomer comprises hydroxy terminated polyisobutylene prepared by introducing hydroxy groups into the terminal positions of cationically polymerized isobutylene by dehydrochlorinating, hydroborating and oxidizing chloroterminal polyisobutylene.

21. The method of claim 1 wherein said curing agent is a polyisocyanate containing from 10 to 50% reactive NCO groups and is a liquid at ambient temperature.

22. The method of claim 1 wherein said curing agent is in 2-parts and comprises a reduction-oxidation curing system comprising a multifunctional ethylenic unsaturated compound, an oxidizing agent and a reducing agent.

23. The method of claim 1 wherein said film forming elastomer comprises a chlorinated polyolefin modified with an acid or anhydride group.

24. The method of claim 1 wherein said film forming elastomer contains active hydrogen groups and said curing agent contains groups reactive with said active hydrogen groups.

25. The method of claim 1 wherein said film forming elastomer contains groups which are reactive to active hydrogen groups, and said curing agent contains active hydrogen groups.

26. The method of claim 1 wherein said film forming elastomer contains active hydrogen groups and said curing agent contains groups reactive with said active hydrogen groups and different crosslinking groups.

27. The method of claim 1 wherein said curing agent is an organosilane present at from 25 to 150 parts by weight per 100 parts by weight of said film forming elastomer and wherein the film forming elastomer contains no more than 10 wt. % of functional groups reactive to said curing agent.

28. The method of claim 1 wherein said curing agent contains hydrolyzable groups, or groups that interact acidic or basic functional groups on the film former polymer.

29. The method of claim 25 wherein said film forming elastomer is selected from carboxylated hydrogenated butadiene nitrile elastomer and olefin/acrylic ester/carboxylate polymer, and said curing agent is an aminosilane.

30. The method of claim 27 wherein said amino(alkoxy) silane is (B)

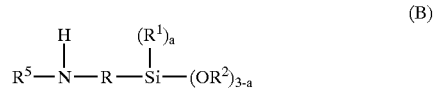

(B)

wherein R is a divalent aliphatic, cycloaliphatic or aromatic radical having from 1 to 20 carbon atoms, $R^1$ is a monovalent aliphatic, cycloaliphatic or aromatic radical having from 1 to 20 carbon atoms, $R^2$ is a monovalent aliphatic, cycloaliphatic or aromatic organic radical containing from 1 to 8 carbon atoms, and $R^5$ is selected from the group consisting of hydrogen, monovalent aliphatic radicals having from 1 to 8 carbon atoms, monovalent cycloaliphatic radicals having from 4 to 7 ring carbon atoms, phenyl, alkaryl radicals having 6 nuclear carbon atoms and containing one or more substituent alkyl groups having from 1 to 4 carbon atoms, and the group $R^7$—NH—$R^6$—, wherein $R^6$ is selected from the group consisting of divalent aliphatic, cycloaliphatic and aromatic radicals having from 1 to 20 carbons, $R^7$ is H, and a is zero or 1.

31. The method of claim 26 wherein said curing agent is an isocyanatosilane.

32. The method of claim 1 wherein said solvent is selected from the group consisting of methyl acetate, n-butyl acetate, t-butyl acetate, acetone, ethyl acetate, isopropyl acetate, isobutyl acetate, tetrahydrofuran, n-methyl pyrrolidone, aliphatic hydrocarbons selected from the group consisting of heptane, dimethylformamide, diisobutyl ketone, methyl isoamyl ketone, monochlorotoluene, para-chlorobenzotrifluoride, and vm&p naphtha, and mixtures thereof.

33. The method of claim 29 wherein said aminosilane is selected from the group consisting of, γ-aminopropyltrimethoxysilane, γ-aminopropyltriethoxysilane, methylaminopropyltrimethoxysilane, γ-aminopropyltripropoxysilane, γ-aminoisobutyltriethoxysilane, γ-aminopropylmethyldiethoxysilane, γ-aminopropylethyldiethoxysilane, γ-aminopropylphenyldiethoxysilane, δ-aminobutyltriethoxysilane, δ-aminobutylmethyldiethoxysilane, δ-aminobutylethyldiethoxysilane, γ-aminoisobutylmethyldiethoxysilane, N-methyl-γ-aminopropyltriethoxysilane, N-phenyl-γ-aminoisobutylmethyldiethoxysilane, N-ethyl-δ-aminobutyltriethoxysilane, N-γ-aminopropyl-γ-aminopropyltriethoxysilane, N-β-aminoethyl-γ-aminoisobutyltriethoxysilane, N-γ-aminopropyl-δ-aminobutyltriethoxysilane, N-aminohexyl-γ-aminoisobutylmethyldiethoxysilane, methylaminopropyltriethoxysilane, γ-aminopropylmethoxydiethoxysilane, 3-aminopropyl triethoxysilane, 3-aminopropyl methyldiethoxysilane, 3-ureidopropyl triethoxysilane, 3-ureidopropyl trimethoxysilane, γ- or 3-aminopropyl trimethoxysilane, 3-aminopropyl tris(2-methoxy-ethoxy-ethoxy)silane, N-methyl-3-aminopropyl trimethoxysilane, N-aminoethyl-3-aminopropyl-trimethoxysilane, diaminosilane, N-aminoethyl-3-aminopropyl methyldimethoxysilane, triaminopropyl-trimethoxysilane, 3-4,5-dihydroimidazolepropyl trimethoxysilane, N-β-(aminoethyl)-γ-aminopropyl trimethoxysilane, γ- or 3-aminopropyl triethoxysilane, N-phenyl-γ-aminopropyl trimethoxysilane, γ-(2-aminoethyl)aminopropyl methyldimethoxysilane, N-β(N-vinylbenzylaminoethyl)-γ-aminopropyl trimethoxysilane hydrochloride; N,N-bis(trimethylsilyl)urea, N-trimethylsilylacetamide, dimethyltrimethylsilylamine, diethyltrimethylsilylamine, trimethylsilylimidazole, and N-trimethylsilylphenylurea.

34. Then method of claim 1 wherein said film forming elastomer is a fluoroelastomer copolymer.

35. The method of claim 34, wherein said fluoroelastomer is a graft-functionalized.

* * * * *